US012760672B2

(12) United States Patent
Radtke et al.

(10) Patent No.: US 12,760,672 B2
(45) Date of Patent: Oct. 13, 2026

(54) EXHAUST SYSTEM FOR FIRE FIGHTING VEHICLE

(71) Applicant: Oshkosh Corporation, Oshkosh, WI (US)

(72) Inventors: Chad Radtke, Oshkosh, WI (US); Charles Moulton, Oshkosh, WI (US)

(73) Assignee: Oshkosh Corporation, Oshkosh, WI (US)

( * ) Notice: Subject to any disclaimer, the term of this patent is extended or adjusted under 35 U.S.C. 154(b) by 0 days.

(21) Appl. No.: 19/430,955

(22) Filed: Dec. 23, 2025

(65) Prior Publication Data

US 2026/0185471 A1 Jul. 2, 2026

Related U.S. Application Data

(60) Provisional application No. 63/739,013, filed on Dec. 26, 2024, provisional application No. 63/739,002,
(Continued)

(51) Int. Cl.
*F01N 3/20* (2006.01)
*A62C 27/00* (2006.01)
(Continued)

(52) U.S. Cl.
CPC ............ *F01N 3/2013* (2013.01); *A62C 27/00* (2013.01); *F01N 3/021* (2013.01); *F01N 3/035* (2013.01);
(Continued)

(58) Field of Classification Search
CPC ... A62C 27/00; F01N 13/009; F01N 13/1805; F01N 2250/02; F01N 2590/08; F01N 2610/02; F01N 2610/1406; F01N 3/021; F01N 3/035; F01N 3/103; F01N 3/106; F01N 3/2006; F01N 3/2013; F01N 3/2066
See application file for complete search history.

(56) References Cited

U.S. PATENT DOCUMENTS 12,104,545 B1 10/2024 Volmerding
12,442,322 B1 10/2025 Harrington et al.
(Continued)

OTHER PUBLICATIONS

U.S. Appl. No. 19/431,213, filed Dec. 23, 2025.
U.S. Appl. No. 19/431,215, filed Dec. 23, 2025.
U.S. Appl. No. 19/431,321, filed Dec. 23, 2025.

*Primary Examiner* — Anthony Ayala Delgado
(74) *Attorney, Agent, or Firm* — Foley & Lardner LLP

(57) ABSTRACT

A fire fighting vehicle includes a chassis, an engine configured to produce exhaust gas, a thermal management system, a cable support, and a wire. The thermal management system includes a first housing including a first housing inlet fluidly coupled with the engine and configured to receive the exhaust gas, a second housing including a second housing inlet configured to receive the exhaust gas from the first housing, and a heater coupled with the first housing or the second housing. The cable support includes a first bracket coupled to a lateral outer surface of the chassis, and a second bracket coupled to the first bracket and extending along at least a portion of and beneath the chassis. The wire is electrically coupled with the heater. At least a portion of the wire is supported by the second bracket such that the portion of the wire is positioned beneath the chassis.

20 Claims, 36 Drawing Sheets

Related U.S. Application Data filed on Dec. 26, 2024, provisional application No. 63/738,997, filed on Dec. 26, 2024, provisional application No. 63/739,017, filed on Dec. 26, 2024.

(51) Int. Cl.

| | |
|---|---|
| ***F01N 3/021*** | (2006.01) |
| ***F01N 3/035*** | (2006.01) |
| ***F01N 3/10*** | (2006.01) |
| ***F01N 13/00*** | (2010.01) |
| ***F01N 13/18*** | (2010.01) |

(52) U.S. Cl.

CPC ............. *F01N 3/103* (2013.01); *F01N 3/106* (2013.01); *F01N 3/2006* (2013.01); *F01N 3/2066* (2013.01); *F01N 13/009* (2014.06); *F01N 13/1805* (2013.01); *F01N 2250/02* (2013.01); *F01N 2590/08* (2013.01); *F01N 2610/02* (2013.01); *F01N 2610/1406* (2013.01)

(56) References Cited

U.S. PATENT DOCUMENTS

| | | | | |
|---|---|---|---|---|
| 2011/0030343 | A1 | 2/2011 | Kiser et al. | |
| 2016/0114790 | A1 | 4/2016 | Bruce | |
| 2017/0234194 | A1 | 8/2017 | Denis | |
| 2018/0087429 | A1* | 3/2018 | Nakamura ............ | F01N 3/2013 |
| 2018/0194218 | A1* | 7/2018 | Motoyama ............. | B01D 53/94 |
| 2022/0178286 | A1 | 6/2022 | Cunningham et al. | |
| 2022/0364488 | A1 | 11/2022 | Stoltz et al. | |
| 2022/0381174 | A1 | 12/2022 | Bleckmann et al. | |
| 2023/0174050 | A1 | 6/2023 | McCarthy, Jr. et al. | |
| 2024/0149087 | A1* | 5/2024 | Archer .................. | B60R 16/033 |

* cited by examiner

EXHAUST SYSTEM FOR FIRE FIGHTING VEHICLE

CROSS-REFERENCE TO RELATED PATENT APPLICATIONS

This application claims the benefit of and priority to (a) U.S. Provisional Patent Application No. 63/738,997, filed Dec. 26, 2024, (b) U.S. Provisional Patent Application No. 63/739,002, filed Dec. 26, 2024, (c) U.S. Provisional Patent Application No. 63/739,013, filed Dec. 26, 2024, and (d) U.S. Provisional Patent Application No. 63/739,017, filed Dec. 26, 2024, which are incorporated herein by reference in their entireties.

BACKGROUND

A fire fighting vehicle is a specialized vehicle designed to respond to fire scenes that can include various components to assist fire fighters with battling and extinguishing fires. Such components can include a pumping system, an onboard water tank, and an aerial ladder. Fire fighting vehicles traditionally include an internal combustion engine that provides power to both drive the vehicle and the various components of the vehicle to facilitate the operation thereof.

SUMMARY

One embodiment relates to a fire fighting vehicle. The fire fighting vehicle includes a chassis defining a longitudinal length of the fire fighting vehicle, an engine supported by the chassis and configured to produce exhaust gas, a thermal management system, a cable support, and a wire. The thermal management system includes a first housing including a first housing inlet fluidly coupled with the engine and configured to receive the exhaust gas, a second housing including a second housing inlet configured to receive the exhaust gas from the first housing, and a heater coupled with the first housing or the second housing. The cable support includes a first bracket coupled to a lateral outer surface of the chassis, and a second bracket coupled to the first bracket and extending (i) along at least a portion of the longitudinal length and (ii) beneath the chassis. The wire is electrically coupled with the heater. At least a portion of the wire is supported by the second bracket such that the portion of the wire is positioned beneath the chassis.

Another embodiment relates to a thermal management system for an exhaust aftertreatment system of a vehicle. The thermal management system includes a heater configured to heat a component of the exhaust aftertreatment system, a heater control unit electrically coupled with the heater, a wire electrically coupling the heater with the heater control unit, and a cable support including a first bracket configured to couple to a lateral outer surface of a chassis of the vehicle, and a second bracket coupled to the first bracket and configured to extend (i) along at least a portion of a longitudinal length of the chassis and (ii) beneath the chassis, the second bracket supporting at least a portion of the wire.

Still another embodiment relates to a fire fighting vehicle. The fire fighting vehicle includes a chassis defining a longitudinal length of the fire fighting vehicle, an engine supported by the chassis and configured to produce exhaust gas, an alternator mechanically driven by the engine, a thermal management system, a cable support, a first wire, and a second wire. The thermal management system includes a first housing including a first housing inlet fluidly coupled with the engine and configured to receive the exhaust gas, a second housing including a second housing inlet configured to receive the exhaust gas from the first housing, a first heater coupled with the first housing, and a second heater coupled with the second housing. The cable support includes a first bracket coupled to a lateral outer surface of the chassis, and a second bracket coupled to the first bracket and extending (i) along at least a portion of the longitudinal length and (ii) beneath the chassis. The first wire and the second wire are electrically coupled with the alternator and the first heater and the second heater, respectively. At least a portion of the first wire and at least a portion of the second wire are supported by the second bracket such that the portion of the first wire and the portion of the second wire are positioned beneath the chassis.

This summary is illustrative only and is not intended to be in any way limiting. Other aspects, inventive features, and advantages of the devices or processes described herein will become apparent in the detailed description set forth herein, taken in conjunction with the accompanying figures, wherein like reference numerals refer to like elements.

DETAILED DESCRIPTION

Figure 1:
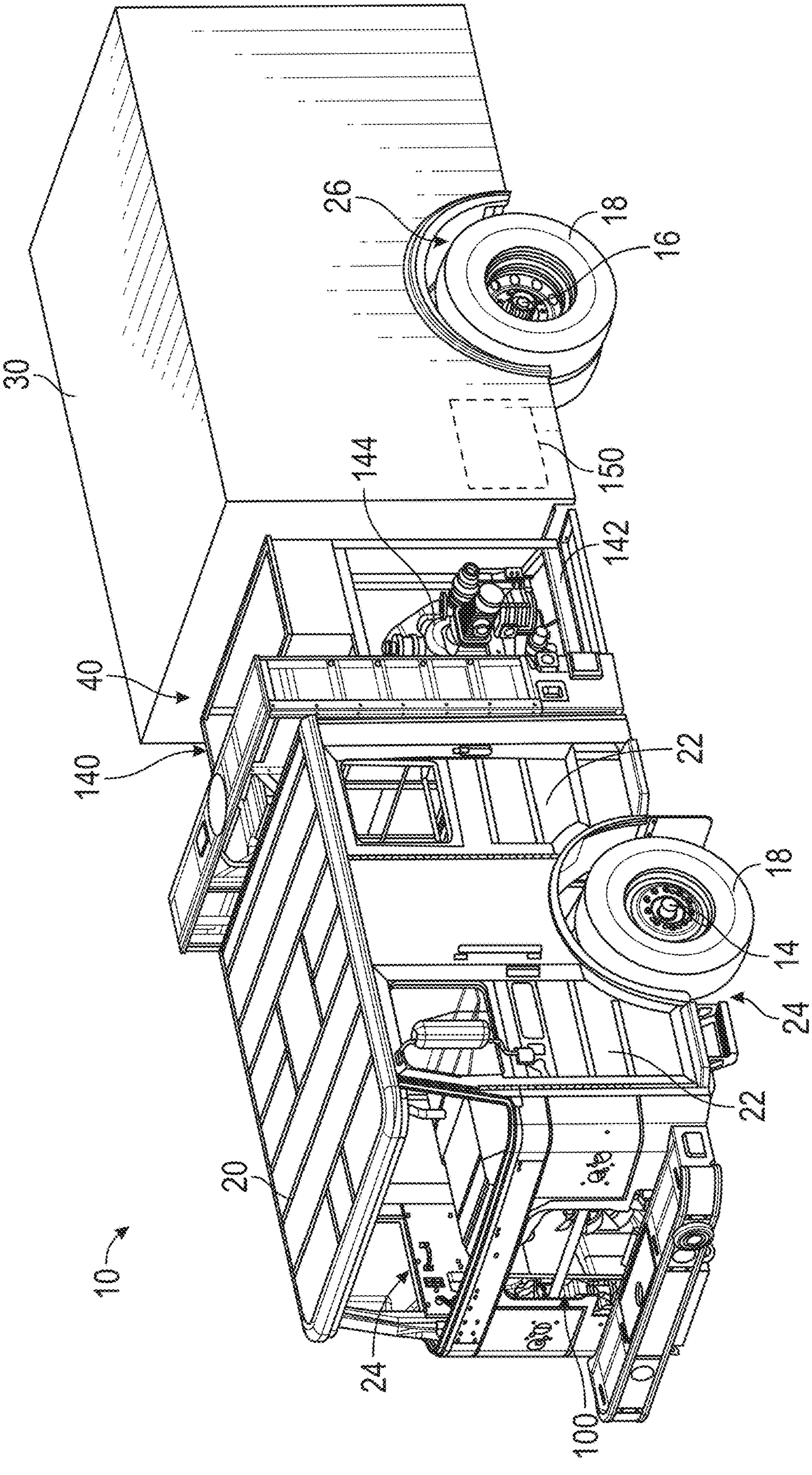
FIG. 1 is a front, left perspective view of a fire fighting vehicle, according to an exemplary embodiment.

Before turning to the figures, which illustrate certain exemplary embodiments in detail, it should be understood that the present disclosure is not limited to the details or methodology set forth in the description or illustrated in the figures. It should also be understood that the terminology used herein is for the purpose of description only and should not be regarded as limiting.

According to an exemplary embodiment, a vehicle (e.g., a fire fighting vehicle, etc.) of the present disclosure includes a driveline having an engine, a battery, an exhaust aftertreatment system, and a subsystem (e.g., a pump system, an aerial ladder assembly, etc.). According to an exemplary embodiment, the engine is a compression-ignition internal combustion engine that utilizes diesel fuel and produces exhaust gas during the operation thereof. The exhaust aftertreatment system is configured to receive exhaust gas produced by the engine, and treat the exhaust gas before releasing it to the atmosphere. Treating the exhaust gas may include chemically and physically removing, reducing, converting, etc., pollutants in the exhaust gas.

According to an exemplary embodiment, the exhaust aftertreatment system includes a DOC configured to facilitate one or more chemical reactions with the exhaust gas to reduce CO, HCs, and PM in the exhaust gas, a DPF configured to trap (e.g., filter) PM from the exhaust gas as the exhaust gas passes therethrough, a SCR configured to remove NOx from the exhaust gas passing therethrough, a DEF tank configured to store and supply DEF to the flow of exhaust gas to chemically react with pollutants in the exhaust gas stream and convert them to nitrogen and water, and a heater configured to heat the exhaust gas and/or the components of the exhaust aftertreatment system.

According to an exemplary embodiment, the exhaust aftertreatment system includes a first housing defining an interior chamber configured to receive the DOC and the DPF. The first housing includes an inlet configured to receive the exhaust gas from the engine and an outlet configured to supply the exhaust gas after it has passed through the DOC and the DPF. The exhaust aftertreatment system includes a second housing defining an interior chamber configured to receive the SCR. In some embodiments, the second housing is configured to receive two SCRs (e.g., as a dual-cannister SCR system). The second housing includes an inlet configured to receive the exhaust gas from the first housing via an intermediate pipe fluidly coupling the first housing with the second housing. The intermediate pipe includes a decoupler configured to permit relative movement between the first housing and the second housing. The first housing and the second housing are coupled to frame rails of a frame of the vehicle such that the first housing and the second housing are laterally adjacent to each other. The first housing and the second housing may be longitudinally positioned along the frame below the pump system. The DEF tank may be positioned within a space defined by the front wheel well or with a space defined by a rear wheel well. The DEF tank is configured to supply DEF, via a DEF supply line, and a DEF injector is configured to dose the exhaust gas flowing through the exhaust aftertreatment system with the DEF.

According to an exemplary embodiment, the heater is coupled with the first housing and the second housing (e.g., via high voltage wires) and is configured receive power from a heating control unit to heat the exhaust gas before the exhaust gas passes through the DOC, the DPF, and/or the SCR. In some embodiments, the chemical reactions of the exhaust gas facilitated by the DOC, the DPF, and/or the SCR take place when the exhaust gas is at or greater than a temperature threshold. In such embodiments, when the temperature of the exhaust gas is below the temperature threshold, the chemical reactions may not take place or may not be as efficient (e.g., incomplete oxidation, unburned hydrocarbons, etc.). In other words, when the temperature of the exhaust gas is below the temperature threshold, the exhaust aftertreatment system may convert or reduce less pollutants than if the temperature of the exhaust gas was at or greater than the temperature threshold. Accordingly, the heater may heat the exhaust gas and/or the DOC, the DPF, and/or the SCR to help improve the efficiency of the operations of the DOC, the DPF, and/or the SCR.

According to an exemplary embodiment, the vehicle includes a cable support configured to support and suspend high voltage wires underneath and along at least a portion of a length of the frame. The cable support may include (i) a mounting bracket positioned along and detachably coupled to a frame rail of the frame and (ii) a cable bracket extending laterally from and detachably coupled to the mounting bracket and positioned beneath the frame. The vehicle may include a plurality of cable supports to facilitate supporting the high voltage wires at various locations throughout the vehicle and along the frame.

Overall Vehicle

According to the exemplary embodiment shown in FIGS. 1-6, a machine, shown as vehicle 10, is configured as a fire fighting vehicle. In the embodiment shown, the fire fighting vehicle is a pumper fire truck. In another embodiment, the fire fighting vehicle is an aerial ladder truck. The aerial ladder truck may include a rear-mount aerial ladder or a mid-mount aerial ladder. In some embodiments, the aerial ladder truck is a quint fire truck. In other embodiments, the aerial ladder truck is a tiller fire truck. In still another embodiment, the fire fighting vehicle is an airport rescue fire fighting ("ARFF") truck. In various embodiments, the fire fighting vehicle (e.g., a quint, a tanker, an ARFF, etc.) includes an on-board water storage tank, an on-board agent storage tank, and/or a pumping system. In other embodiments, the fire fighting vehicle is still another type of fire fighting vehicle. In an alternative embodiment, the vehicle 10 is another type of vehicle other than a fire fighting vehicle. For example, the vehicle 10 may be a refuse truck, a concrete mixer truck, a military vehicle, a tow truck, an ambulance, a farming machine or vehicle, a construction machine or vehicle, an airport ground support equipment ("GSE"), and/or still another vehicle.

As shown in FIGS. 1-11, 15, 17, and 18, the vehicle 10 includes a chassis, shown as a frame 12; a plurality of axles, shown as front axle 14 and rear axle 16, supported by the frame 12 and that couple a plurality of tractive elements, shown as wheels 18, to the frame 12; a cab, shown as front cabin 20, supported by the frame 12; a body assembly, shown as a rear section 30, supported by the frame 12 and positioned rearward of the front cabin 20; and a driveline (e.g., a powertrain, a drivetrain, an accessory drive, etc.), shown as driveline 100. While shown as including a single front axle 14 and a single rear axle 16, in other embodiments, the vehicle 10 includes two front axles 14 and/or two rear axles 16. In an alternative embodiment, the tractive elements are otherwise structured (e.g., tracks, etc.).

According to an exemplary embodiment, the front cabin 20 includes a plurality of body panels coupled to a support (e.g., a structural frame assembly, etc.). The body panels may define a plurality of openings through which an operator accesses an interior 24 of the front cabin 20 (e.g., for ingress, for egress, to retrieve components from within, etc.). As shown in FIGS. 1, 2, 4, and 5, the front cabin 20 includes a plurality of doors, shown as doors 22, positioned over the plurality of openings defined by the plurality of body panels. The doors 22 may provide access to the interior 24 of the front cabin 20 for a driver and/or passengers of the vehicle 10. The doors 22 may be hinged, sliding, or bus-style folding doors.

The front cabin 20 may include components arranged in various configurations. Such configurations may vary based on the particular application of the vehicle 10, customer requirements, or still other factors. The front cabin 20 may be configured to contain or otherwise support a number of occupants, storage units, and/or equipment. For example, the front cabin 20 may provide seating for an operator (e.g., a driver, etc.) and/or one or more passengers of the vehicle 10. The front cabin 20 may include one or more storage areas for providing compartmental storage for various articles (e.g., supplies, instrumentation, equipment, etc.). The interior 24 of the front cabin 20 may further include a user interface (e.g., user interface 320, etc.). The user interface may include a cabin display and various controls (e.g., buttons, switches, knobs, levers, joysticks, etc.). In some embodiments, the user interface within the interior 24 of the front cabin 20 further includes touchscreens, a steering wheel, an accelerator pedal, and/or a brake pedal, among other components. The user interface may provide the operator with control capabilities over the vehicle 10 (e.g., direction of travel, speed, etc.), one or more components of driveline 100, and/or still other components of the vehicle 10 from within the front cabin 20.

As shown in FIGS. 1, 2, 4, 5, 23, and 24, the vehicle 10 includes a plurality of wheel wells (e.g., fender wells), shown as front wheel wells 22 and rear wheel wells 24. The front wheel wells 22 include cutouts along a bottom edge of the front cabin 20. The vehicle 10 includes a first front wheel well 22 along a left side of the vehicle 10 and a second front wheel well 22 along a right side of the vehicle 10. The front wheel wells 22 define a space for the wheels 18 coupled to the front axle 14, such that the wheels 18 do not contact the front cabin 20. The rear wheel wells 24 include cutouts along a bottom edge of the rear section 30. The vehicle 10 includes a first rear wheel well 24 along a left side of the vehicle 10 and a second rear wheel well 24 along a right side of the vehicle 10. The rear wheel wells 24 define a space for the wheels 18 coupled to the rear axle 16, such that the wheels 18 do not contact the rear section 30.

In some embodiments, the rear section 30 includes a plurality of compartments with corresponding doors positioned along one or more sides (e.g., a left side, right side, etc.) and/or a rear of the rear section 30. The plurality of compartments may facilitate storing various equipment such as oxygen tanks, hoses, axes, extinguishers, ladders, chains, ropes, straps, boots, jackets, blankets, first-aid kits, and/or still other equipment. One or more of the plurality of compartments may include various storage apparatuses (e.g., shelving, hooks, racks, etc.) for storing and organizing the equipment.

In some embodiments (e.g., when the vehicle 10 is an aerial ladder truck, etc.), the rear section 30 includes an aerial ladder assembly. The aerial ladder assembly may have a fixed length or may have one or more extensible ladder sections. The aerial ladder assembly may include a basket or implement (e.g., a water turret, etc.) coupled to a distal or free end thereof. The aerial ladder assembly may be positioned proximate a rear of the rear section 30 (e.g., a rear-mount fire truck) or proximate a front of the rear section 30 (e.g., a mid-mount fire truck).

In some embodiments (e.g., when the vehicle 10 is an ARFF truck, a tanker truck, a quint truck, etc.), the rear section 30 includes one or more fluid tanks. By way of example, the one or more fluid tanks may include a water tank and/or an agent tank. The water tank and/or the agent tank may be corrosion and UV resistant polypropylene tanks. In a municipal fire truck implementation (i.e., a non-ARFF truck implementation), the water tank may have a maximum water capacity ranging between 50 and 1000 gallons (e.g., 50, 100, 150, 200, 250, 300, 350, 400, 450, 500, 550, 600, 650, 700, 750, 800, 850, 900, 950, 1000, etc., gallons). In an ARFF truck implementation, the water tank may have a maximum water capacity ranging between 1,000 and 4,500 gallons (e.g., at least 1,250 gallons; between 2,500 gallons and 3,500 gallons; at most 4,500 gallons; at most 3,000 gallons; at most 1,500 gallons; etc.). The agent tank may have a maximum agent capacity ranging between 25 and 750 gallons (e.g., 25, 50, 75, 100, 150, 200, 250, 300, 350, 400, 450, 500, 550, 600, 650, 700, 750, etc., gallons). According to an exemplary embodiment, the agent is a foam fire suppressant, an aqueous film forming foam ("AFFF"). A low-expansion foam, a medium-expansion foam, a high-expansion foam, an alcohol-resistant foam, a synthetic foam, a protein-based foams, a fluorine-free foam, a film-forming fluoro protein ("FFFP") foam, an alcohol resistant aqueous film forming foam ("AR-AFFF"), and/or still another suitable foam or a foam yet to be developed. The capacity of the water tank and/or the agent tank may be specified by a customer. It should be understood that water tank and the agent tank configurations are highly customizable, and the scope of the present disclosure is not limited to a particular size or configuration of the water tank and the agent tank.

Driveline

As shown in FIGS. 10, 11, 16, 18, 28, 31, 33, and 36, the driveline 100 includes an engine assembly, shown as engine system 110, coupled to the frame 12; a transmission device (e.g., a gearbox, a continuous variable transmission ("CVT"), etc.), shown as transmission 120, coupled to the engine system 110; an on-board energy storage system ("ESS") (e.g., one or more battery cells), shown as battery 130, coupled to the frame 12 and electrically coupled to the engine system 110 and the exhaust system 150; one or more subsystems including a first subsystem, shown as pump system 140, coupled to the frame 12 and the transmission 120; and an exhaust aftertreatment system (e.g., engine exhaust system, diesel exhaust aftertreatment system, emission control system, etc.), shown as exhaust system 150, coupled to the frame 12 and the engine system 110. According to an exemplary embodiment, the engine system 110 is controllable to drive the vehicle 10, the transmission 120, the pump system 140, and/or other accessories or components of the vehicle 10 (e.g., an aerial ladder assembly, an air-conditioning compressor, an air compressor, a power steering pump, an alternator, etc.).

As shown in FIGS. 3, 10, 18, 31, 33, and 36, the engine system 110 is coupled to the frame 12 and positioned beneath the front cabin 20. In another embodiment, the engine system 110 is otherwise positioned (e.g., beneath or within the rear section 30, etc.). As shown in FIGS. 10, 18, 31, 33, and 36, the engine system 110 includes a prime mover, shown as engine 112. According to an exemplary embodiment, the engine 112 is a compression-ignition internal combustion engine that utilizes diesel fuel. In alternative embodiments, the engine 112 is a spark-ignition engine that utilizes one of a variety of fuel types (e.g., gasoline, compressed natural gas, propane, etc.). In some embodiments, the driveline 100 is a hybrid driveline whereby (i) the engine 112 includes an internal combustion engine and an electric motor/generator and (ii) the ESS includes a fuel tank and/or a battery system.

Figure 11:
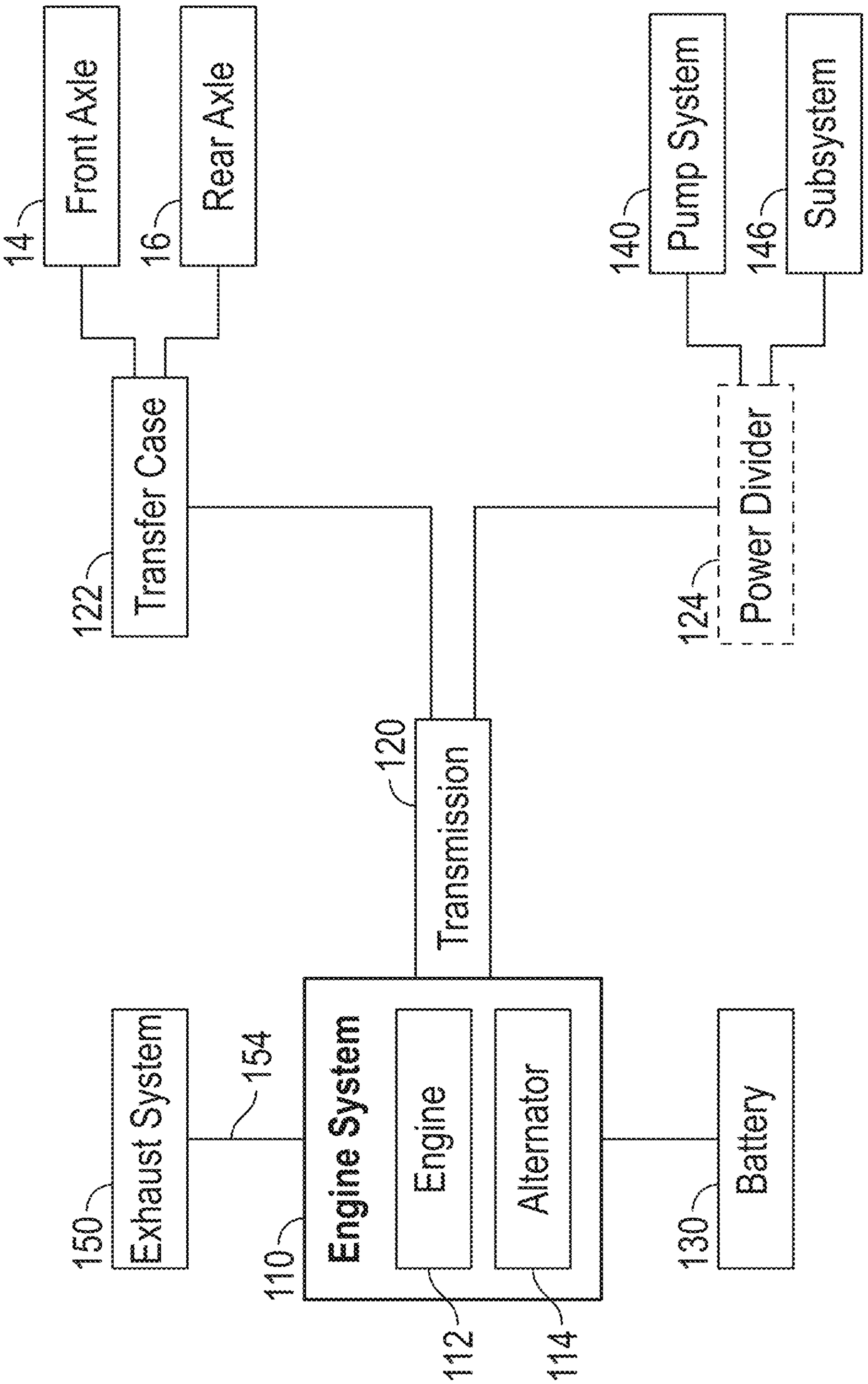
FIG. 11 is a schematic diagram of a driveline of the fire fighting vehicle of FIG. 1 including an engine system, a transmission, a pump system, a battery, and the exhaust system of FIG. 7, according to an exemplary embodiment.
Figure 37:
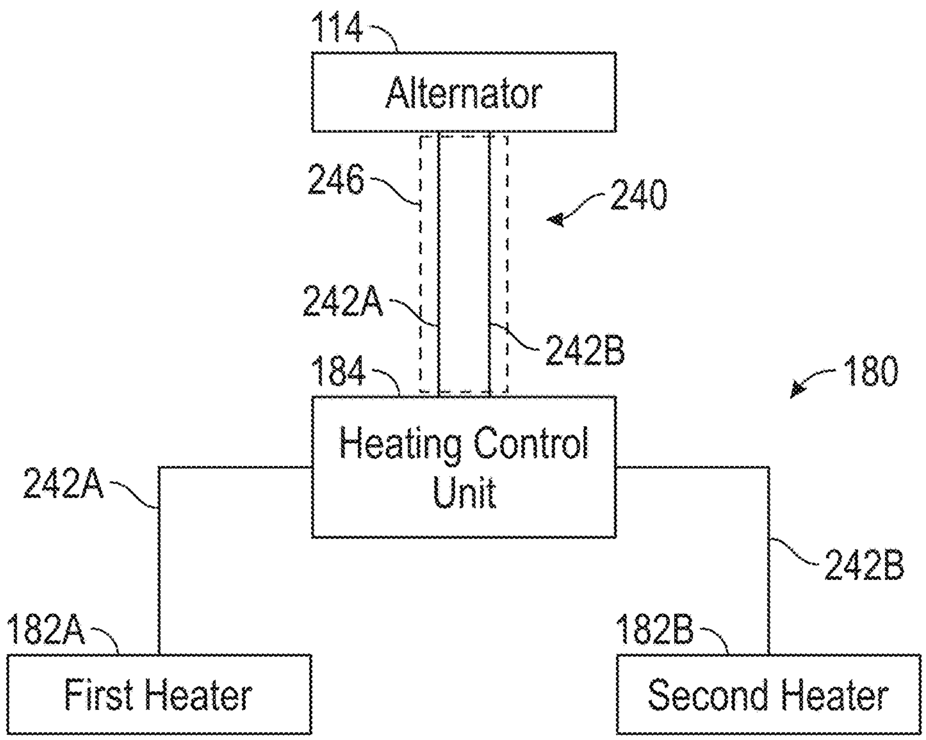
FIG. 37 is a schematic diagram of an alternator of the vehicle of FIG. 1 coupled with a thermal management system including a heating control unit via a vehicle wiring assembly, according to an exemplary embodiment.
Figure 38:
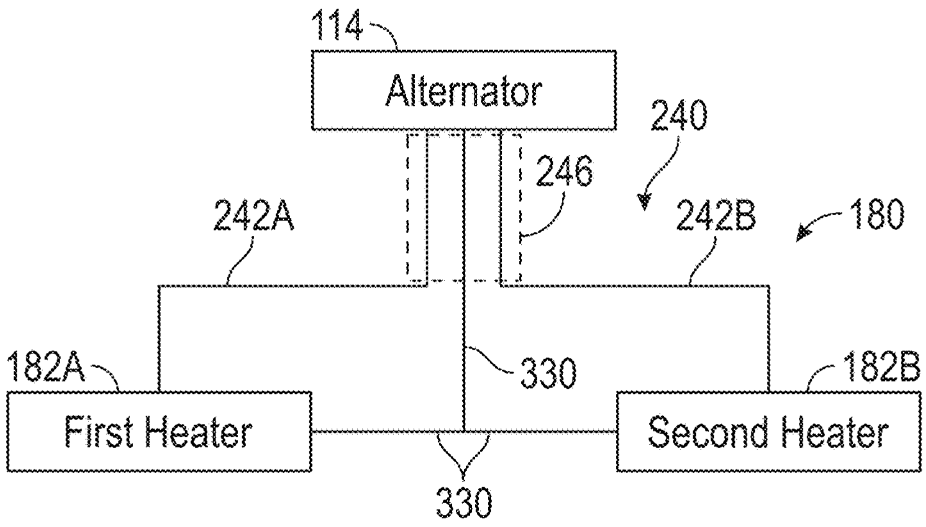
FIG. 38 is a schematic diagram of an alternator of the vehicle of FIG. 1 coupled with a thermal management system via a vehicle wiring assembly, according to an exemplary embodiment.

As shown in FIGS. 11, 37, and 38, the engine system 110 includes a generator, shown as alternator 114, coupled with the engine 112. According to an exemplary embodiment, the alternator 114 is driven by the engine 112 (e.g., by a belt, gear assembly, shaft, etc.) and is configured to convert rotational energy from the engine 112 into electrical energy. The alternator 114 may be configured to supply the electrical energy to power one or more electronic components of the vehicle 10. By way of example, the alternator 114 may supply electrical energy to one or more high voltage components (e.g., the battery 130, the heaters 182, the heater control unit 184, inverters, power distribution units, chargers, DC-to-DC converters, pumps, etc.) of the vehicle 10 to power the high voltage components during operation of the vehicle 10. By way of another example, the alternator 114 may supply electrical energy to charge the battery 130. In such examples, high voltage wires (e.g., the high voltage wires 242) may electrically couple the high voltage components to the alternator 114 and to each other.

In some embodiments, the transmission 120 is coupled to the frame 12 and positioned beneath the front cabin 20, rearward of the engine 112. In other embodiments, the transmission 120 is otherwise positioned (e.g., beneath or within the rear section 30, etc.). In some embodiments, the transmission 120 includes a first interface (e.g., a first input/output, etc.), such as an accessory drive interface; a second interface (e.g., a second output, etc.), such as an axle interface, coupled (e.g., directly, indirectly, etc.) to the front axle 14 (e.g., a front differential thereof via a front drive shaft, etc.) and/or the rear axle 16 (e.g., a rear differential thereof via a rear drive shaft, etc.); and a third interface (e.g., a third output, a power-take-off ("PTO"), etc.), such as a subsystem interface, coupled to the pump system 140 (e.g., via a subsystem drive shaft, etc.) and/or a second subsystem, shown as subsystem 146.

Figure 7:
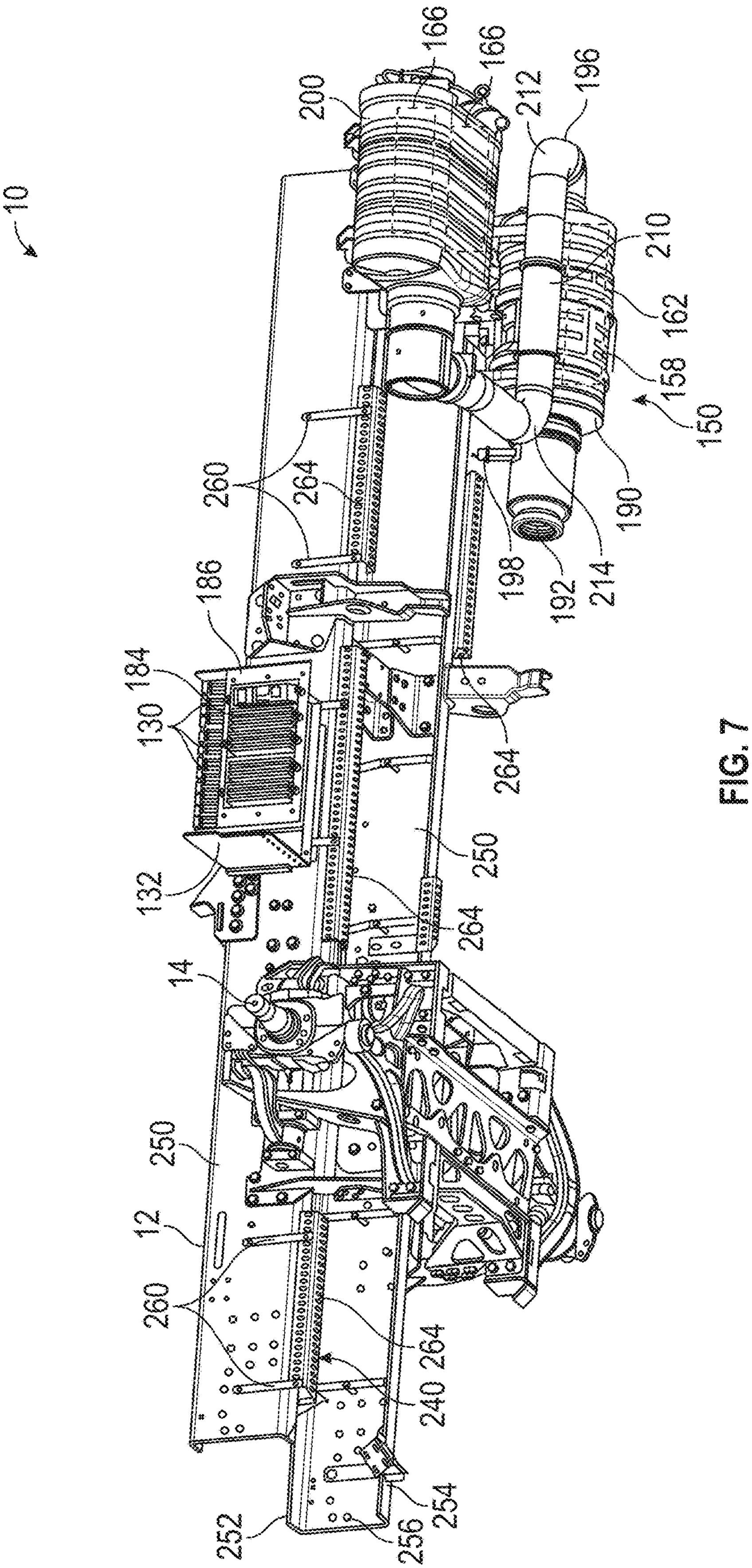
FIG. 7 is a bottom, left perspective view of a frame and an exhaust system of the fire fighting vehicle of FIG. 1, according to an exemplary embodiment.

In one embodiment, the axle interface includes a single output directly coupled to the front axle 14 or the rear axle 16 such that only one of the front axle 14 or the rear axle 16 is driven. In another embodiment, the axle interface includes two separate outputs, one directly coupled to each of the front axle 14 and the rear axle 16 such that both the front axle 14 and the rear axle 16 are driven. As shown in FIG. 11, the driveline 100 includes a first power divider, shown as transfer case 122, including a first output coupled to the front axle 14 and a second output coupled to the rear axle 16 to facilitate driving the front axle 14 and the rear axle 16 with the transmission 120. As shown in FIG. 7, the driveline 100 includes a second power divider, shown as power divider 124, including a plurality of outputs coupled to a plurality of subsystems (e.g., the pump system 140, an aerial ladder assembly, the subsystem 146, etc.) to facilitate selectively driving each of the plurality of subsystems with the transmission 120. According to an exemplary embodiment, the transmission 120 is configured such that the subsystem interface and the axle interface are speed independent. Therefore, the subsystems (e.g., the pump system 140, the aerial ladder assembly, the subsystem 146, etc.) can be driven with the transmission 120 at a speed independent of the ground speed of the vehicle 10. By way of example, the transmission 120 may include a variety of configurations (e.g., gear ratios, etc.) and may provide different output speeds relative to a mechanical input received thereby from the engine 112. In some embodiments (e.g., in hybrid driveline configurations, etc.), the driveline 100 does not include the transmission 120. In such embodiments, the engine 112 may be directly coupled to the transfer case 122 and the power divider 124.

In some embodiments, the transmission 120 functions as a mechanical conduit or power divider, and transmits the mechanical input received from the engine 112 to the pump system 140 (or other subsystem(s)), the front axle 14, and/or the rear axle 16. In some embodiments, the transmission 120 uses the mechanical input to generate electricity for use by the transmission 120 (e.g., as an electromechanical transmission device) to drive the pump system 140, the front axle 14, and/or the rear axle 16. In some embodiments, the transmission 120 supplements the mechanical input using the stored energy in the battery 130 to provide an output greater than the input received from the engine 112 (e.g., the transmission 120 may include one or more electric motors, an electromechanical infinitely variable transmission ("EMIVT"), etc.). In some embodiments, the transmission 120 (e.g., as an alternator, generator, the EMIVT, etc.) uses the mechanical input to generate electricity for storage in the battery 130.

The battery 130 may be charged by an external source (e.g., a high voltage power source, etc.). According to an exemplary embodiment, the electrical components of the vehicle 10 draw stored energy in the battery 130 (e.g., via the high voltage wires 242) to facilitate operation thereof. By way of example, the battery 130 may provide electrical energy to the exhaust system 150 (e.g., the heaters 182, the heater control unit 184, etc.), lights, sirens, communication systems, displays, electric accessories, electric motors, among other components of the vehicle 10. In some embodiments, the transmission 120 does not charge the battery 130 with energy generated thereby. In other embodiments, the transmission 120 is operable to charge the battery 130 with the energy generated thereby. In some embodiments, the alternator 114 is operable to charge the battery 130.

Figure 22:
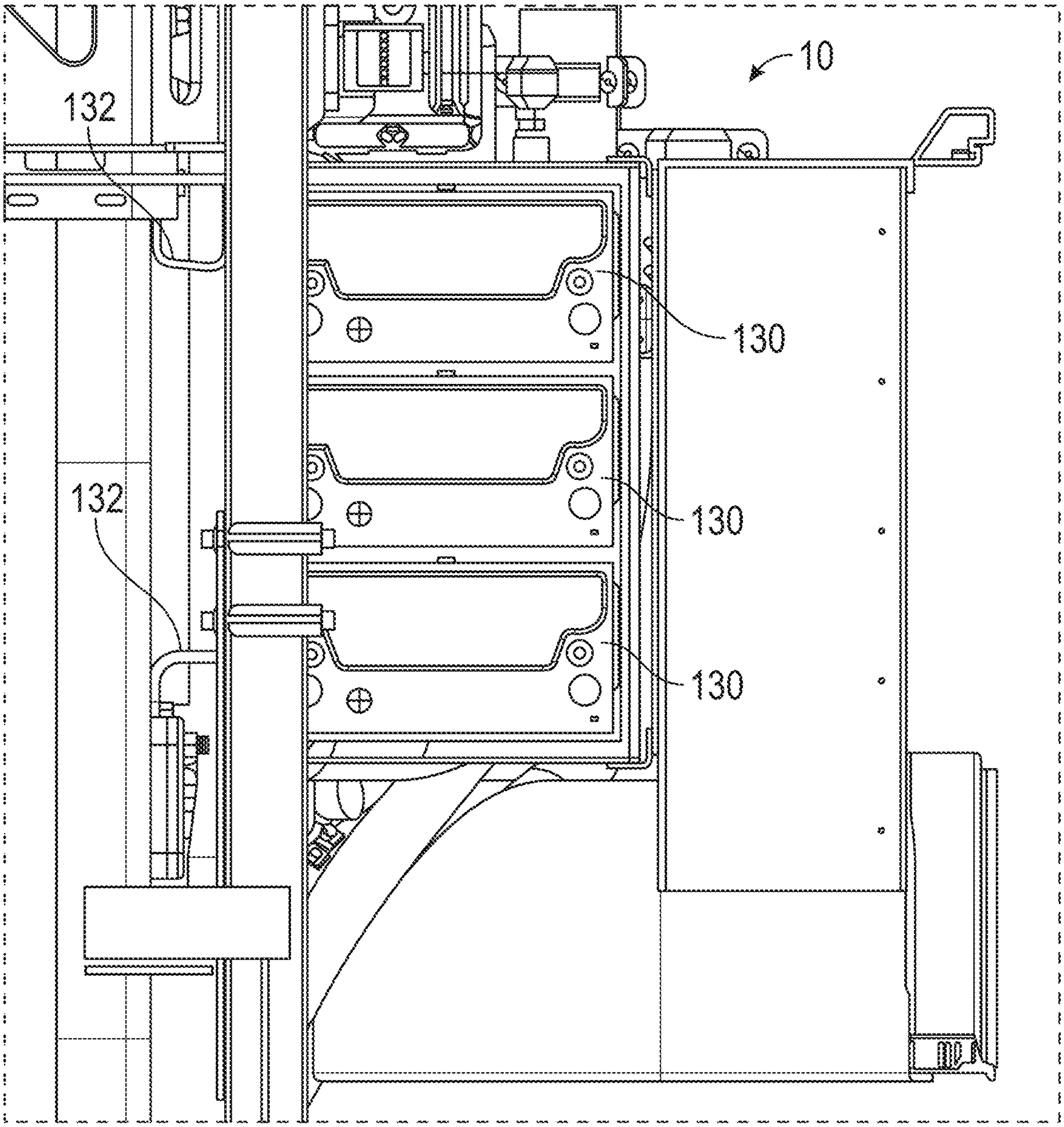
FIG. 22 is a top view of the battery of FIG. 11 coupled with the frame of FIG. 7, according to an exemplary embodiment.

As shown in FIGS. 7-9, 19, and 22, a support (e.g., bracket, mount, etc.), shown as battery support 132, is configured to support the battery 130 and facilitate coupling the battery 130 with the frame 12 of the vehicle 10. As shown in FIG. 22, the battery 130 (or a plurality of battery cells of the battery 130) is supported by the battery support 132 such that the battery 130 extends in a lateral direction substantially perpendicular to a longitudinal length of the frame 12. In some embodiments, the battery support 132 is configured to support the battery 130 such that the battery 130 extends substantially parallel with the longitudinal length of the frame 12. As shown in FIGS. 7-9, 19, and 22, the battery 130 and the battery support 132 are positioned along the frame 12 longitudinally between a front of the vehicle 10 and a rear of the vehicle 10 and along a lateral outer surface of the frame 12 (e.g., a laterally exterior facing surface of the frame 12). In some embodiments, the battery 130 and the battery support 132 are positioned along a lateral inner surface of the frame 12 (e.g., a laterally interior facing surface of the frame 12). In some embodiments, the battery 130 and the battery support 132 are coupled to one or more components of the vehicle 10 other than the frame 12. By way of example, the battery support 132 may be coupled with the front cabin 20, the rear section 30, or another component of the vehicle 10 to facilitate coupling the battery 130 thereto. As shown in FIGS. 7-9, 19, and 22, the battery 130 and the battery support 132 are positioned longitudinally between the engine 112 and the exhaust system 150 (e.g., rearward relative to the engine 112 and forward relative to the exhaust system 150). In some embodiments, the battery 130 and the battery support 132 are otherwise longitudinally positioned along the length of the frame 12. By way of example, the battery 130 and the battery support 132 may be positioned forward relative to the engine 112. By way of another example, the battery 130 and the battery support 132 may be positioned rearward relative to the exhaust system 150. As shown in FIGS. 7-9, 19, and 22, the battery 130 and the battery support 132 are coupled to the frame 12 along a left side of the vehicle 10 (e.g., along a left frame member of the frame 12). In some embodiments, the battery 130 and the battery support 132 are coupled to the frame 12 along a right side of the vehicle 10 (e.g., along a right frame member of the frame 12). In some embodiments, the vehicle 10 includes a plurality of batteries 130 and battery supports 132 variously positioned about the vehicle 10.

As shown in FIGS. 1, 2, 4-6, 17, and 29-31, the pump system 140 is coupled to the frame 12 and positioned in a space, shown as gap 40, between the front cabin 20 and the rear section 30. In another embodiment, the pump system 140 is otherwise positioned (e.g., within the rear section 30, etc.). As shown in FIGS. 1, 2, 4-6, and 29-31, the pump system 140 includes a frame assembly, shown as pump house 142, coupled to the frame 12 and a pump assembly, shown as pump 144, disposed within and supported by the pump house 142. In some embodiments, the pump 144 includes an interface (e.g., an input, etc.) that engages (directly or indirectly) with subsystem interface of the transmission 120. The transmission 120 may thereby drive the pump 144 to pump a fluid from a source (e.g., an on-vehicle fluid source, an off-vehicle fluid source, an on-board water tank, an on-board agent tank, a fire hydrant, an open body of water, a tanker truck, etc.) to one or more fluid outlets on the vehicle 10 (e.g., a structural discharge, a hose reel, a turret, a high reach extendible turret ("HRET"), etc.).

Exhaust System

According to an exemplary embodiment, the exhaust system 150 is configured to receive exhaust gas produced by the engine 112, and treat the exhaust gas before releasing it to the atmosphere. Treating the exhaust gas may include chemically and physically removing, reducing, converting, etc., pollutants (e.g., nitrogen oxides ("NOx"), carbon dioxde ("$CO_2$"), carbon monoxide ("CO"), hydrocarbons ("HC"), particulate matter ("PM"), etc.) in the exhaust gas from the engine 112. As shown in FIGS. 10, 18, 31, 33, and 36, the exhaust system 150 is positioned rearward relative to the engine 112 and, at least partially, below the front cabin 20 and the rear section 30. In some embodiments, a first portion of the exhaust system 150 is positioned below the front cabin 20 and a second portion of the exhaust system 150 is positioned below the rear section 30. As shown in FIGS. 7-10, 15, 18, and 29-36, the exhaust system 150 is configured to couple to and be supported by the frame 12 such that the exhaust system 150 is positioned, at least partially, below the frame 12. In some embodiments, the exhaust system 150 is coupled to the frame 12 using one or more fasteners (e.g., bolts, screws, brackets, mounts, etc.). In other embodiments, the exhaust system 150 is otherwise coupled to the frame 12 (e.g., welded to the frame 12). As shown in FIGS. 7-10, 12-18, and 32-36, the exhaust system 150 includes a first exhaust pipe (e.g., conduit, manifold, tube, exhaust gas line, downpipe, front pipe, etc.), shown as inlet pipe 154, configured to fluidly couple the engine 112 with the exhaust system 150; a first catalytic device (e.g., diesel oxidation catalyst ("DOC")), shown as DOC 158; a diesel particulate filter ("DPF"), shown as DPF 162; a second catalytic device (e.g., selective catalytic reduction catalyst ("SCR")), shown as SCR 166; a diesel exhaust fluid ("DEF") tank, shown as DEF tank 170; and an exhaust heating system, shown as thermal management system 180. In some embodiments, the exhaust system 150 includes two or more DOCs 158, DPFs 162, SCRs 166, DEF tanks 170, and/or thermal management systems 180. In some embodiments, the exhaust system 150 includes more or fewer components.

As shown in FIGS. 10, 11, 16, 18, 32, and 34-36, the inlet pipe 154 is configured to fluidly couple the engine 112 to the exhaust system 150. The inlet pipe 154 may include one or more straight or bent sections of pipe. The inlet pipe 154 is configured to couple to an outlet of the engine 112 and an inlet (e.g., the first housing inlet 192) of a housing (e.g., the first housing 190) configured to receive the DOC 158 and the DPF 162. The inlet pipe 154 directs the exhaust gas created and expelled by the engine 112 to the exhaust system 150 to be treated thereby.

As shown in FIGS. 7, 9, 12, 13, 15, and 16, the DOC 158 is configured to receive the exhaust gas (e.g., the exhaust gas from the engine 112 and supplied to the exhaust system 150 and the DOC 158 by the inlet pipe 154). The DOC 158 includes a catalytic converter configured to facilitate (e.g., initiate) one or more chemical reactions (e.g., oxidation reactions) with the exhaust gas to reduce CO, HC, and PM in the exhaust gas. The hot exhaust gas may pass over a substrate (e.g., a high-surface area substrate coated in a catalyst such as a platinum metal catalyst) of the DOC 158 and one or more pollutants in the exhaust gas (e.g., CO, HCs, a soluble organic fraction of the PMs) may be converted into carbon dioxide and water. In some embodiments, heat is generated as a product of the chemical reactions within the DOC 158 and is retained in the exhaust system 150 by the thermal management system 180 to help facilitate efficient operation of the exhaust system 150. In some embodiments, the exhaust system 150 includes two or more DOCs 158 (e.g., arranged in parallel, in series, etc.).

As shown in FIGS. 7, 9, 12, 13, 15, and 16, the DPF 162 is configured to receive the exhaust gas (e.g., the exhaust gas having passed through the DOC 158). The DPF 162 includes one or more filters configured to trap (e.g., filter, separate, remove, reduce, etc.) PM from the exhaust gas as the exhaust gas passes through the DPF 162. After trapping the PM, the DPF 162 may retain the PM such that the PM does not reenter the exhaust gas from which the PM was removed. In some embodiments, the exhaust system 150 includes two or more DPFs 162 (e.g., arranged in parallel, in series, etc.).

As shown in FIGS. 7-9, 12, and 14-16, the SCR 166 is configured to receive the exhaust gas (e.g., the exhaust gas having passed through the DOC 158 and the DPF 162). The SCR 166 is configured to remove (e.g., reduce) NOx from the exhaust gas passing therethrough. In some embodiments, the exhaust system 150 includes an ammonia slip catalyst ("ASC") configured to remove excess ammonia that may be present in the exhaust gas after passing through the SCR 166. In other embodiments, the exhaust system 150 does not includes the ASC. As shown in FIGS. 7-9, 12, and 14-16, the SCR 166 is a dual SCR system including two SCRs 166 (e.g., a first SCR 166 and a second SCR 166) arranged in parallel. In some embodiments, the exhaust system 150 is not a dual SCR system and includes a single SCR 166.

Figure 23:
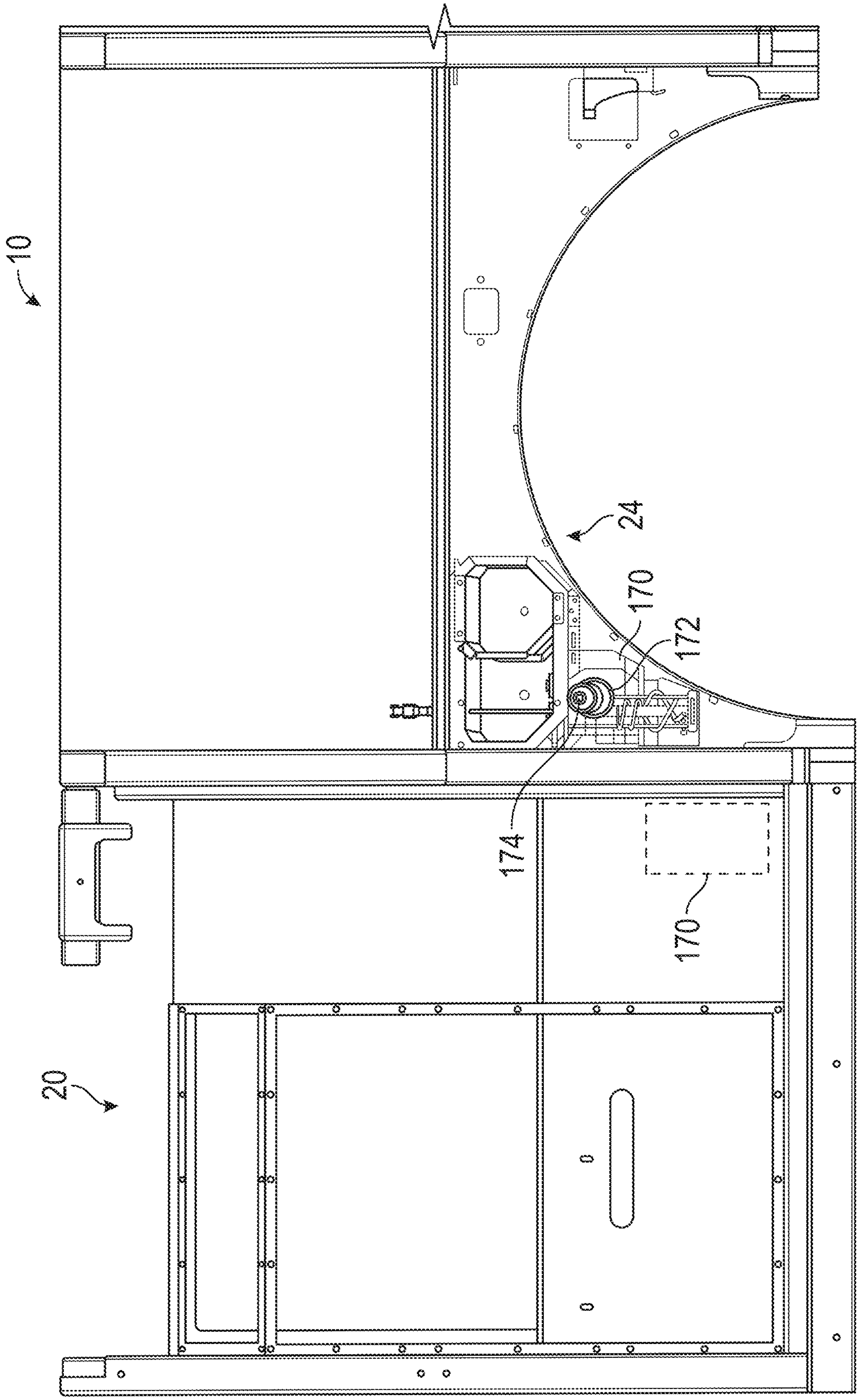
FIG. 23 is a left side view of a DEF tank of the exhaust system of FIG. 7 positioned within a front wheel well of the fire fighting vehicle of FIG. 1, according to an exemplary embodiment.
Figure 24:
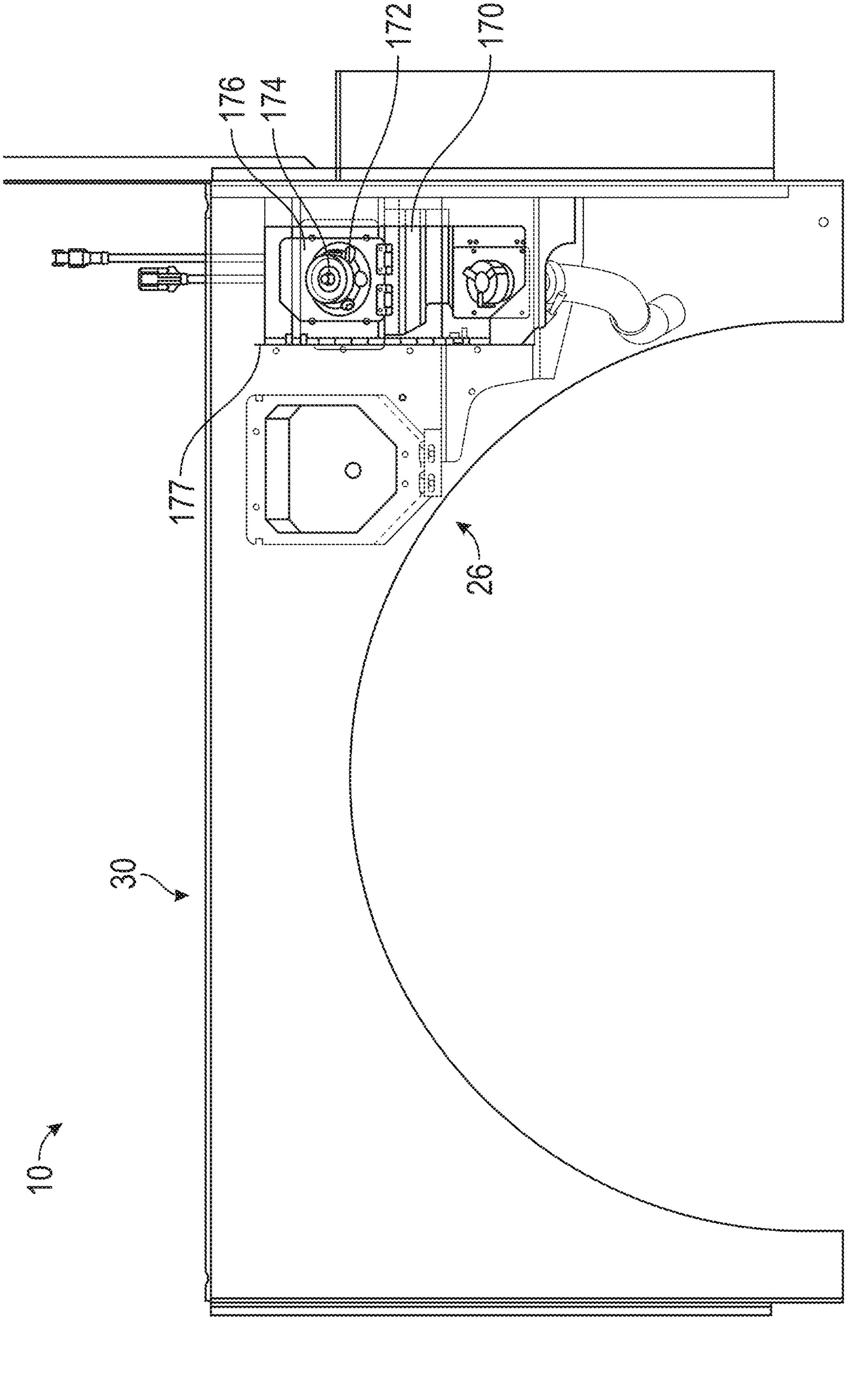
FIG. 24 is a left side view of a DEF tank of the exhaust system of FIG. 7 positioned within a rear wheel well of the fire fighting vehicle of FIG. 1, according to an exemplary embodiment.

As shown in FIGS. 23 and 24, the DEF tank 170 is configured to store a supply of DEF. The DEF may include an aqueous urea solution configured to chemically react with pollutants in the exhaust gas stream and convert them to nitrogen and water. According to the embodiment shown in FIG. 23, the DEF tank 170 is positioned within the front wheel well 22 of the vehicle 10 along a wall of the front wheel well 22 closest to a front end of the vehicle 10. The DEF tank 170 may be positioned forward relative to the front axle 14 and positioned, at least partially, forward relative to the wheels 18 coupled to the front axle 14. In some embodiments, the DEF tank 170 is positioned rearward relative to the front axle 14 and positioned, at least partially, rearward relative to the wheels 18 coupled to the front axle 14. In some embodiments, the DEF tank 170 is positioned outside of and forward relative to the front wheel well 22. By way of example, the DEF tank 170 may be positioned below the interior 24 of the front cabin 20 (e.g., under a stairwell/stairs of the front cabin 20). As shown in FIG. 23, the DEF tank 170 is positioned within the front wheel well 22 along the left side of the vehicle 10. In some embodiments, the DEF tank 170 is positioned within the front wheel well 22 along the right side of the vehicle 10. According to the embodiment shown in FIG. 24, the DEF tank 170 is positioned within the rear wheel well 24 of the vehicle 10 along a wall of the rear wheel well 24 closest to a rear end of the vehicle 10. The DEF tank 170 may be positioned rearward relative to the rear axle 16 and positioned, at least partially, rearward relative to the wheels 18 coupled to the rear axle 16. In some embodiments, the DEF tank 170 is positioned forward relative to the rear axle 16 and positioned, at least partially, forward relative to the wheels 18 coupled to the rear axle 16. In some embodiments, the DEF tank 170 is positioned outside of and forward or rearward relative to the rear wheel well 24. As shown in FIG. 24, the DEF tank 170 is positioned within the rear wheel well 24 along the left side of the vehicle 10. In some embodiments, the DEF tank 170 is positioned within the rear wheel well 24 along the right side of the vehicle 10. In some embodiments, the DEF tank 170 is rotomolded out of plastic. In other embodiments, the DEF tank 170 is manufactured using another suitable method and/or out of another suitable material (e.g., stainless steel) to resist corrosion from the DEF.

As shown in FIGS. 23 and 24, the DEF tank 170 includes an opening (e.g., inlet), shown as DEF tank opening 172, and a cap (e.g., lid, cover, etc.), shown as DEF tank cap 174, selectively coupled to the DEF tank opening 172 to provide selective access to the DEF tank 170. An operator may remove the DEF tank cap 174 to provide DEF through the DEF tank opening 172 to fill the DEF tank 170. As shown in FIG. 24, the vehicle 10 includes a first door, shown as deflector 176, configured to move (e.g., pivot, rotate, translate, etc.) relative to the vehicle 10 between a first position and a second position. In the first position shown in FIG. 24, the deflector 176 is positioned to (i) inhibit access to the DEF tank opening 172 and the DEF tank cap 174 of the DEF tank 170 and (ii) permit access to a fuel cap by which to refuel the vehicle 10 (e.g., with diesel fuel, gasoline, etc.). In the second position, the deflector 176 is positioned to (i) permit access to the DEF tank opening 172 and the DEF tank cap 174 of the DEF tank 170 and (ii) inhibit access to the fuel cap, thereby helping to facilitate filling an intended tank (e.g., a fuel tank or the DEF tank 170) with an intended fluid (e.g., diesel or the DEF). By way of example, the deflector 176 may help prevent unintentionally filling the DEF tank 170 with fuel and unintentionally filling the fuel tank with the DEF. In some embodiments, the vehicle 10 does not include the deflector 176. As shown in FIG. 24, the vehicle 10 includes a second door, shown as access door 177, configured to move relative to the vehicle 10 between a first position (e.g., an open position) and a second position (e.g., a closed position). In the first position shown in FIG. 24, the access door 177 is positioned to permit access to the deflector 176, the DEF tank cap 174, and the fuel cap. In the second position, the access door 177 is positioned to inhibit access to the DEF tank cap 174 and the fuel cap.

Figure 12:
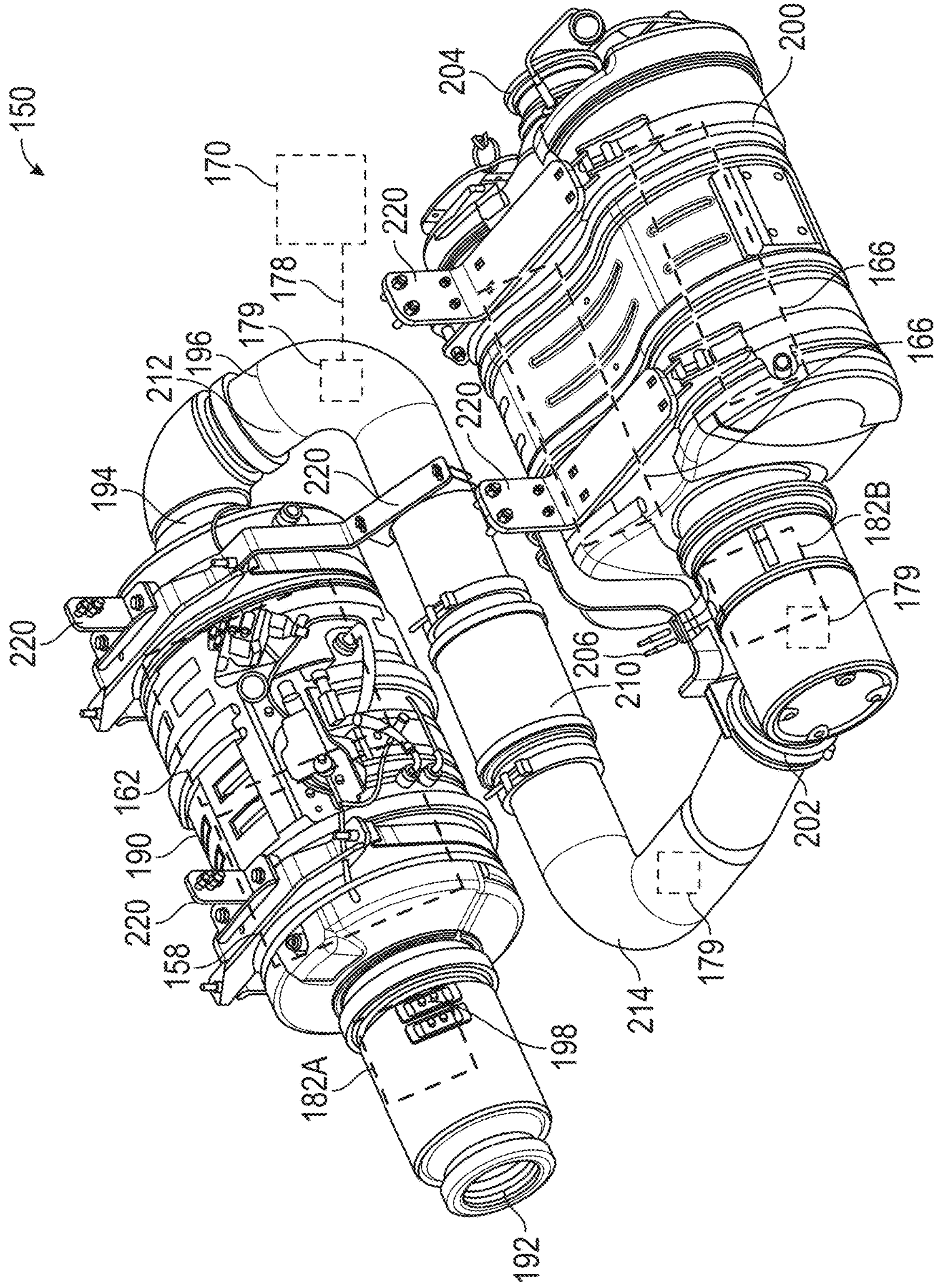
FIG. 12 is a perspective view of the exhaust system of FIG. 7, according to an exemplary embodiment.
Figure 28:
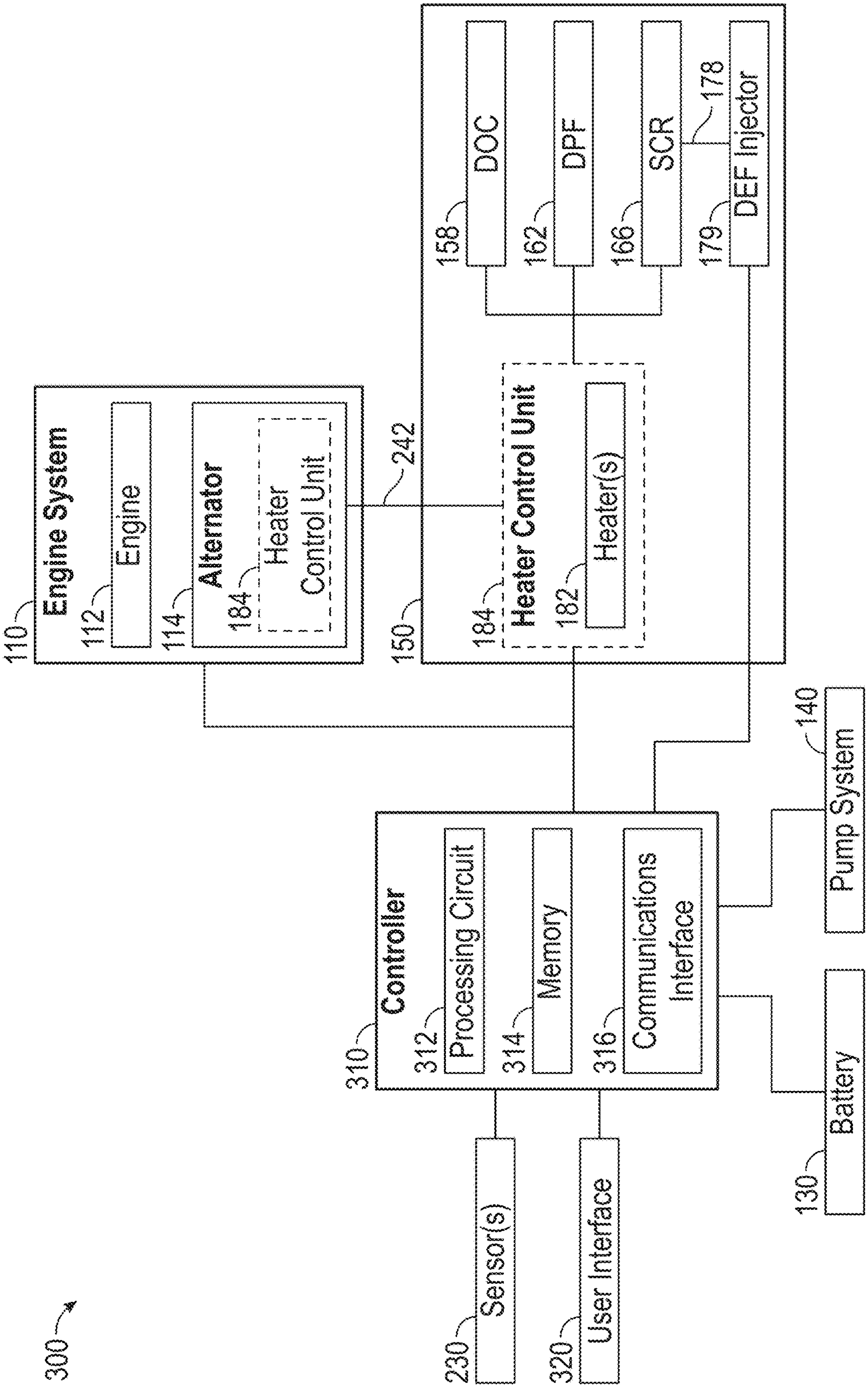
FIG. 28 is a schematic diagram of a control system of the fire fighting vehicle of FIG. 1, according to an exemplary embodiment.

As shown in FIG. 12, the exhaust gas is configured to receive DEF from the DEF tank 170 via a fluid supply line (e.g., pipe, conduit, manifold, etc.), shown as a DEF supply line 178. As shown in FIGS. 12 and 28, the exhaust system 150 includes an injector (e.g., nozzle, atomizer, etc.), shown as DEF injector 179, fluidly coupled to the DEF tank 170 via the DEF supply line 178 and configured to inject DEF into the exhaust gas. By way of example, the DEF injector 179 may inject DEF into the flow of exhaust gas before it passes through the SCR 166 (e.g., upstream of the SCR 166).

Figure 13:
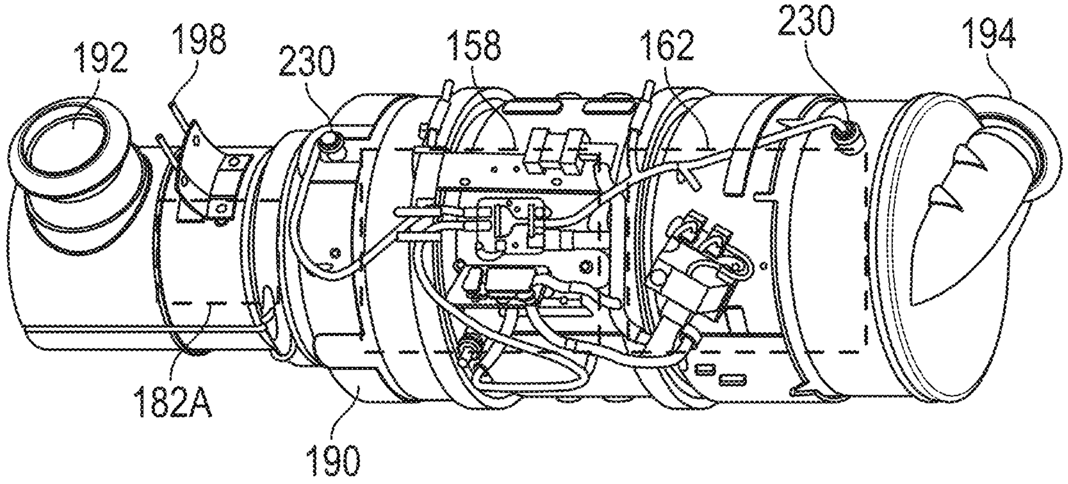
FIG. 13 is a perspective view of a first housing including a DPF and a DOC of the exhaust system of FIG. 7, according to an exemplary embodiment.
Figure 14:
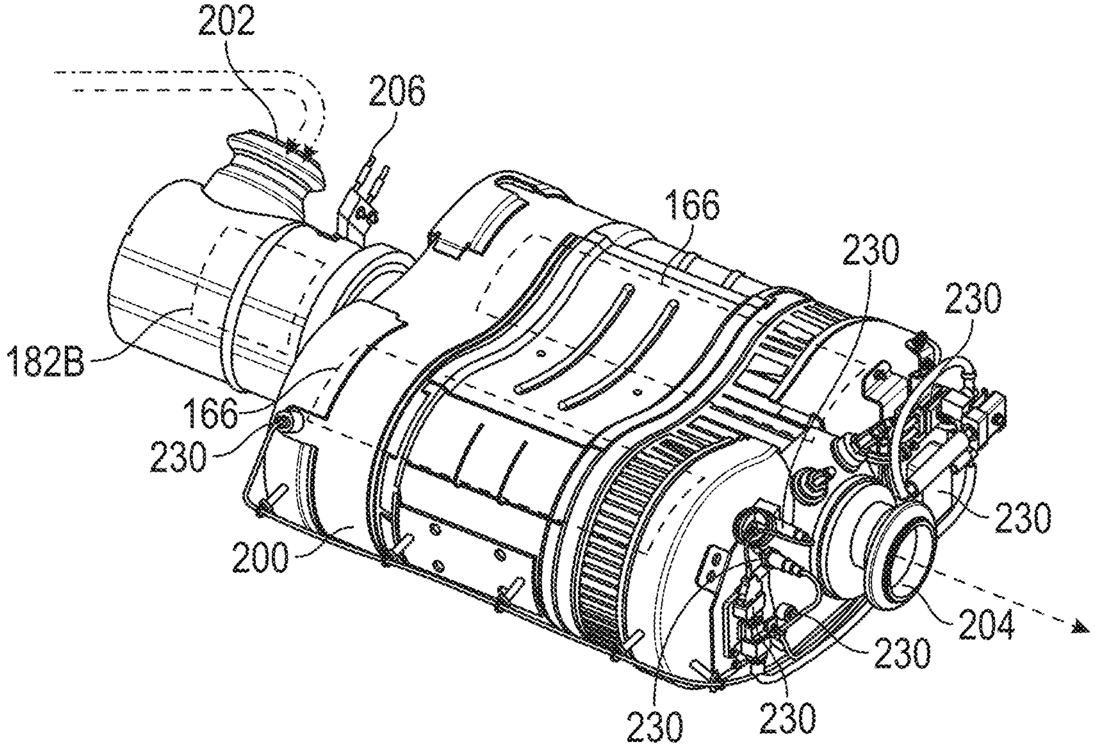
FIG. 14 is a perspective view of a second housing including a SCR of the exhaust system of FIG. 7, according to an exemplary embodiment.
Figure 15:
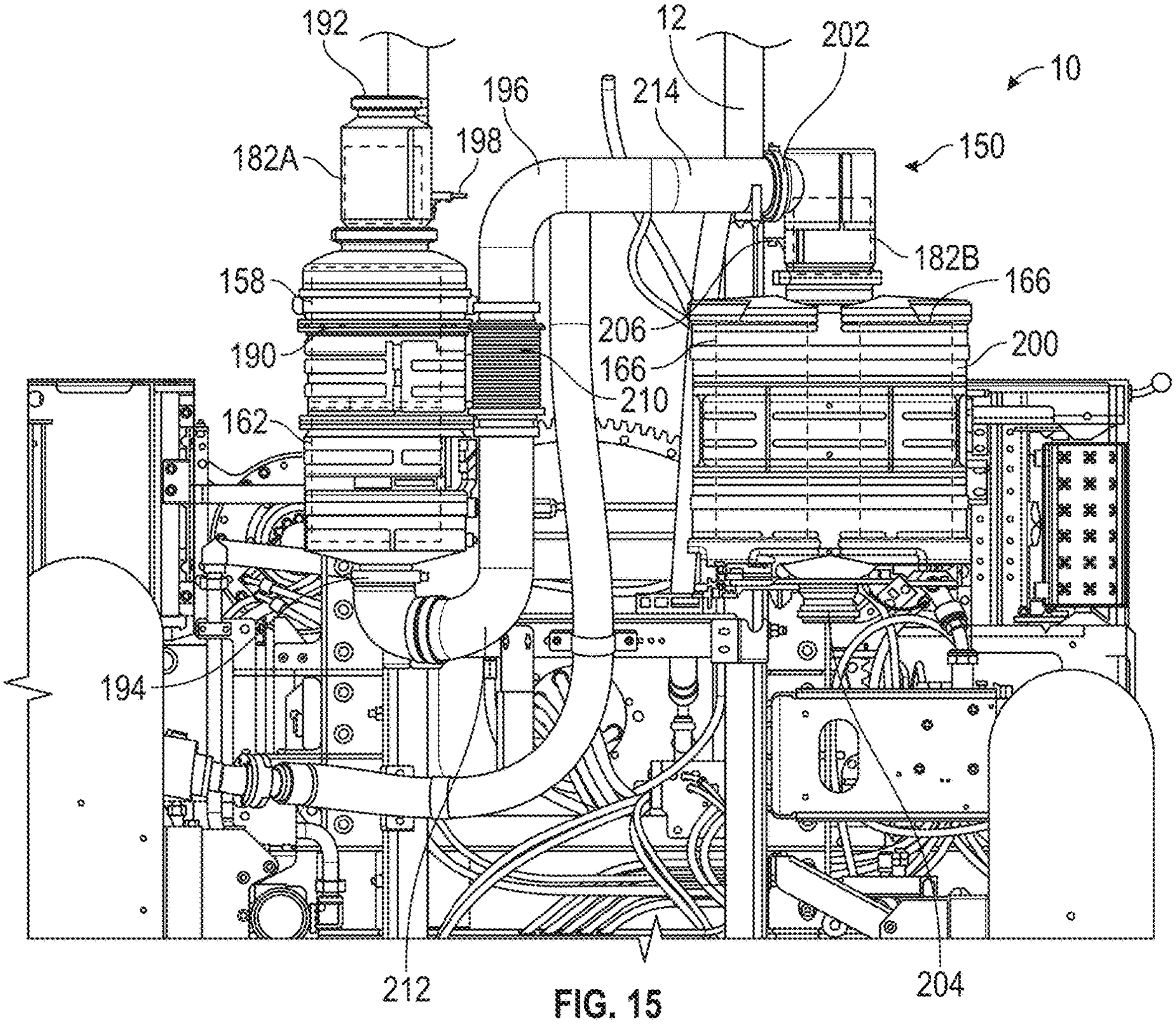
FIG. 15 is a bottom view of the frame and the exhaust system of FIG. 7, according to an exemplary embodiment.

As shown in FIGS. 7-9, 12-15, 19-21, and 28-38, the thermal management system 180 includes one or more heaters (e.g., electric heaters, resistance heaters, etc.), shown as heaters 182, and a heater controller, shown as heater control unit 184. The heaters 182 are configured to transfer thermal energy to the exhaust gas passing through the exhaust system 150 to heat the exhaust gas and/or to the components of the exhaust system 150 to heat the components of the exhaust system 150. As shown in FIGS. 12-15, 37, and 38, the thermal management system 180 includes a first heater 182A and a second heater 182B. In some embodiments, the thermal management system 180 includes more or fewer heaters 182 than the first heater 182A and the second heater 182B. As shown in FIGS. 12, 13, and 15, the first heater 182A is positioned proximate the DOC 158 and the DPF 162 (e.g., within the first housing 190). The first heater 182A is configured to heat the exhaust gas, the DOC 158, and/or the DPF 162 before the exhaust gas passes through the DOC 158 and the DPF 162. In some embodiments, the thermal management system 180 includes more or fewer heaters 182 positioned proximate the DOC 158 and/or the DPF 162 (e.g., upstream and/or downstream thereof). As shown in FIGS. 12, 14, and 15, the second heater 182B is positioned proximate the SCR 166 (e.g., within the second housing 200). The second heater 182B is configured to heat the exhaust gas and/or the SCR 166 before the exhaust gas passes through the SCR 166. In some embodiments, the thermal management system 180 includes more or fewer heaters 182 positioned proximate the SCR 166 (e.g., upstream and/or downstream thereof). By way of example, the thermal management system 180 may include one or more heaters 182 positioned at the first housing inlet 192, at the first housing outlet 194, along the intermediate pipe 196, and/or at the second housing inlet 202. Heating the exhaust gas and/or the DOC 158, the DPF 162, and/or the SCR 166 with the heaters 182 may help improve the efficiency of the operations of the DOC 158, the DPF 162, and/or the SCR 166. In some embodiments, the chemical reactions of the exhaust gas facilitated by the DOC 158, the DPF 162, and/or the SCR 166 take place when the exhaust gas is and/or the DOC 158, the DPF 162, and/or the SCR 166 are at or greater than a temperature threshold. In such embodiments, when the temperature of the exhaust gas and the DOC 158, the DPF 162, and/or the SCR 166 are below the temperature threshold, the chemical reactions may not take place or may not be as efficient (e.g., incomplete oxidation, unburned hydrocarbons, etc.). In other words, when the temperature of the exhaust gas is and/or the DOC 158, the DPF 162, and/or the SCR 166 are below the temperature threshold, the exhaust system 150 may convert or reduce less pollutants than if the temperature of the exhaust gas and/or the DOC 158, the DPF 162, and/or the SCR 166 were at or greater than the temperature threshold. Accordingly, the heaters 182 may heat the exhaust gas and/or the DOC 158, the DPF 162, and/or the SCR 166 to help improve the efficiency of the operations of the DOC 158, the DPF 162, and/or the SCR 166. By way of example, the temperature of the exhaust gas during cold starts of the engine 112, low engine load conditions, cold outdoor temperatures, or other low exhaust gas temperature conditions may be below the temperature threshold. In such an example, the exhaust system 150 may operate the heaters 182 to heat the exhaust gas and/or the DOC 158, the DPF 162, and/or the SCR 166 to enable efficient chemical reactions by the DOC 158, the DPF 162, and/or the SCR 166.

Figure 20:
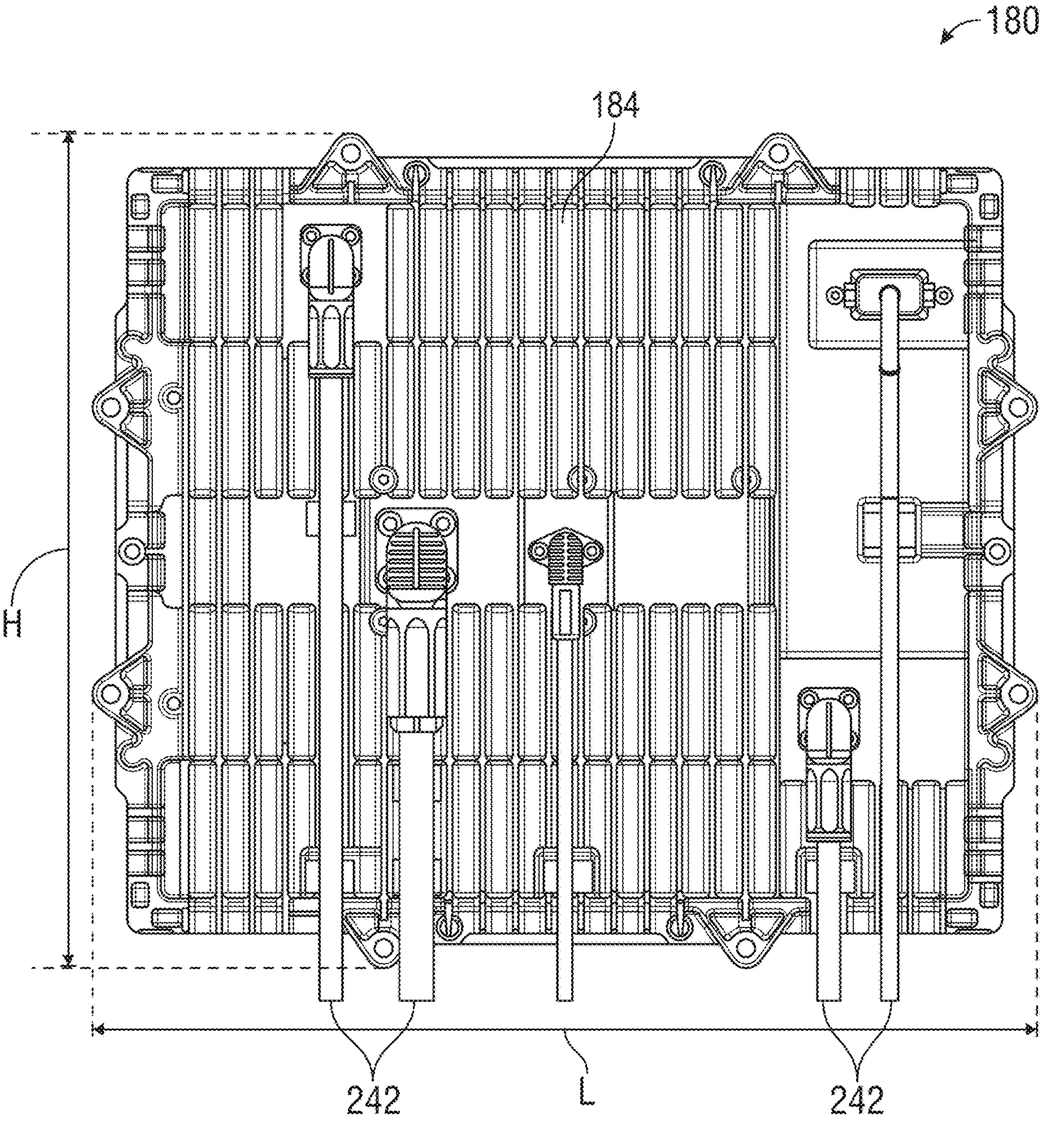
FIG. 20 is a front view of a heater of the thermal management system of FIG. 19, according to an exemplary embodiment.
Figure 21:
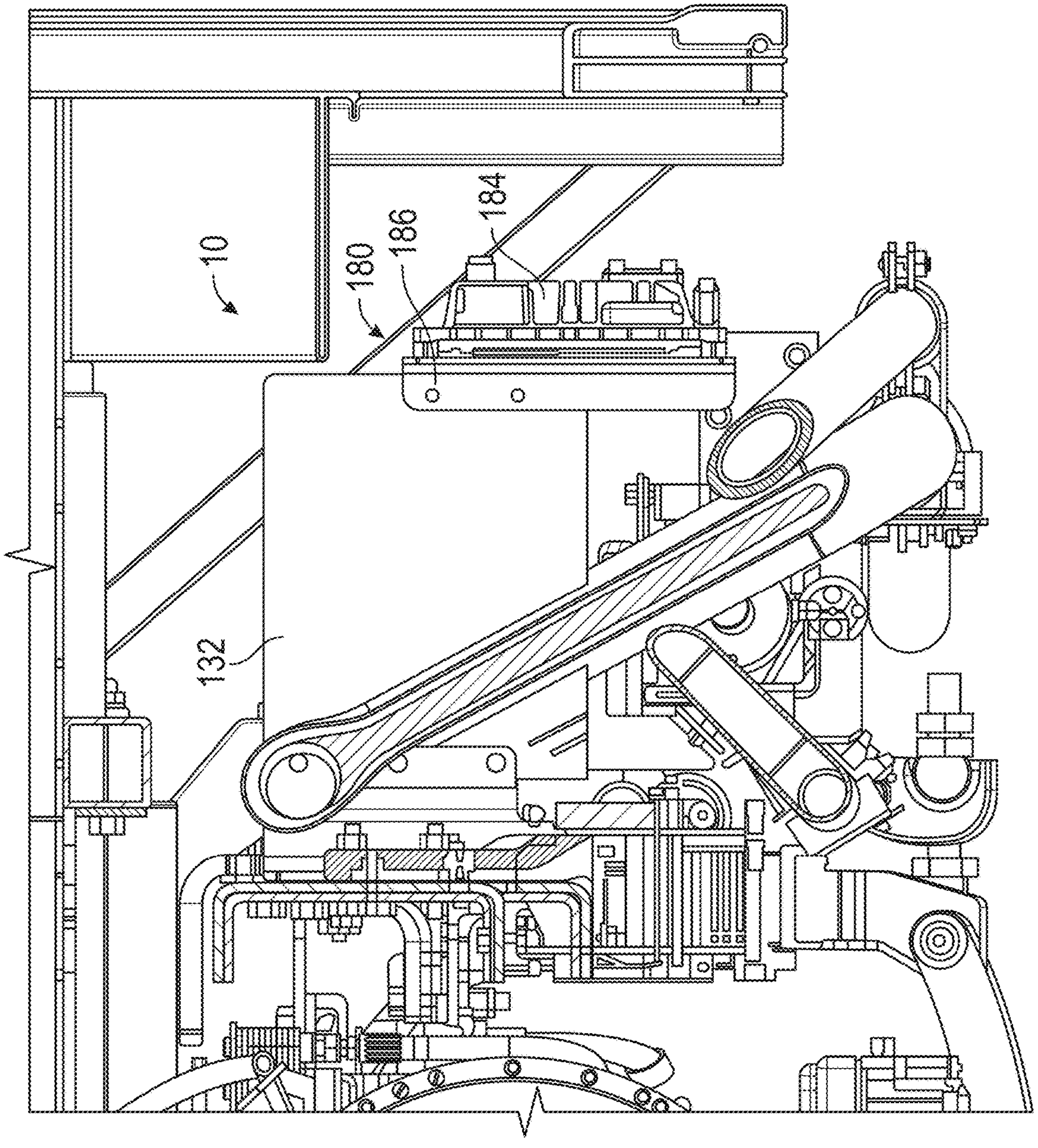
FIG. 21 is a front view of the thermal management system of FIG. 19, according to an exemplary embodiment.

As shown in FIG. 20, the heater control unit 184 defines a heater control unit ("HCU") height H and a HCU length L. In some embodiments, the HCU height H is about 381.5 millimeters ("mm"). In other embodiments, the HCU height H is greater or less than 381.5 mm (e.g., 200 mm, 250 mm, 300 mm, 350 mm, 400 mm, 450 mm, 500 mm, etc.). In some embodiments, the HCU length L is about 430.5 mm. In other embodiments, the HCU length L is greater or less than 430.5 mm (e.g., 300 mm, 350 mm, 400 mm, 450 mm, 500 mm, 550 mm, etc.). The heater control unit 184 is electrically coupled with the heaters 182 and is configured to transfer electrical energy to the heaters 182 to facilitate heating the exhaust gas passing through the exhaust system 150. In some embodiments, the heater control unit 184 is configured to transfer about 10 kilowatts ("kW") of power to the heaters 182 to heat the exhaust gas and/or to the components of the exhaust system 150. In other embodiments, the heater control unit 184 is configured to transfer more or less than 10 kW of power to the heaters 182 to heat the exhaust gas and/or to the components of the exhaust system 150 (e.g., 1 kW, 5 kW, 15 kW, 20 kW, etc.). In still other embodiments, the heater control unit 184 is otherwise suitably dimensioned and/or rated.

As discussed in greater detail below with respect to FIG. 28, the heater control unit 184 is configured to receive sensor data indicative of the temperature of the exhaust gas (e.g., before passing through the first housing 190, before passing through the second housing 200, etc.). The heater control unit 184 is configured to control operation of the heaters 182 based on the sensor data to heat the exhaust gas and/or the DOC 158, the DPF 162, and/or the SCR 166 to facilitate efficient operations of the DOC 158, the DPF 162, and/or the SCR 166. In some embodiments, the thermal management system 180 does not include the heater control unit 184, and the heaters 182 are controlled by a controller (e.g., controller 310) of the vehicle 10. In such embodiments, the alternator 114 may provide power to the heaters 182 to facilitate heating the exhaust gas passing through the exhaust system 150. In other embodiments, the heater control unit 184 is integrated into the alternator 114.

As shown in FIGS. 7, 8, 19, and 21, the thermal management system 180 includes a support (e.g., bracket, mount, etc.), shown as HCU support 186, configured to support the heater control unit 184 and facilitate coupling the heater control unit 184 with the frame 12 of the vehicle 10. As shown in FIGS. 7, 8, 19, and 21, the HCU support 186 is coupled to the battery support 132. In some embodiments, the HCU support 186 is coupled directly to the frame 12. As shown in FIGS. 7, 8, 19, and 21, the heater control unit 184 and the HCU support 186 are positioned along a lateral outer surface of the battery 130 and extends, at least partially, vertically lower than the battery 130. In some embodiments, the heater control unit 184 and the HCU support 186 are coupled to one or more components of the vehicle 10 other than the battery support 132. By way of example, the HCU support 186 may be coupled with the front cabin 20, the rear section 30, or another component of the vehicle 10 to facilitate coupling the heater control unit 184 thereto. As shown in FIGS. 7, 8, 19, and 21, the heater control unit 184 and the HCU support 186 are positioned longitudinally between the engine 112 and the DOC 158, the DPF 162, and the SCR 166 (e.g., rearward relative to the engine 112 and forward relative to the DOC 158, the DPF 162, and the SCR 166). In some embodiments, the heater control unit 184 and the HCU support 186 are otherwise longitudinally positioned along the length of the frame 12. By way of example, the heater control unit 184 and the HCU support 186 may be positioned forward relative to the engine 112. By way of another example, the heater control unit 184 and the HCU support 186 may be positioned rearward relative to the DOC 158, the DPF 162, and the SCR 166. As shown in FIGS. 7, 8, 19, and 21, the heater control unit 184 and the HCU support 186 are coupled with the frame 12 along a left side of the vehicle 10 (e.g., along a left frame member of the frame 12). In some embodiments, the heater control unit 184 and the HCU support 186 are coupled with the frame 12 along a right side of the vehicle 10 (e.g., along a right frame member of the frame 12). In some embodiments, the exhaust system 150 includes a plurality of heater control units 184 and HCU supports 186 variously positioned about the vehicle 10. By way of example, the exhaust system 150 may include a heater control unit 184 configured to provide power to the first heater 182A to heat the exhaust gas upstream of the DOC 158 and the DPF 162 and a second heater control unit 184 configured to provide power to the second heater 182B to heat the exhaust gas upstream of the SCR 166 (and downstream of the DOC 158 and the DPF 162).

As shown in FIGS. 7-9, 12, 13, 15, 16, 18, 29, 32, and 34-36, the exhaust system 150 includes a first emission control portion, shown as first housing 190, defining an interior chamber in which the DOC 158 and the DPF 162 are disposed (e.g., received, positioned, etc.). The first housing 190 includes a first opening, shown as first housing inlet 192, configured to couple the inlet pipe 154 with the first housing 190. The first housing inlet 192 is configured to receive the exhaust gas from the inlet pipe 154 and direct the exhaust gas into the first housing 190 and through the DOC 158 and the DPF 162 disposed therein. The DOC 158 and the DPF 162 may be arranged in series such that the exhaust gas leaving the DOC 158 is passed directly to (e.g., without changing a direction of flow) and through the DPF 162. In some embodiments, the exhaust system 150 includes (i) a first DOC 158 arranged in series with a first DPF 162 and (ii) a second DOC 158 arranged in series with a second DPF 162, and the first DOC 158 and the first DPF 162 are arranged in parallel with the second DOC 158 and the second DPF 162. In such embodiments, the first housing 190 may include a manifold configured to split the flow of the exhaust gas such that a first volume of the exhaust gas is directed to the first DOC 158 and the first DPF 162 and a second volume of the exhaust gas is directed to the second DOC 158 and the second DPF 162.

As shown in FIGS. 7, 9, 12, 13, and 15, the first housing 190 includes a second opening, shown as first housing outlet 194, configured to direct the exhaust gas out of the first housing 190. As discussed in greater detail below, the first housing outlet 194 is configured to couple the first housing 190 with a second pipe, shown as intermediate pipe 196, such that the exhaust gas leaving the first housing 190 is supplied to and through the intermediate pipe 196.

As shown in FIGS. 7-9, 12, 13, and 15, the first housing 190 includes a first electrical connection interface (e.g., port, plug, etc.), shown as first heater terminal 198. The first heater terminal 198 is configured to facilitate electrically connecting the first heater 182A and the heater control unit 184 together. The first heater 182A is configured to receive electrical energy from the heater control unit 184 via the first heater terminal 198 to heat the exhaust gas flowing through the first housing 190. The first heater terminal 198 is positioned along an exterior surface of the first housing 190 proximate the first housing inlet 192. The first heater terminal 198 is positioned forward relative to the DOC 158 and the DPF 162 disposed within the first housing 190 such that the exhaust gas is heated before passing therethrough. In some embodiments, the first heater terminal 198 is otherwise positioned.

As shown in FIGS. 7-9, 12, 14, 15-18, 30-32, and 34-36, the exhaust system 150 includes a second emission control portion, shown as second housing 200, defining an interior chamber in which the SCR(s) 166 is(are) disposed (e.g., received, positioned, etc.). The interior chamber is structured to contain a dual SCR system such that a first SCR 166 and a second SCR 166 are disposed within the second housing 200. By way of example, the second housing 200 may include a manifold configured to split the flow of the exhaust gas such that a first volume of the exhaust gas is directed to the first SCR 166 and a second volume of the exhaust gas is directed to the second SCR 166. In embodiments with the exhaust system 150 including the ASC, the ASC is disposed in the second housing 200 with the SCRs 166. As shown in FIGS. 7-9, 12, 14, and 15, the second housing 200 includes a first opening, shown as second housing inlet 202, configured to couple the intermediate pipe 196 with the second housing 200. The second housing inlet 202 is configured to receive the exhaust gas (shown in FIG. 14 as a dashed line entering the second housing inlet 202) and the DEF (shown in FIG. 14 as a dash-dot-dot line entering the second housing inlet 202) and direct the exhaust gas-DEF mixture to the SCRs 166. The DEF may chemically react with pollutants in the exhaust gas and convert them to nitrogen and water. The second housing 200 includes a second opening, shown as second housing outlet 204, configured to direct the exhaust gas out of the second housing 200 (shown in FIG. 14 as a dashed line leaving the second housing outlet 204). As shown in FIG. 10, the exhaust system 150 includes a tail pipe, shown as outlet pipe 208, configured to couple to the second housing 200 via the second housing outlet 204. The exhaust gas exits the second housing 200 through the second housing outlet 204 and is directed through the outlet pipe 208. The outlet pipe 208 is configured to direct the exhaust gas in a direction away from the vehicle 10 (e.g., in a direction towards a rear end, left side, right side, etc., of the vehicle 10) and expel the exhaust gas to the atmosphere.

As shown in FIGS. 9, 12, 14, and 15, the second housing 200 includes a second electrical connection interface (e.g., port, plug, etc.), shown as second heater terminal 206. The second heater terminal 206 is configured to facilitate electrically connecting the second heater 182B and the heater control unit 184 together. The second heater 182B is configured to receive electrical energy from the heater control unit 184 via the second heater terminal 206 to heat the exhaust gas flowing through the second housing 200. The second heater terminal 206 is positioned along an exterior surface of the second housing 200 proximate the second housing inlet 202. The second heater terminal 206 is positioned forward relative to the SCRs 166 disposed within the second housing 200 such that the exhaust gas is heated before passing therethrough. In some embodiments, the second heater terminal 206 is otherwise positioned.

As shown in FIGS. 7-9, 12, 14, 15, 30, 32, and 34-36, the intermediate pipe 196 is configured to fluidly couple the first housing 190 including the DOC 158 and the DPF 162 with the second housing 200 including the SCRs 166. The exhaust gas is supplied to the intermediate pipe 196 after passing through the DOC 158 and the DPF 162, and the second housing inlet 202 is configured to receive the exhaust gas from the intermediate pipe 196, via the second housing inlet 202, and direct the exhaust gas into the second housing 200 and through the SCRs 166 disposed therein. In some embodiments, the intermediate pipe 196 includes the DEF injector 179 (or a port configured to receive the DEF injector 179) fluidly coupled to the DEF tank 170 and configured to inject DEF into the exhaust gas before the exhaust gas is supplied to the second housing 200. In other words, the DEF is injected into the exhaust gas upstream of the second housing 200 and the SCRs 166 disposed therein. In some embodiments, the DEF injector 179 is positioned along the intermediate pipe 196 proximate the first housing outlet 194 (e.g., upstream of the decoupler 210). In other embodiments, the DEF injector 179 is positioned along the intermediate pipe 196 proximate the second housing inlet 202 (e.g., downstream of the decoupler 210). In still other embodiments, the DEF injector 179 is positioned along or included in the second housing 200 to inject DEF into the exhaust gas before the exhaust gas passes through the SCRs 166.

As shown in FIGS. 7-9, 12, 15, 16, and 34-36, the intermediate pipe 196 includes a flex pipe section (e.g., conduit, manifold, etc.), shown as decoupler 210. The decoupler 210 is configured to couple a first portion, shown as first section 212, of the intermediate pipe 196 with a second portion, shown as second section 214, of the intermediate pipe 196. In some embodiments, the decoupler 210 is integrally formed with the first section 212 and the second section 214 such that the intermediate pipe 196 is a single, unitary body. The decoupler 210 may be manufactured from a material or may include a coating to limit chemical reactions between the decoupler 210 and the exhaust gas, DEF, ammonia, etc., flowing therethrough. By way of example, the decoupler 210 may be manufactured from stainless steel or another suitable material to limit chemical reactions between the decoupler 210 and the exhaust gas, DEF, ammonia, etc., flowing therethrough.

According to an exemplary embodiment, the decoupler 210 includes an accordion-style structure configured to expand, retract, and/or flex along a central axis of the decoupler 210. The structure of the decoupler 210 enables the decoupler 210 to permit relative motion between the first section 212 of the intermediate pipe 196 and the second section 214 of the intermediate pipe 196. In other words, the decoupler 210 is configured to permit relative motion between the first housing 190 and the second housing 200. Accordingly, the decoupler 210 facilitates variously positioning the first housing 190 and the second housing 200 relative to each other in a longitudinal direction. Similarly, during operation of the vehicle 10 (e.g., during driving operations, during pumping operations, etc.), the first housing 190 and the second housing 200 may move (e.g., vibrate, shake, etc.) with the vehicle 10. The decoupler 210 is configured to permit the relative motion between the first housing 190 and the second housing 200 to reduce wear, mechanical stress, torsional forces, etc., on the intermediate pipe 196 as a result of the movement of the first housing 190 and the second housing 200 caused by the operation of the vehicle 10 (e.g., as the vehicle 10 turns, drives over uneven terrain, etc.).

Other decouplers used in other aftertreatment systems may include areas such as ridges, valleys, crevices, etc., that are prone to undesirably collecting DEF as the exhaust gas-DEF mixture flows therethrough. The DEF collected in these areas may crystalize causing the DEF to harden on the decoupler. The decoupler 210 of the present disclosure may be structured to limit (e.g., reduce, inhibit, prevent, etc.) the DEF from collecting within the decoupler 210. Accordingly, in embodiments where the DEF is injected into the flow of the exhaust gas upstream of the decoupler 210, the decoupler 210 is configured to limit the DEF from being collected therein and thereby limit crystallization of the DEF.

Figure 17:
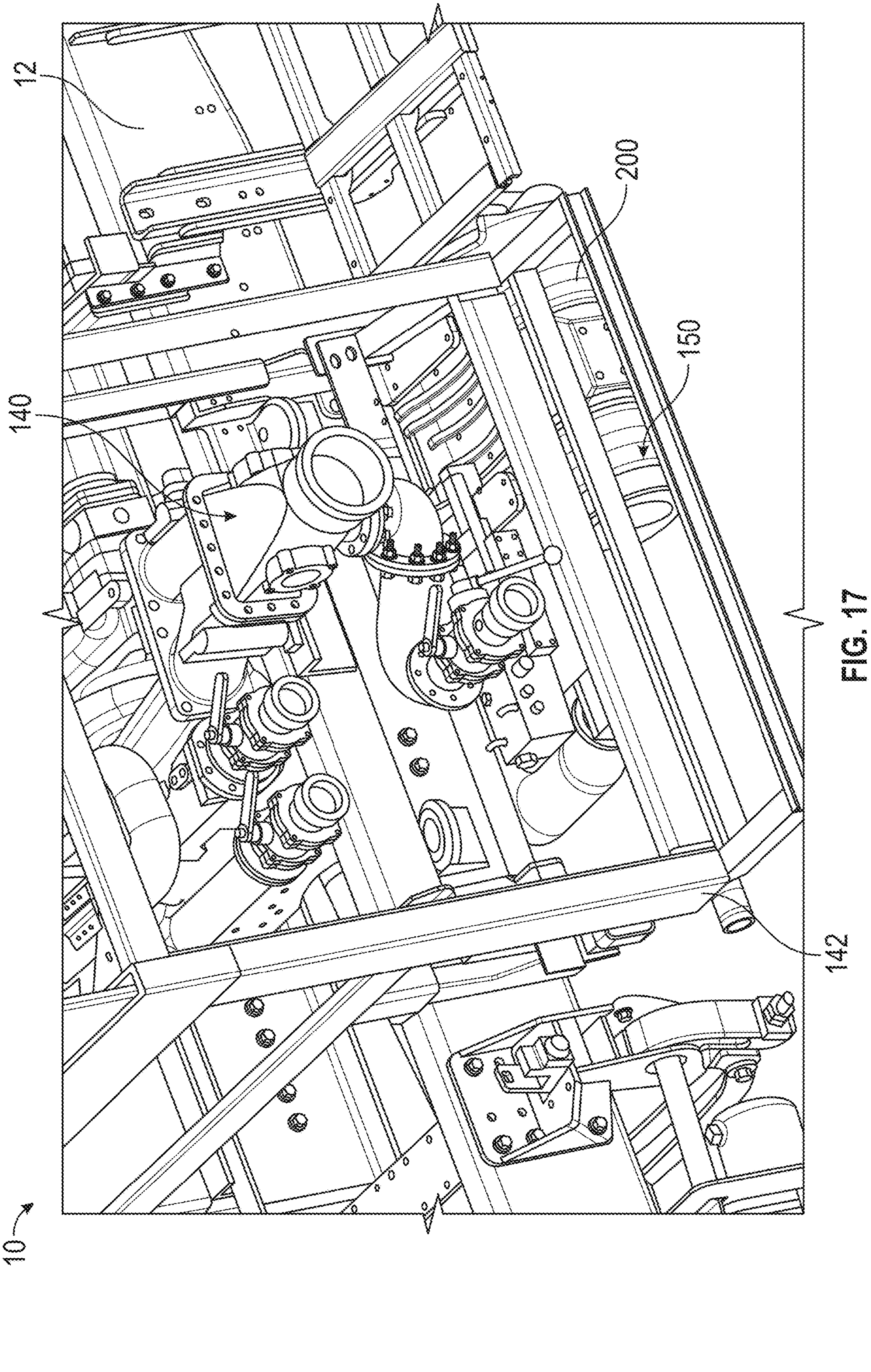
FIG. 17 is a perspective view of the exhaust system of FIG. 7 and the pump system of FIG. 11, according to an exemplary embodiment.
Figure 18:
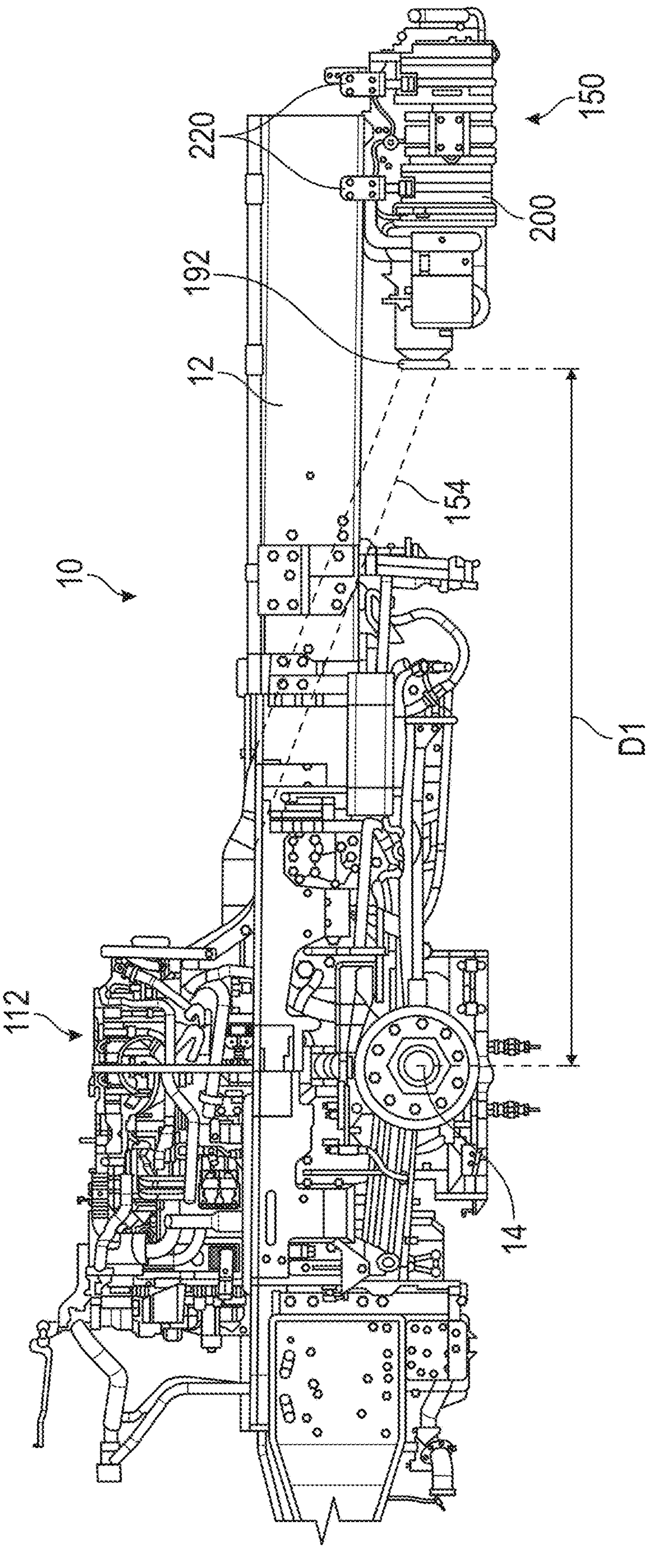
FIG. 18 is a left side view of the frame and the exhaust system of FIG. 7 and the engine system of FIG. 11, according to an exemplary embodiment.
Figure 19:
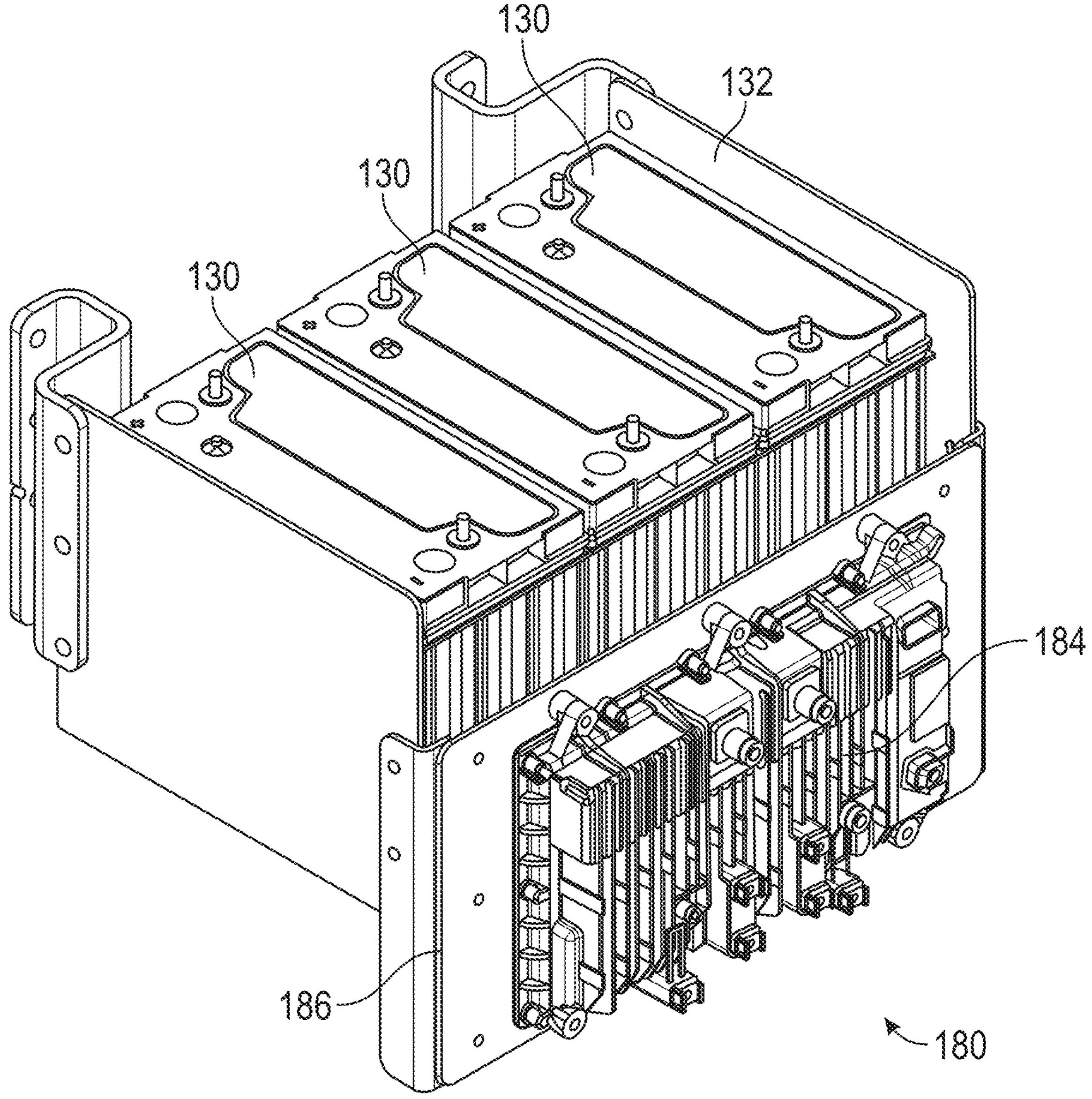
FIG. 19 is a perspective view of thermal management system of the exhaust system of FIG. 7, according to an exemplary embodiment.

As shown in FIGS. 10, 12, and 18, the exhaust system 150 includes brackets (e.g., fasteners, couplers, etc.), shown as exhaust system brackets 220, configured to couple the first housing 190 and the second housing 200 to the frame 12 of the vehicle 10. The exhaust system brackets 220 are coupled to the first housing 190 and the second housing 200 along top surfaces thereof and extend in a vertical direction to facilitate coupling the first housing 190 and the second housing 200 to the frame 12. In some embodiments, the exhaust system brackets 220 are otherwise suitably positioned along the first housing 190 and the second housing 200 to facilitate coupling the same to the frame 12. As shown in FIGS. 7-10, 12, 15, 17, 18, and 29-36, the first housing 190 and the second housing 200 are coupled to the frame 12 along a bottom surface thereof such that the first housing 190 and the second housing 200 are positioned vertically below the frame 12. The first housing 190 is coupled to a first frame rail (e.g., a right frame rail, frame rail 250) of the frame 12 and the second housing 200 is coupled to a second frame rail (e.g., a left frame rail, frame rail 250) of the frame 12 laterally adjacent to the first frame rail. In some embodiments, the second housing 200 is coupled to the first frame rail of the frame 12 and the first housing 190 is coupled to the second frame rail of the frame 12.

As shown in FIGS. 7-9, 12, 15, 16, 34, and 35, the intermediate pipe 196 extends laterally between the first housing 190 and the second housing 200. The intermediate pipe 196 may be coupled to the frame 12 and/or one or more other components of the vehicle 10 using one or more brackets, fasteners, couplers, etc. As shown in FIGS. 7-9, 12, 15, 34, and 35, the intermediate pipe 196 is particularly shaped such that the first section 212 extends from the first housing outlet 194 and bends to extend forward (e.g., in a direction towards the engine 112) to the decoupler 210, and the second section 214 extends forward from the decoupler 210 and bends to extend to the second housing inlet 202. In other words, the first section 212 includes a first portion coupled with the first housing outlet 194 and extending rearward in a rearward direction, a second portion extending in a lateral direction towards the second housing 200, and a third portion extending forward in a forward direction towards the decoupler 210 to couple with the decoupler 210. The second section 214 includes a first portion extending forward in the forward direction away from the decoupler 210 and a second portion extending in the lateral direction towards the second housing 200 and away from the first housing 190 to couple with the second housing inlet 202. In some embodiments, the first section 212 and the second section 214 are otherwise shaped (e.g., include one or more straight or bent sections) to couple the first housing 190 with the second housing 200.

Figure 16:
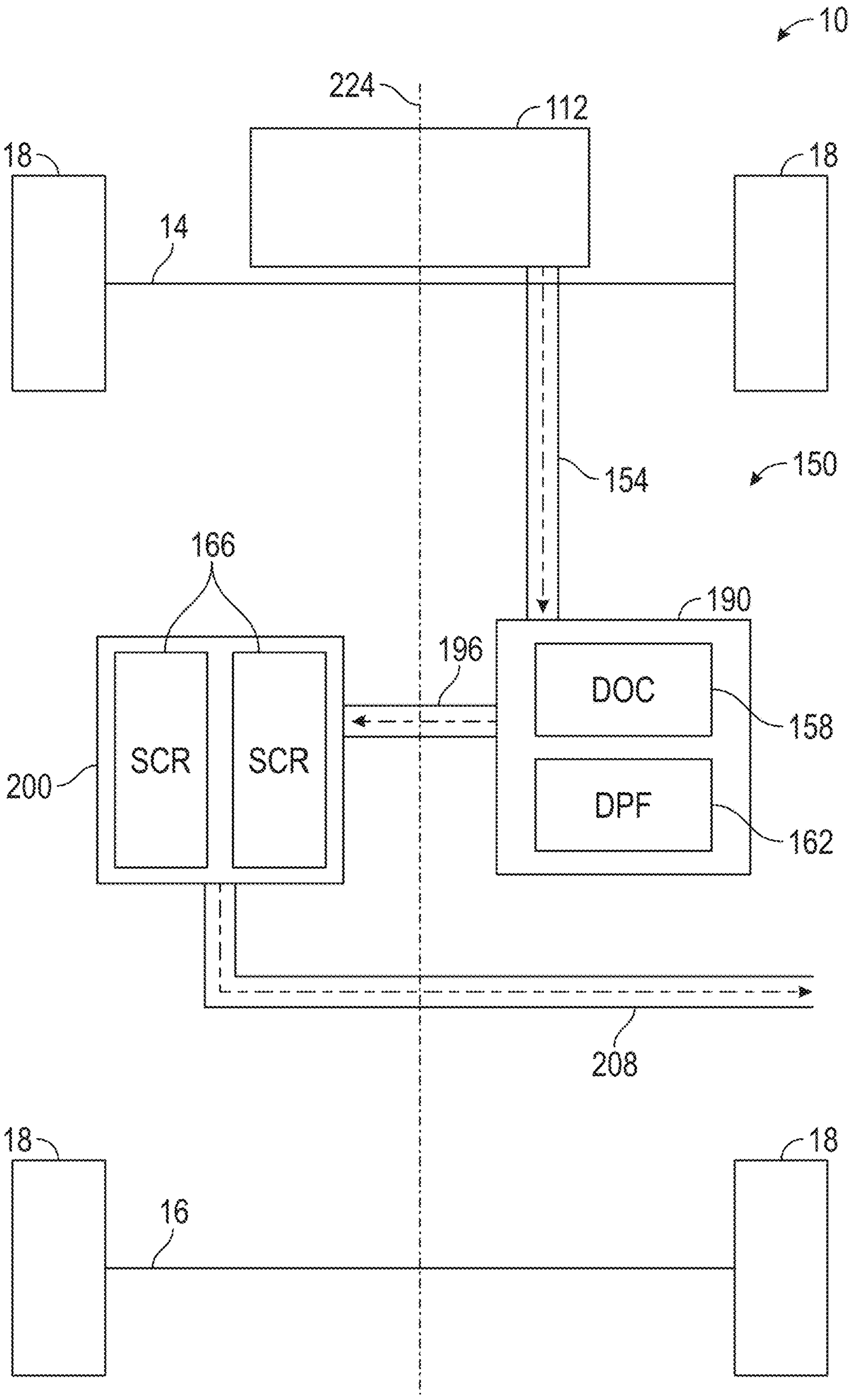
FIG. 16 is a schematic diagram of the vehicle of FIG. 1 and the exhaust system of FIG. 7, according to an exemplary embodiment.

As shown in FIG. 16, the flow of exhaust gas is represented by the dashed line (i.e., the long-dash short dash line) with an arrow indicating the direction of the flow. The exhaust system 150 is configured to receive exhaust gas from the engine 112 via the inlet pipe 154 coupled with the first housing 190. The first housing 190 is positioned along a first lateral side (e.g., a right side) of the vehicle 10 relative to a centerline (e.g., lateral centerline), shown as central axis 224, of the vehicle 10. The central axis 224 extends in a longitudinal direction between the front end and the rear end of the vehicle 10 and is laterally centered along the width of the vehicle 10. As shown in FIG. 16, the second housing 200 is positioned along a second lateral side (e.g., a left side) of the vehicle 10 opposite the first lateral side relative to the central axis 224. In other words, the first housing 190 and the second housing 200 are positioned on opposite sides of the central axis 224. By way of example, the first housing 190 and the second housing 200 may be positioned such that no portion thereof intersects with (e.g., crosses) the central axis 224. In some embodiments, at least a portion of the first housing 190 and/or the second housing 200 intersects with the central axis 224. As shown in FIG. 16, the intermediate pipe 196 fluidly couples the first housing 190 with the second housing 200 such that the exhaust gas exiting the first housing 190 flows in a direction towards the second housing 200. The intermediate pipe 196 intersects with the central axis 224 at at least one longitudinal location there along. In other words, the intermediate pipe 196 extends across the central axis 224 from the first lateral side to the second lateral side between the first housing 190 and the second housing 200. In some embodiments, the intermediate pipe 196 is configured (e.g., shaped, sized, etc.) such that the intermediate pipe 196 intersects with the central axis 224 at two or more longitudinal locations there along. In some embodiments, the intermediate pipe 196 is configured such that the intermediate pipe 196 extends along (e.g., substantially parallel with) at least a portion of the central axis 224. As shown in FIG. 16, the outlet pipe 208 is coupled with the second housing 200, and the exhaust gas exits the second housing 200 through the outlet pipe 208. The outlet pipe 208 intersects with the central axis 224 at at least one longitudinal location there along. In other words, the outlet pipe 208 extends across the central axis 224 from the second lateral side to the first lateral side. The outlet pipe 208 is configured to direct the exhaust gas in a direction away from the vehicle 10 and expel the exhaust gas to the atmosphere at the first lateral side of the vehicle 10. In some embodiments, the arrangement of the exhaust system 150 described above and shown in FIG. 16 is flipped such that the first housing 190 is positioned at the second lateral side of the vehicle 10, the second housing 200 is positioned at the first lateral side of the vehicle 10, and the outlet pipe 208 expels the exhaust gas at the second lateral side of the vehicle 10. In some embodiments, both the first housing 190 and the second housing 200 are positioned on the same side of the vehicle 10 (e.g., both at the first lateral side or both at the second lateral side). In some embodiments, the exhaust system 150 is otherwise suitably configured.

Figure 2:
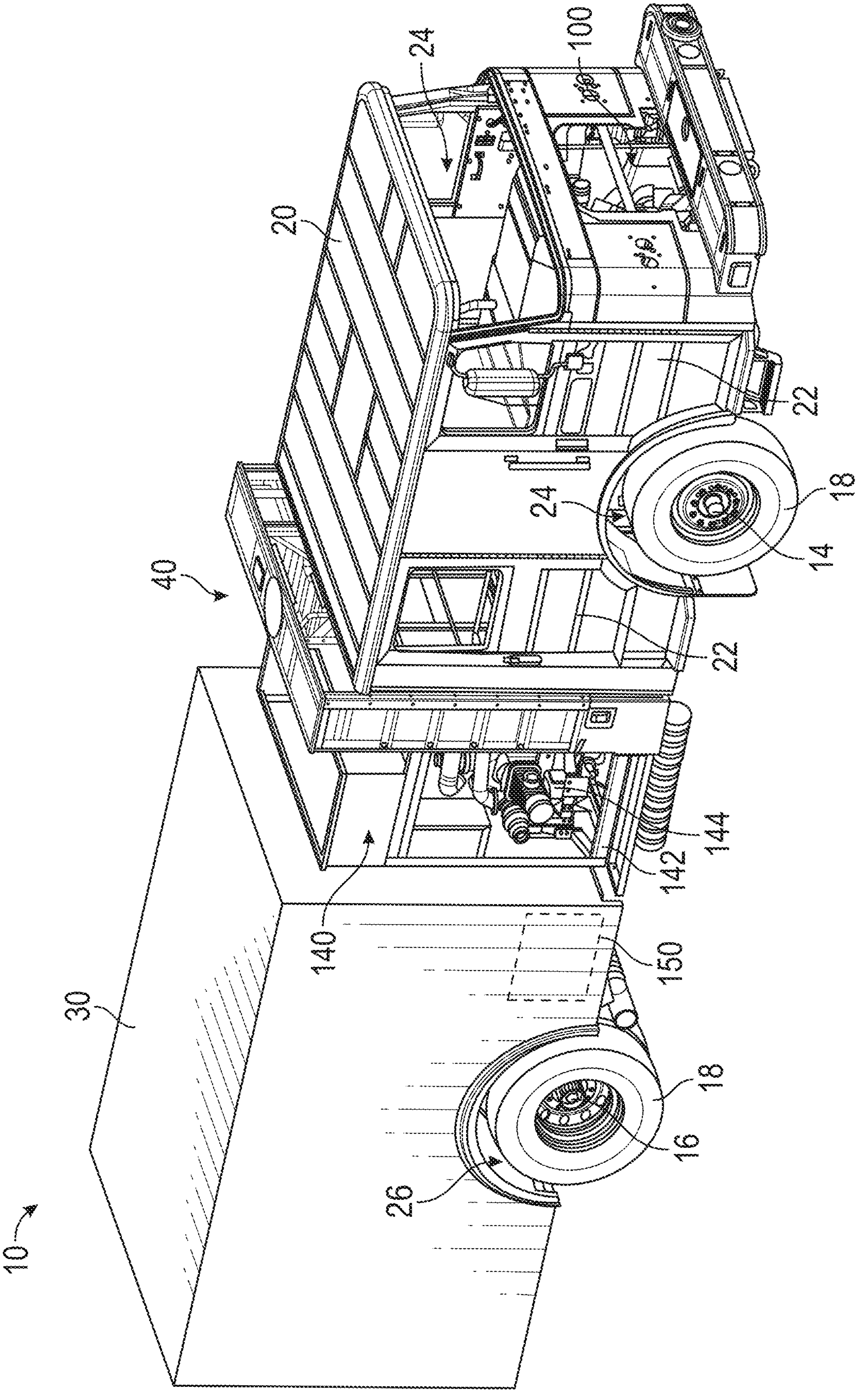
FIG. 2 is a front, right perspective view of the fire fighting vehicle of FIG. 1, according to an exemplary embodiment.
Figure 3:
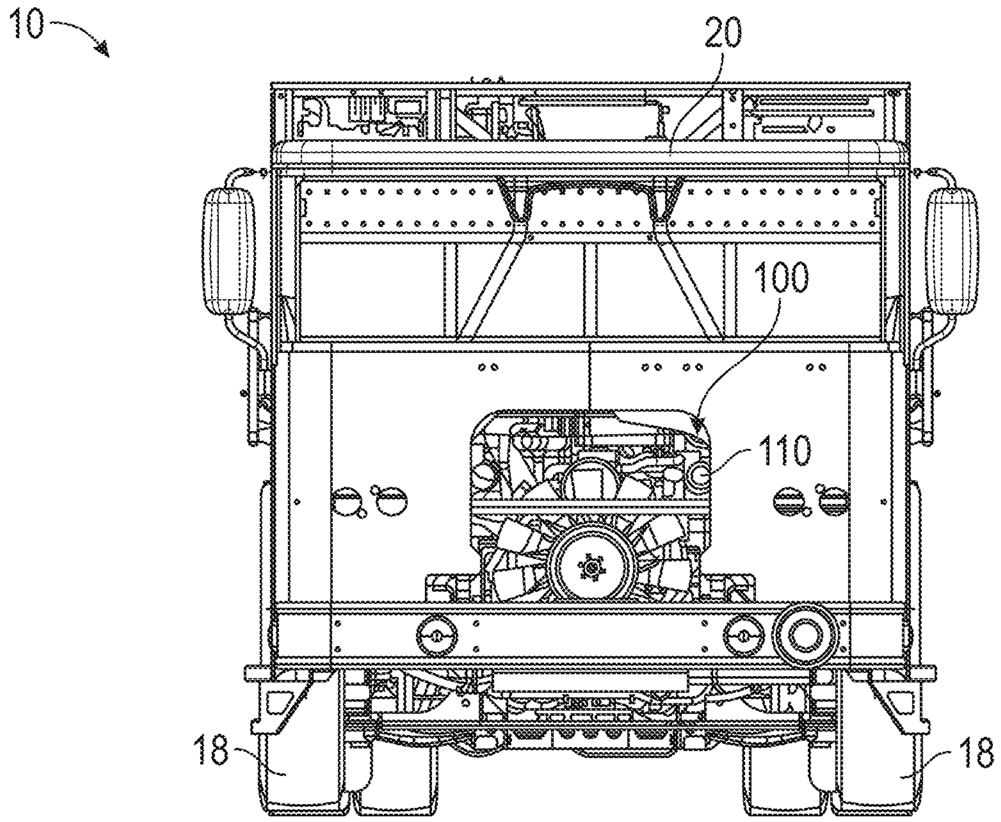
FIG. 3 is a front view of the fire fighting vehicle of FIG. 1, according to an exemplary embodiment.
Figure 4:
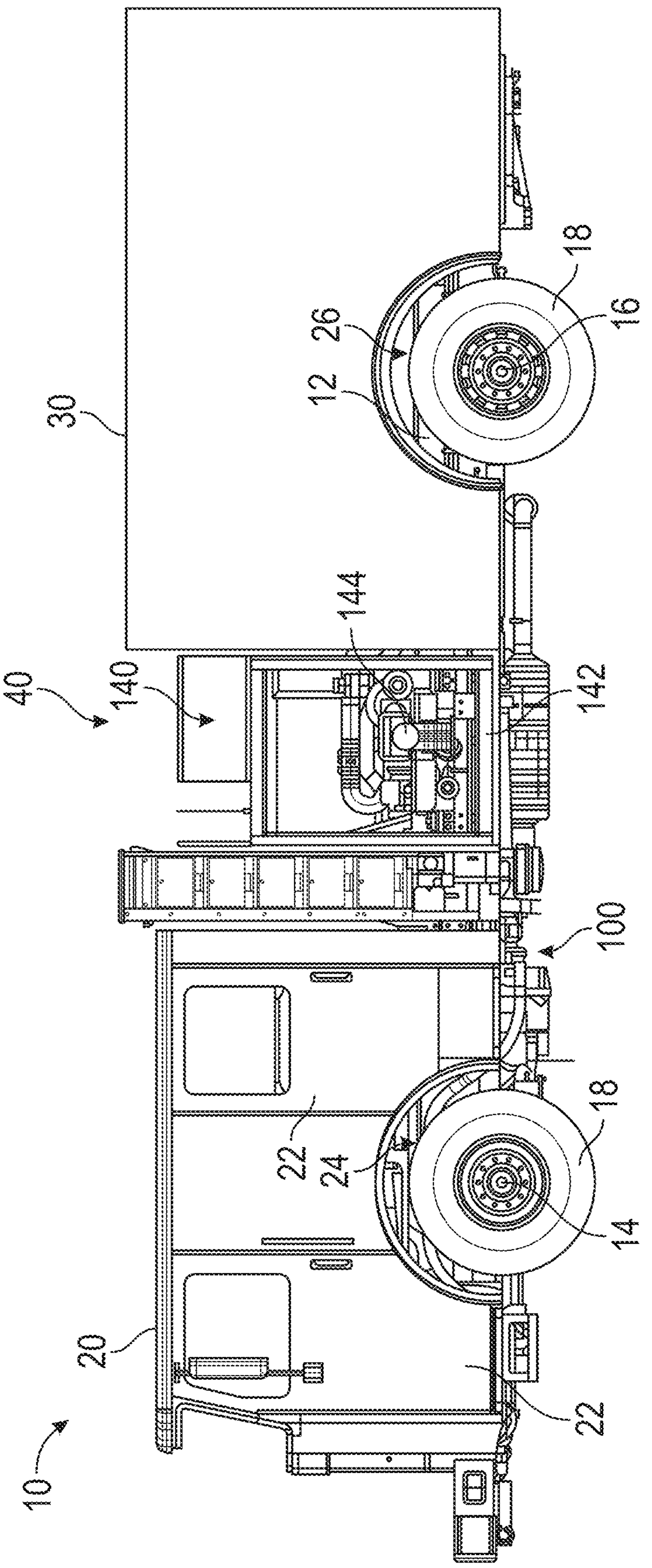
FIG. 4 is a left side view of the fire fighting vehicle of FIG. 1, according to an exemplary embodiment.
Figure 5:
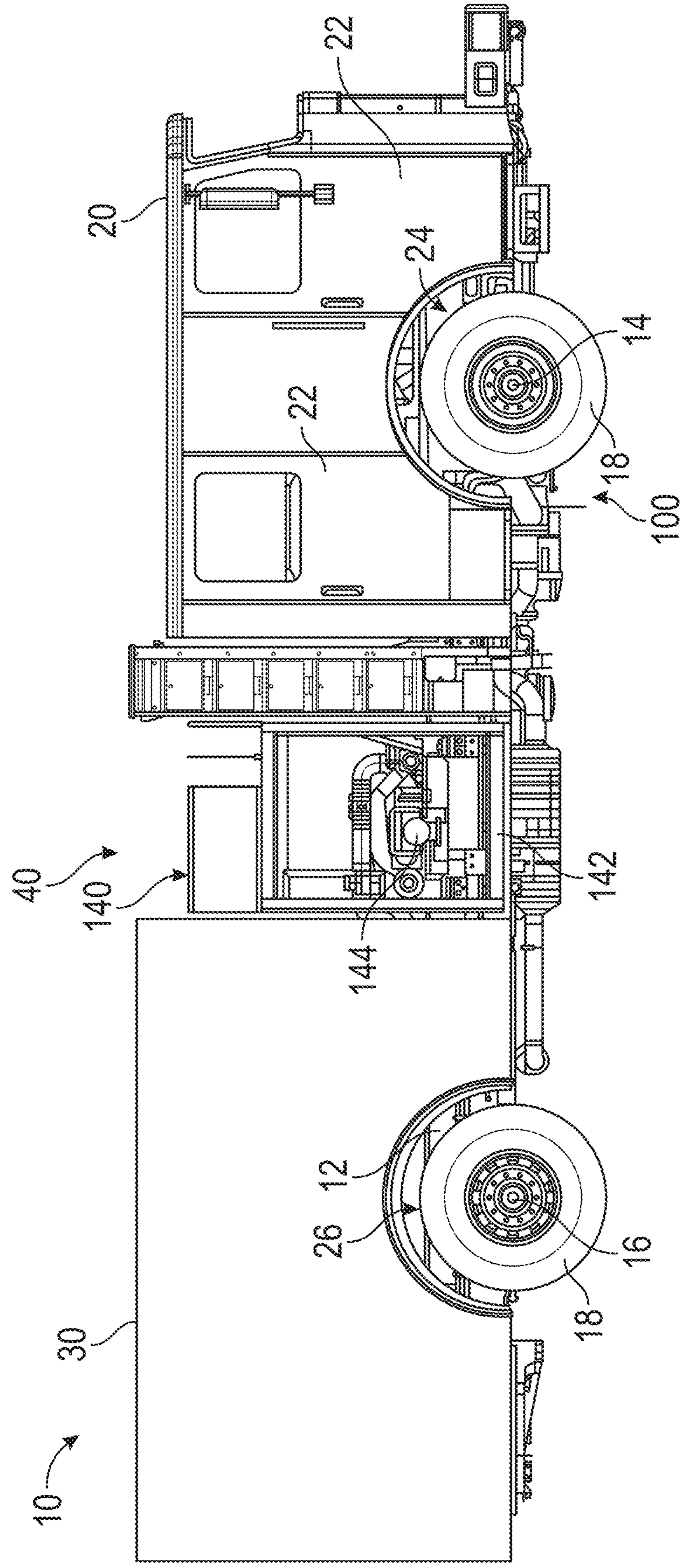
FIG. 5 is a right side view of the fire fighting vehicle of FIG. 1, according to an exemplary embodiment.
Figure 6:
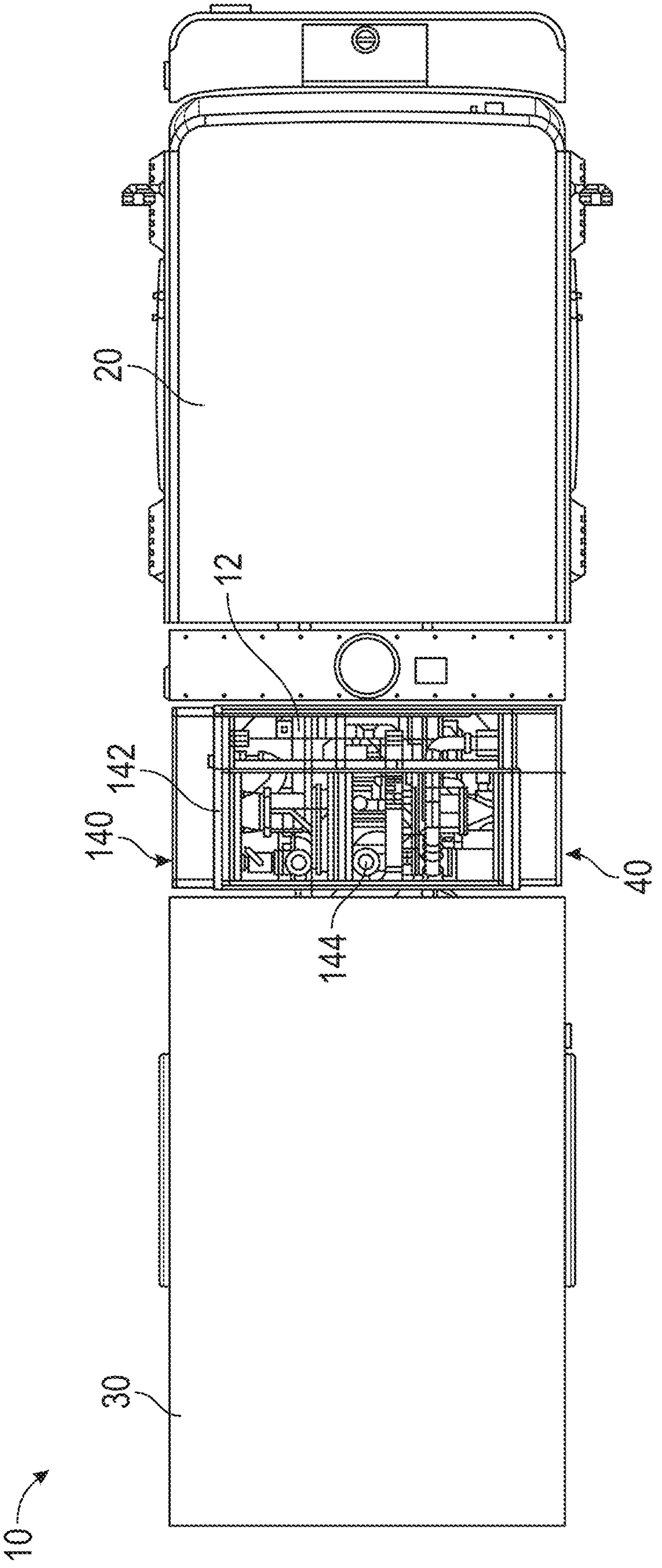
FIG. 6 is a top view of the fire fighting vehicle of FIG. 1, according to an exemplary embodiment.

As shown in FIG. 17, the first housing 190 and the second housing 200 are coupled to the frame 12 vertically below the pump system 140. In some embodiments, the first housing 190 and the second housing 200 are not positioned vertically below the pump system 140. As shown in FIGS. 9, 10, 18, 34, and 35, the first housing 190 and the second housing 200 are positioned longitudinally rearward relative to the front axle 14 and the engine 112 and longitudinally forward relative to the rear axle 16. As shown in FIGS. 9, 15, 18, 34, and 35, the first housing 190 is positioned, at least partially, longitudinally forward relative to the second housing 200 (e.g., the first housing 190 is laterally and longitudinally offset from the second housing 200). In some embodiments, the first housing 190 and the second housing 200 are substantially laterally aligned. In other embodiments, the second housing 200 is positioned, at least partially, longitudinally forward relative to the first housing 190. As shown in FIGS. 9 and 18, the first housing inlet 192 is positioned a longitudinal distance D1 rearward relative to the front axle 14 (e.g., a center point of the front axle 14). In some embodiments, the longitudinal distance D1 is about 92 inches ("in"). In other embodiments, the longitudinal distance D1 is greater than or less than 92 inches (e.g., 30 in, 40 in, 50 in, 60 in, 70 in, 80 in, 100 in, 110 in, 120 in, etc.). In still other embodiments, the longitudinal distance D1 is suitably dimensioned to comply with regulations (e.g., emissions regulations, electrical line length regulations, etc.) of the Environmental Protection Agency ("EPA"). By way of example, the longitudinal distance D1 may be dimensioned such that the first housing 190 and the second housing 200 are positioned close enough to the heater control unit 184 such that a length of an electrical line (e.g., the high voltage wires 242) connecting (i) the alternator 114 with the heater control unit 184 or (ii) the alternator 114 (with or without the heater control unit 184 integrated therein) with the first housing 190 and/or the second housing 200 via the first heater terminal 198 and the second heater terminal 206, respectively, is within (e.g., shorter than) a maximum electrical line length regulated by the EPA. By way of another example, the longitudinal distance D1 may be dimensioned such that the first housing 190 and the second housing 200 are positioned close enough to or far enough away from the engine 112 to sufficiently (e.g., within the regulations of the EPA) treat the exhaust gas. In still other embodiments, the longitudinal distance D1 is suitably dimensioned such that the temperature of the exhaust gas does not drop below the temperature threshold at or below which chemical reactions may not take place or may not be as efficient (as discussed in greater detail above) before reaching the first housing 190. In some embodiments, the exhaust system 150 is a nested or stacked system in which the various components thereof (e.g., the DOC 158, the DPF 162, the SCR 166, the heaters 182, the first housing 190, the intermediate pipe 196, the second housing 200, etc.) are each disposed in a common housing. In such embodiments, the common housing including the exhaust system 150 may be coupled to an exterior side of the vehicle 10. By way of example, as shown in FIG. 1, the exhaust system 150 as the nested or stacked system may be coupled to a left, exterior side of the rear section 30. By way of another example, as shown in FIG. 2, the exhaust system 150 as the nested or stacked system may be coupled to a right, exterior side of the rear section 30.

As shown in FIGS. 13, 14, and 28, the exhaust system 150 includes a plurality of sensors, shown as sensors 230, coupled with the first housing 190 and the second housing 200. The sensors 230 may be installed within or coupled to the first housing 190 and the second housing 200 and/or the first housing 190 and the second housing 200 may include sensor ports (e.g., sensor access points, apertures, openings, etc.) configured to receive the sensors 230. The sensors 230 are configured to acquire data regarding one or more operational parameters/characteristics of the exhaust system 150. By way of example, the sensors 230 may include one or more exhaust gas sensors (e.g., a temperature sensor, a pressure sensor, an $NO_x$ sensor, an $O_2$ sensor, a HC sensor, a PM sensor, an ammonia sensor, a flow rate sensor, etc.)

configured to facilitate monitoring one or more aspects of the exhaust gas flowing through the exhaust system 150 (e.g., a temperature of the exhaust gas; a pressure drop across the DOC 158 and/or DPF 162; $NO_x$ levels, $O_2$ levels, HC levels, PM (e.g., soot) levels, ammonia levels, etc. in the exhaust gas; a flow rate of the exhaust gas; etc.). By way of another example, the sensors 230 may include one or more DEF sensors (e.g., a DEF level sensor, a DEF line pressure sensor, a DEF concentration sensor, etc.) configured to facilitate monitoring one or more aspects of the DEF (e.g., a level of DEF stored by the DEF tank 170, a pressure of the DEF supplied to the SCRs 166, a concentration of the DEF in the exhaust gas, etc.). By way of still another example, the sensors 230 may include one or more heater sensors (e.g., voltage sensors, current sensors, resistance sensors, temperature sensors, etc.) configured to facilitate monitoring operational parameters/characteristics of the heaters 182 and/or the heater control unit 184 (e.g., voltage, current, resistance, power, temperature, etc.). By way of still another example, the sensors 230 may include one or more vehicle sensors (e.g., an accelerometer, a gyroscope, a compass, a location sensor such as a GPS sensor, a position sensor, an inertial measurement unit ("IMU"), suspension sensor(s), wheel sensors, an audio sensor or microphone, a camera, an optical sensor, a proximity detection sensor, a state-of-charge ("SOC") sensor, a speed sensor, etc.) to facilitate acquiring vehicle information or vehicle data regarding operation of the vehicle 10 and/or the various components thereof (e.g., vehicle speed, engine speed, vehicle location, pump speed, output fluid flow rate, output fluid pressure, water level, agent level, wheel angle, battery charge level, etc.).

As shown in FIGS. 7-9 and 25-27, the vehicle 10 includes a wiring assembly, shown as vehicle wiring assembly 240, including a plurality of high voltage wires, shown as high voltage wires 242, electrically connecting various electrically-operated components of the vehicle 10 to each other and to the alternator 114 and/or the battery 130. The high voltage wires 242 may be or include one or more high voltage cables of a high voltage DC wiring harness, one or more high voltage cables of a high voltage AC wiring harness, and/or still other high voltage cables. According to an exemplary embodiment, the alternator 114 and/or the battery 130 is electrically connected to the heaters 182 by the high voltage wires 242. The heaters 182 are configured to (i) receive electrical energy from the alternator 114 and/or (ii) draw stored energy in the battery 130 via the high voltage wires 242 to facilitate operation thereof. According to an exemplary embodiment, the heaters 182 are electrically connected to the first housing 190 and the second housing 200 by the high voltage wires 242 (e.g., via a connection with the first heater terminal 198 and the second heater terminal 206, respectively). It should be understood that the alternator 114 and/or the battery 130 may power additional components of the vehicle 10 (e.g., lights, sirens, communication systems, displays, electric accessories, electric motors, etc.) via the high voltage wires 242. In some embodiments, a first portion of components of the vehicle 10 are powered by the alternator 114 and/or the battery 130 via the high voltage wires 242 and a second portion of components of the vehicle 10 are powered by the alternator 114 and/or the battery 130 via low voltage wires. In some embodiments, the high voltage wires 242 include a casing (e.g., shield) configured to inhibit signal interference between the high voltage wires 242 and other electrical components of the vehicle 10 such as with the low voltage wires.

In some embodiments, the high voltage components (e.g., the alternator 114, the battery 130, the heaters 182, the heater control unit 184, inverters, power distribution units, chargers, DC-to-DC converters, pumps, etc.) of the vehicle 10 are dispersed or spread out over greater distances along the frame 12 of the vehicle 10 such that substantially longer power runs of high voltage wiring/cables may be required to provide power between the high voltage components of the vehicle 10. By way of example, (i) one or more first high voltage components may be positioned at a first location along a longitudinal length of the vehicle 10 (e.g., defined by a length of the frame 12) and within, in front of, above, and/or below the front cabin 20, (ii) one or more second high voltage components may be positioned at a second location along the longitudinal length of the vehicle 10 and between the front cabin 20 and the rear section 30, and/or (iii) one or more third high voltage components may be positioned at a third locations along the longitudinal length of the vehicle 10 and within, above, below, and/or behind the rear section 30. However, with such longer high voltage power runs, the high voltage wiring/cables can be susceptible to wear or damage, as well as personnel working on the vehicle 10 may require special training, qualifications, and/or equipment to access and/or perform maintenance on a greater portion of the vehicle 10. To mitigate this, the longer high voltage power runs can be routed through or along (i) dedicated conduits/raceways installed onto the vehicle 10 and/or (ii) protective structures installed onto the vehicle 10 (e.g., dedicated protective structures added onto the vehicle 10, functional components included with the vehicle 10, etc.), as described in greater detail herein.

Figure 8:
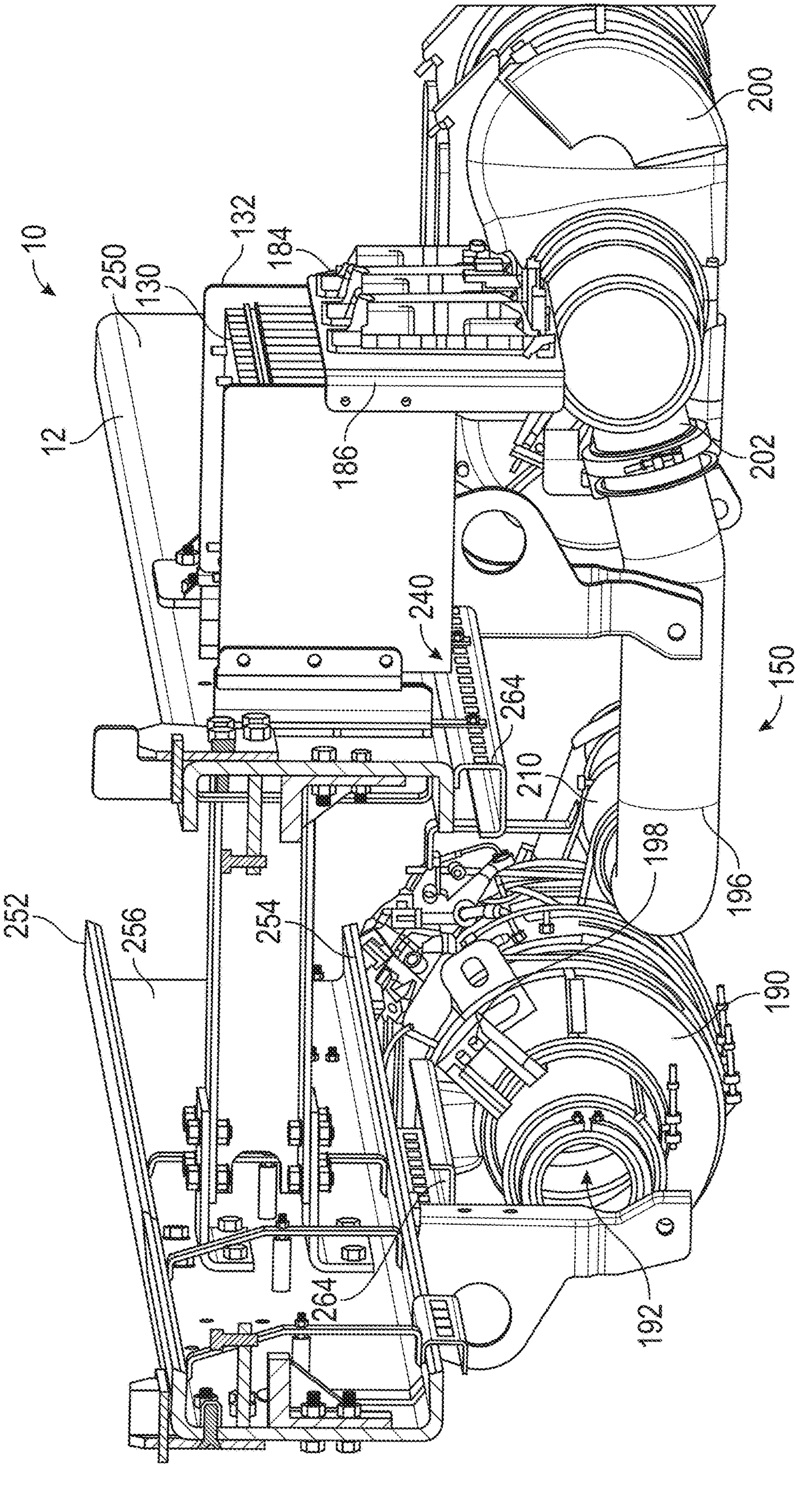
FIG. 8 is a partial front, left perspective view of the frame and the exhaust system of FIG. 7, according to an exemplary embodiment.
Figure 9:
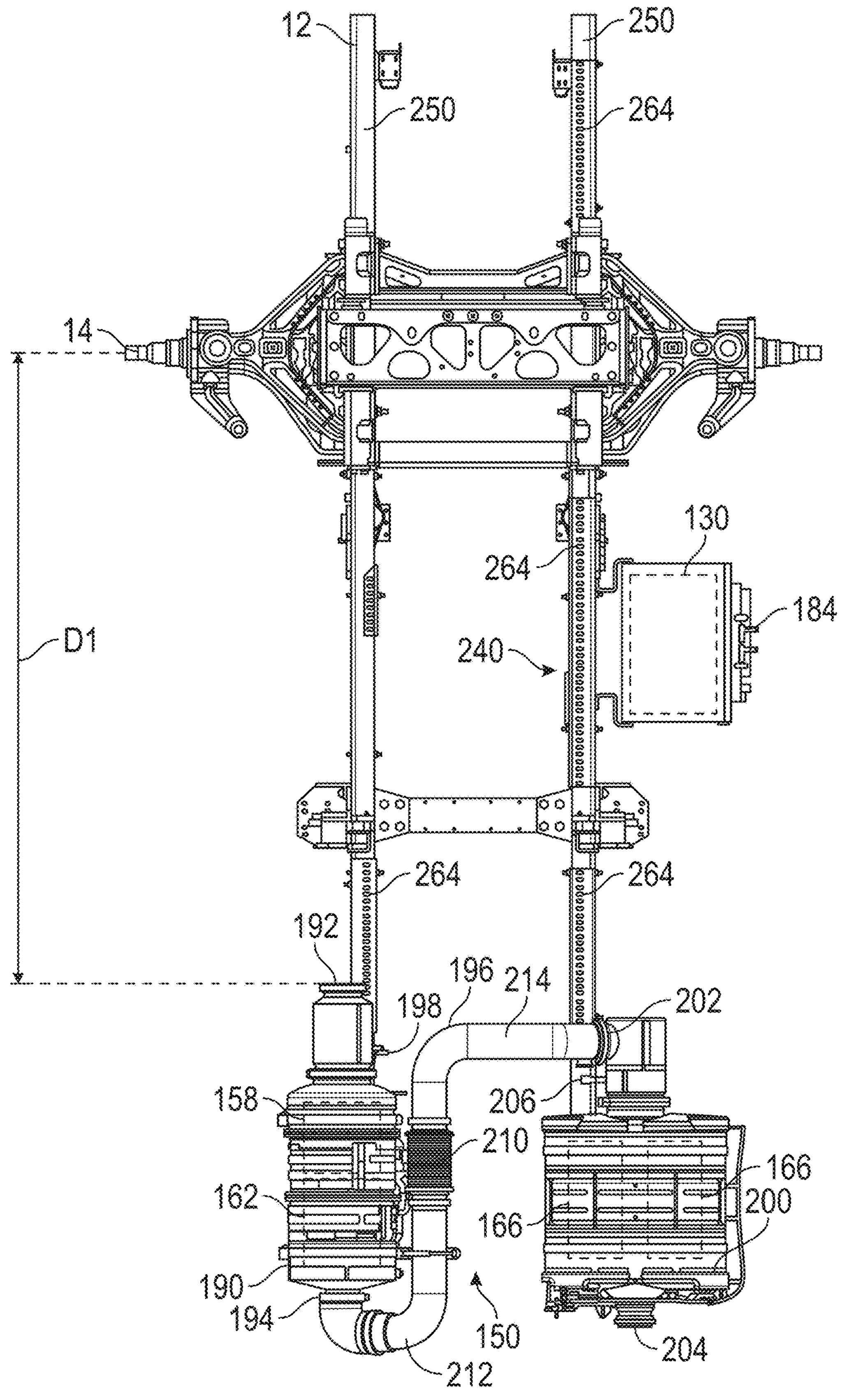
FIG. 9 is a bottom view of the frame and the exhaust system of FIG. 7, according to an exemplary embodiment.
Figure 10:
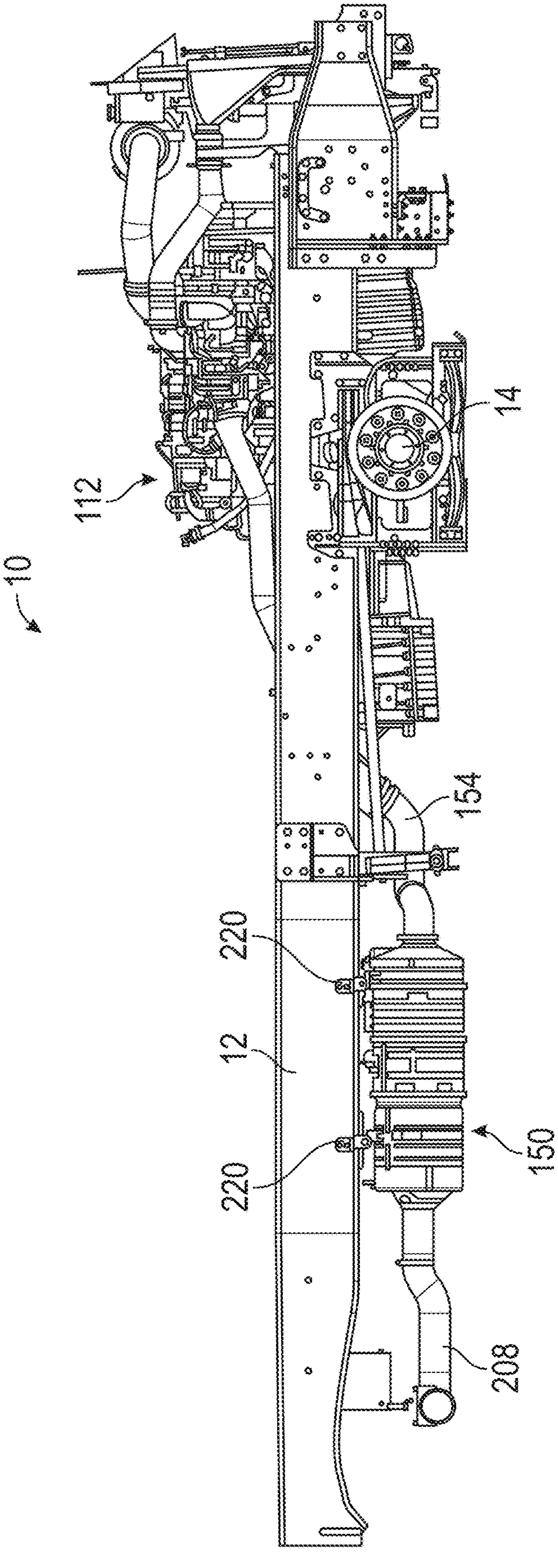
FIG. 10 is a right side view of the frame and the exhaust system of FIG. 7, according to an exemplary embodiment.

As shown in FIGS. 7-9, 25-27, and 36, the vehicle wiring assembly 240 includes at least one high voltage cable routing support, shown as cable support 246, coupled to a portion of a frame rail (e.g., a first frame rail and a second frame rail, a right frame rail and a left frame rail, etc.), shown as frame rail 250, of the frame 12. As shown in FIGS. 7 and 8, the frame rail 250 includes a first or upper portion, shown as upper flange 252, a second or lower portion, shown as lower flange 254, and a third or middle portion, shown as webbing 256, extending between the upper flange 252 and the lower flange 254 such that the frame rail 250 has a "C-shaped" cross-sectional profile. In other embodiments, the frame rail 250 has another structure or cross-sectional profile (e.g., a rectangular tube).

As shown in FIGS. 7-9, 25-27, and 36, the cable support 246 is configured to support and suspend the high voltage wires 242 underneath and along at least a portion of a length of the frame rail 250. In some embodiments, low voltage cables and/or other types of cables, wires, conduits, etc. (e.g., pneumatic lines, hydraulic lines, etc.) are additionally or alternatively supported by the cable support 246. By way of example, a first cable support 246 or plurality of first cable supports 246 may support the high voltage wires 242 and a second cable support 246 or plurality of second cable supports 246 may support the low voltage wire and/or other types of cables/conduits separate from the high voltage wires 242. In such an example, the vehicle wiring assembly 240 facilitates separating the high voltage wires 242 from the low voltage cables/wires to limit signal interference therebetween.

Figure 25:
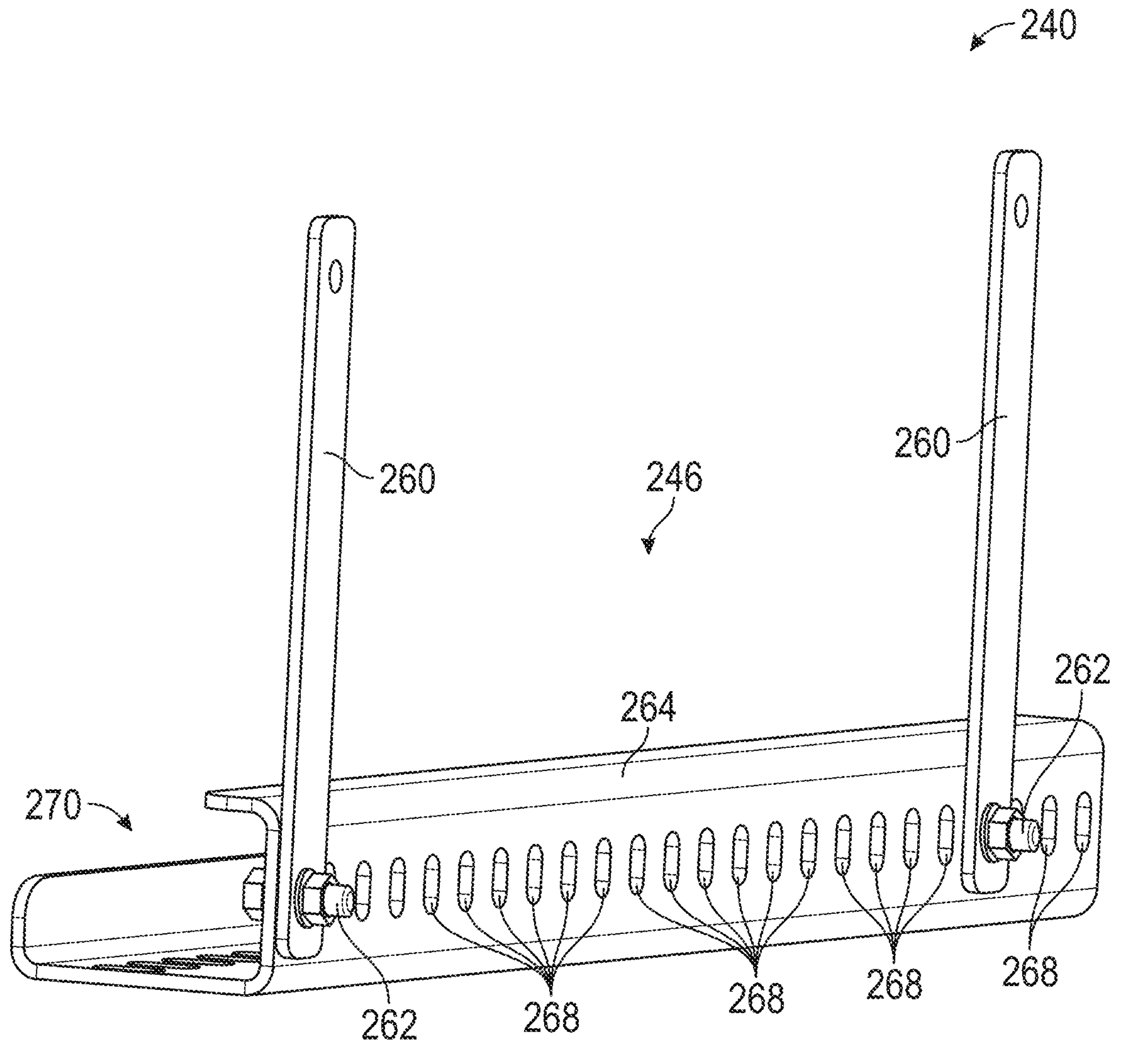
FIG. 25 is a perspective view of a vehicle wiring assembly of the fire fighting vehicle of FIG. 1, according to an exemplary embodiment.
Figure 26:
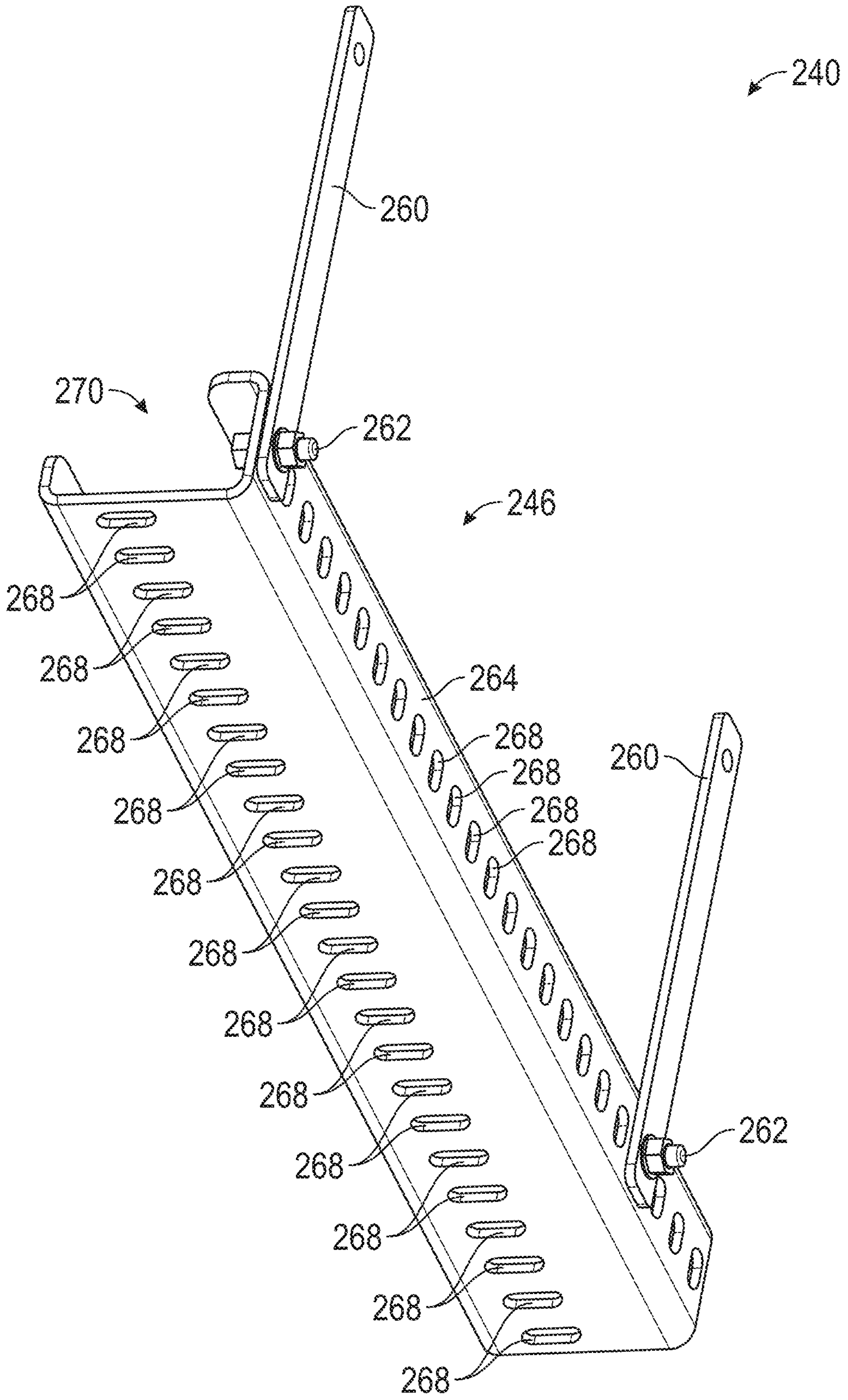
FIG. 26 is a bottom perspective view of the vehicle wiring assembly of FIG. 25, according to an exemplary embodiment.
Figure 27:
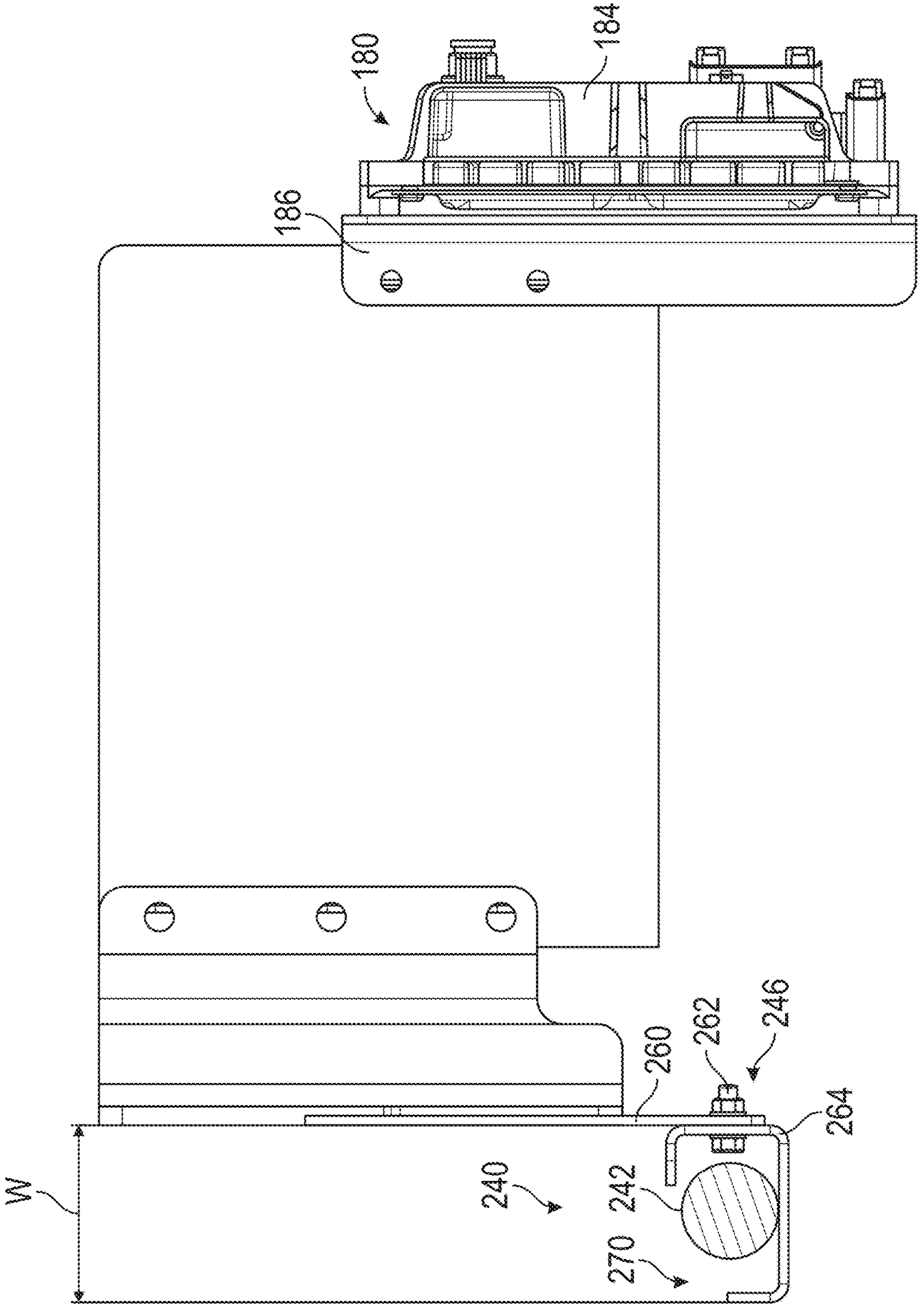
FIG. 27 is a front view of the vehicle wiring assembly of FIG. 25, according to an exemplary embodiment.

As shown in FIGS. 7-9, 25, and 26, the cable support 246 includes (i) at least one first bracket, mounting interface, or bar, shown as mounting brackets 260, positioned along and detachably coupled to the webbing 256 (e.g., a lateral outer surface) of the frame rail 250 via one or more couplers (e.g., bolts, rivets, etc.), shown as fasteners 262, and (ii) a second bracket, cable interface, or channel, shown as cable bracket 264, extending laterally from and detachably coupled to the mounting brackets 260 via one or more of the fasteners 262 and positioned (e.g., extending, suspended, etc.) beneath the lower flange 254 of the frame rail 250. In other embodiments, the mounting brackets 260 are fixedly coupled (e.g., welded) to the webbing 256 and/or the cable bracket 264. In still other embodiments, the cable support 246 does not include the mounting brackets 260, and the cable bracket 264 is integrally formed with (e.g., as a single, unitary structure) or fixedly coupled directly to (e.g., welded to) the frame rail 250 (e.g., the webbing 256 and/or the lower flange 254). As shown in FIGS. 25-27, the cable support 246 includes a plurality of holes (e.g., apertures, openings, etc.), shown as tie-down holes 268, along a side surface and along a bottom surface of the cable support 246. The tie-down holes 268 are configured to receive the fasteners 262 to facilitate coupling the mounting brackets 260 with the cable bracket 264. In some embodiments, the tie-down holes 268 are configured to receive fasteners such as zip-ties, brackets, or clamps to facilitate coupling the high voltage wires 242 to the cable bracket 264. As shown in FIGS. 7-9, the cable support 246 includes a plurality of discrete mounting brackets 260 associated with a plurality of discrete cable brackets 264 and configured to couple with the frame rail 250 (e.g., the left frame rail and/or the right frame rail) at a plurality of discrete mounting locations. The plurality of discrete mounting brackets 260 and cable brackets 264 are spaced along the length of the frame rail 250.

According to the exemplary embodiment shown in FIGS. 25-27, the cable bracket 264 has substantially "J-shaped" cross-section defining a gap, shown as passage 270. In other embodiments, the cable bracket 264 has another shape (e.g., to correspond with a shape of the high voltage wires 242, an L-shape, a U-shape, etc.). In some embodiments, the cable bracket 264 is positioned relative to the lower flange 254 such that the high voltage wires 242 cannot be removed through the passage 270 formed within the cable bracket 264 (e.g., the high voltage wires 242 are only removable in a longitudinal direction along the frame rail 250, such that zip-ties, brackets, or clamps are not needed to couple the high voltage wires 242 to the cable bracket 264 via the tie-down holes 268, etc.). As shown in FIG. 27, the cable bracket 264 defines a lateral width W. The lateral width W may be about substantially equal to a width of the lower flange 254. In some embodiments, the lateral width W is about 3.6875 in. In other embodiments, the lateral width W is greater than or less than 3.6875 in (e.g., 2 in, 3 in, 4 in, 5 in, etc.). In some embodiments, the cable support 246 is the same as or similar to the raceway assembly and the cable support as described in U.S. application Ser. No. 18/501,440, filed Nov. 3, 2023, the entire disclosure of which is incorporated by reference herein.

Control System

According to the exemplary embodiment shown in FIG. 28, a control system 300 for the vehicle 10 includes a controller 310. In one embodiment, the controller 310 is configured to selectively engage, selectively disengage, control, or otherwise communicate with components of the vehicle 10. As shown in FIG. 28, the controller 310 is coupled to (e.g., communicably coupled to) components of the driveline 100 (e.g., the engine system 110; subsystems including the pump system 140 and/or the subsystem 146 such as, for example, an aerial ladder assembly or another subsystem; etc.), the battery 130, the exhaust system 150, the heater control unit 184, a user interface 320, and the sensors 230. By way of example, the controller 310 may send and receive signals (e.g., control signals) with the components of the driveline 100, the battery 130, the exhaust system 150, the heater control unit 184, the user interface 320, and/or the sensors 230.

The controller 310 may be implemented as a general-purpose processor, an application specific integrated circuit ("ASIC"), one or more field programmable gate arrays ("FPGAs"), a digital-signal-processor ("DSP"), circuits containing one or more processing components, circuitry for supporting a microprocessor, a group of processing components, or other suitable electronic processing components. According to the exemplary embodiment shown in FIG. 28, the controller 310 includes a processing circuit 312, a memory 314, and a communications interface 306. The processing circuit 312 may include an ASIC, one or more FPGAs, a DSP, circuits containing one or more processing components, circuitry for supporting a microprocessor, a group of processing components, or other suitable electronic processing components. In some embodiments, the processing circuit 312 is configured to execute computer code stored in the memory 314 to facilitate the activities described herein. The memory 314 may be any volatile or non-volatile computer-readable storage medium capable of storing data or computer code relating to the activities described herein. According to an exemplary embodiment, the memory 314 includes computer code modules (e.g., executable code, object code, source code, script code, machine code, etc.) configured for execution by the processing circuit 312. In some embodiments, the controller 310 may represent a collection of processing devices. In such cases, the processing circuit 312 represents the collective processors of the devices, and the memory 314 represents the collective storage devices of the devices. In one embodiment, the controller 310 is configured to selectively engage, selectively disengage, control, or otherwise communicate with components of the vehicle 10 (e.g., via the communications interface 306, a controller area network ("CAN") bus, etc.).

The user interface 320 includes a display and an operator input, according to one embodiment. The display may be configured to display a graphical user interface, an image, an icon, or still other information. In one embodiment, the display includes a graphical user interface configured to provide general information about the vehicle 10 (e.g., vehicle speed, fuel level, battery level, pump performance/status, aerial ladder information, warning lights, agent levels, water levels, etc.). The graphical user interface may also be configured to display a current mode of operation, various potential modes of operation, or still other information relating to the vehicle 10, the driveline 100, and/or the exhaust system 150. By way of example, the graphical user interface may be configured to provide specific information regarding the operation of the driveline 100 (e.g., whether the clutch is engaged, whether the engine 112 is on, whether the pump 144 is in operation, etc.).

The operator input may be used by an operator to provide commands to the components of the vehicle 10, the driveline 100, the exhaust system 150, and/or still other components or systems of the vehicle 10. The operator input may include one or more buttons, knobs, touchscreens, switches, levers, joysticks, pedals, or handles. In some instances, an operator may be able to press a button and/or otherwise interface with the operator input to command the controller 310 to change a mode of operation for the driveline 100. The operator may be able to manually control some or all aspects of the operation of the driveline 100, the exhaust system 150, and/or other components of the vehicle 10 using the display and the operator input. It should be understood that any type of display or input controls may be implemented with the systems and methods described herein.

According to an exemplary embodiment, the controller 310 is configured to control operation (e.g., start, stop, vary power levels, etc.) of the thermal management system 180. In some embodiments, the controller 310 is configured to control operation of the thermal management system 180 in response to one or more signals received from the user interface 320. By way of example, the user may provide an input to the user interface 320 and the controller 310 may receive a signal from the user interface 320 indicative of the user input and control the thermal management system 180 based on the signal. In some embodiments, the controller 310 is configured to control operation of the thermal management system 180 based on sensor data acquired by one or more of the sensors 230. By way of example, based on temperature data acquired by a temperature sensor of the sensors 230, the controller 310 may determine that the temperature of the exhaust gas at a respective location (e.g., a location along the flow of the exhaust gas) is less than the threshold temperature at or below which chemical reactions may not take place or may not be as efficient (as discussed in greater detail above). In such an example, the controller 310 may control the heater control unit 184 to provide power to the heaters 182 (e.g., via the first heater terminal 198 and/or the second heater terminal 206) to heat the exhaust gas or aftertreatment components at the respective location at or above the temperature threshold. By way of another example, based on the characteristics of the exhaust gas (e.g., $NO_x$ levels, $O_2$ levels, HC levels, PM levels, ammonia levels, etc., exhaust gas flow rate, exhaust gas temperature, etc.), the controller 310 may operate the DEF injector 179 to inject DEF into the exhaust gas or close the DEF injector 179 to stop injecting DEF into the exhaust gas.

As used herein, “low voltage” may refer to voltages of 24 volts (“V”) or less (e.g., 5 V, 12 V, 24 V, etc.), whereas “high voltage” may refer to voltages greater than 24 V (e.g., 700 V, 480 V, 240 V, 220 V, 120 V, 48 V, etc.).

Heater Control Unit Positioning

Figure 29:
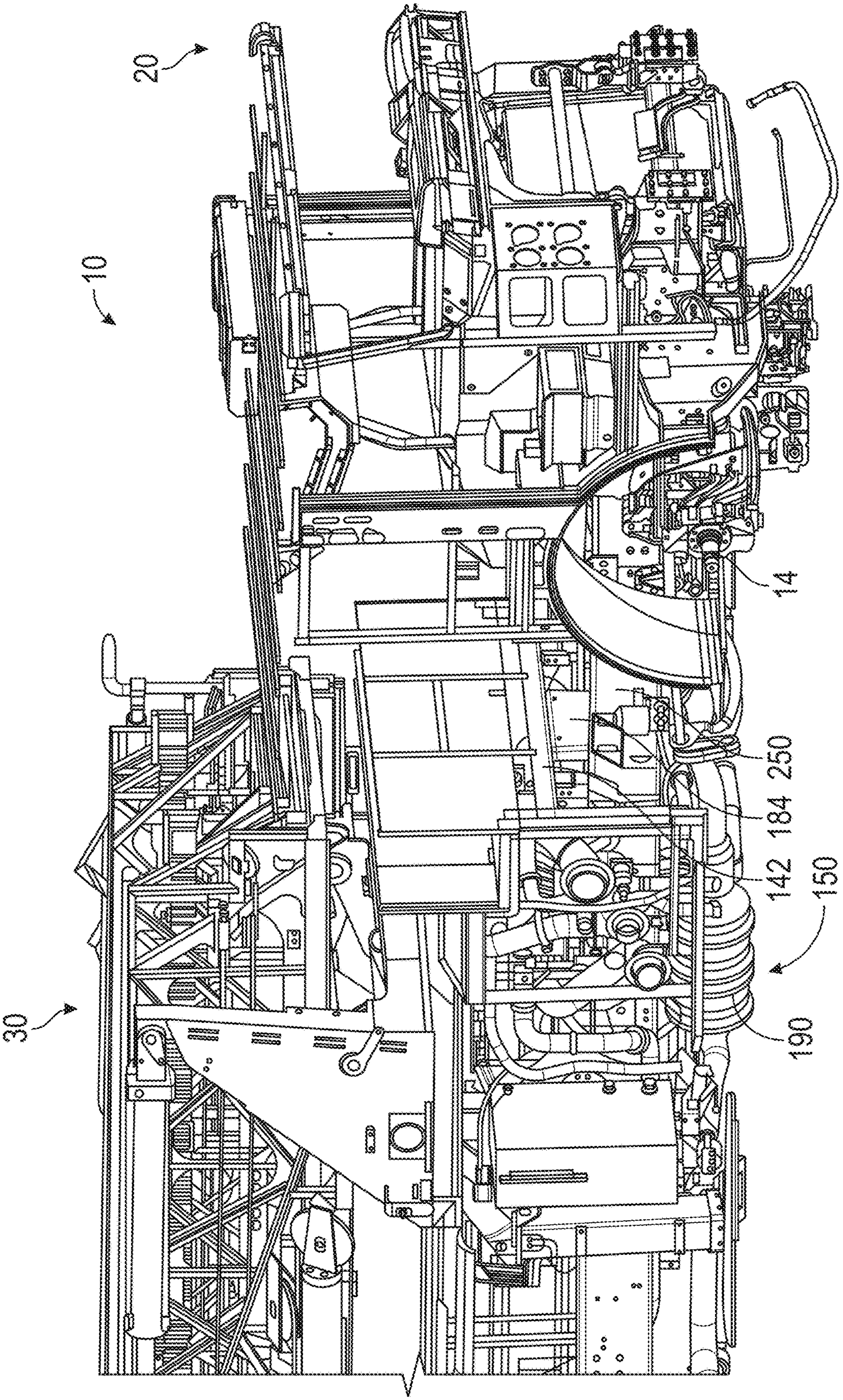
FIG. 29 is a front, right perspective view of a vehicle including the exhaust system of FIG. 7, according to an exemplary embodiment.
Figure 30:
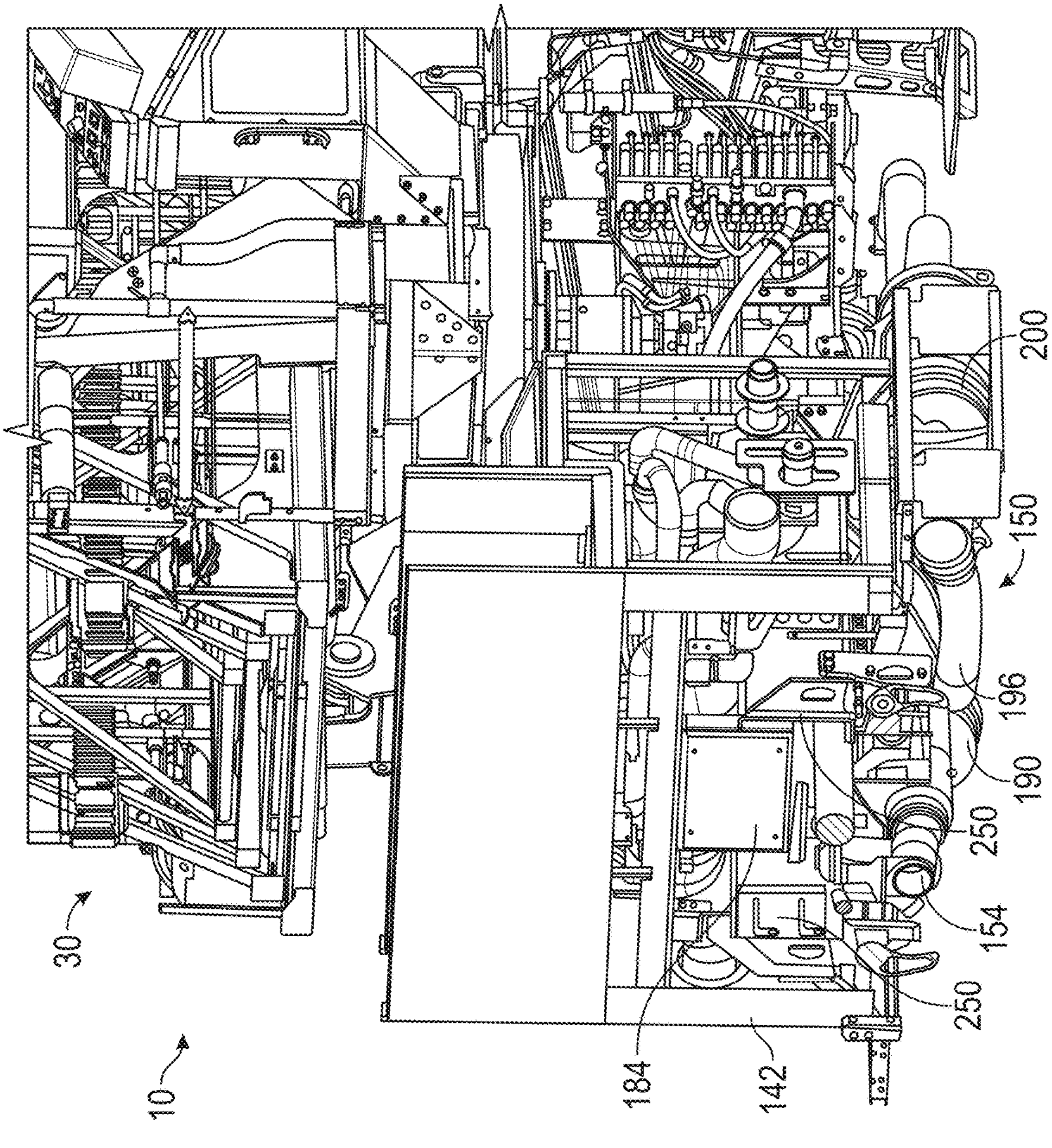
FIG. 30 is a cross-sectional, front, left perspective view of the vehicle of FIG. 29, according to an exemplary embodiment.
Figure 31:
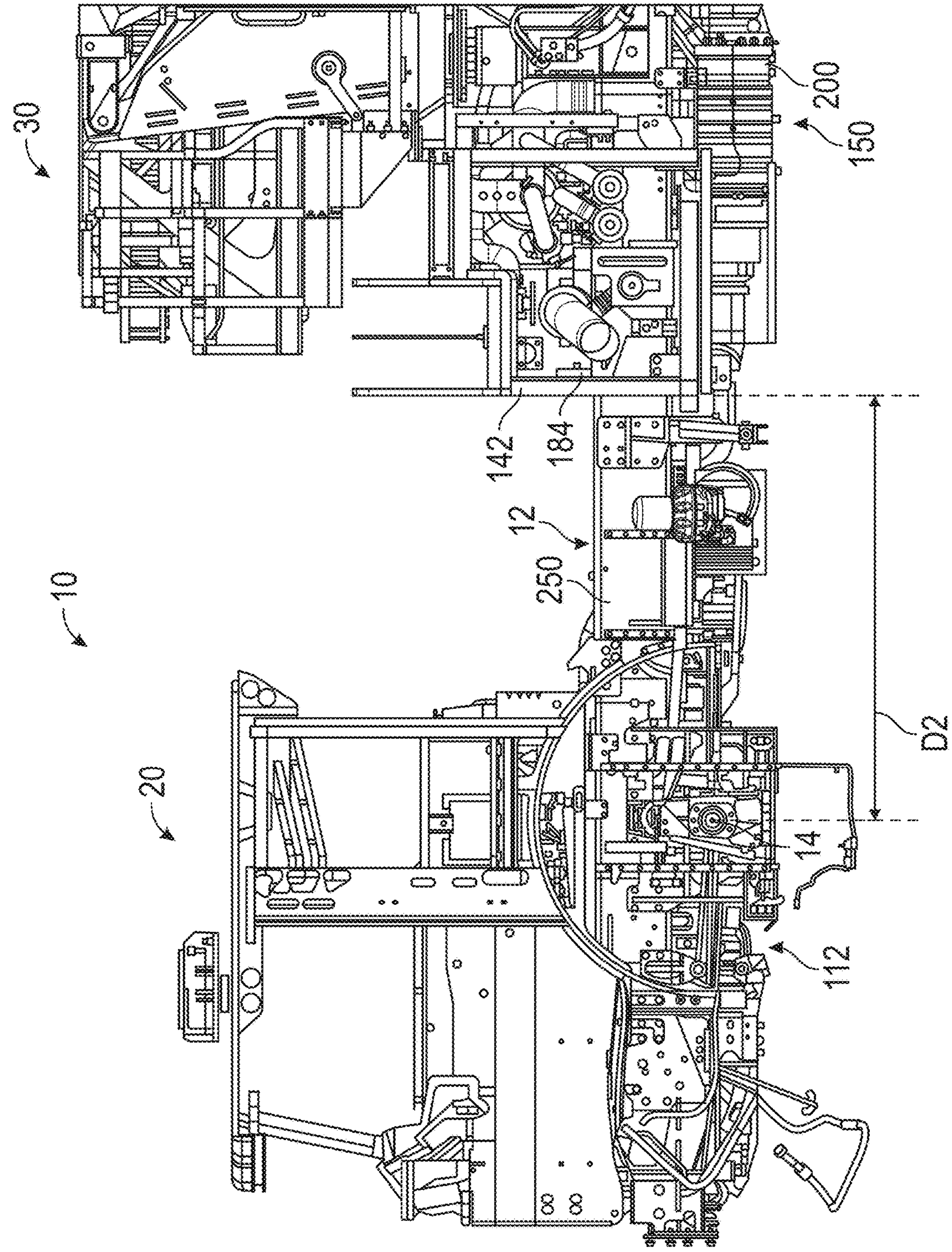
FIG. 31 is a right side view of the vehicle of FIG. 29, according to an exemplary embodiment.
Figure 32:
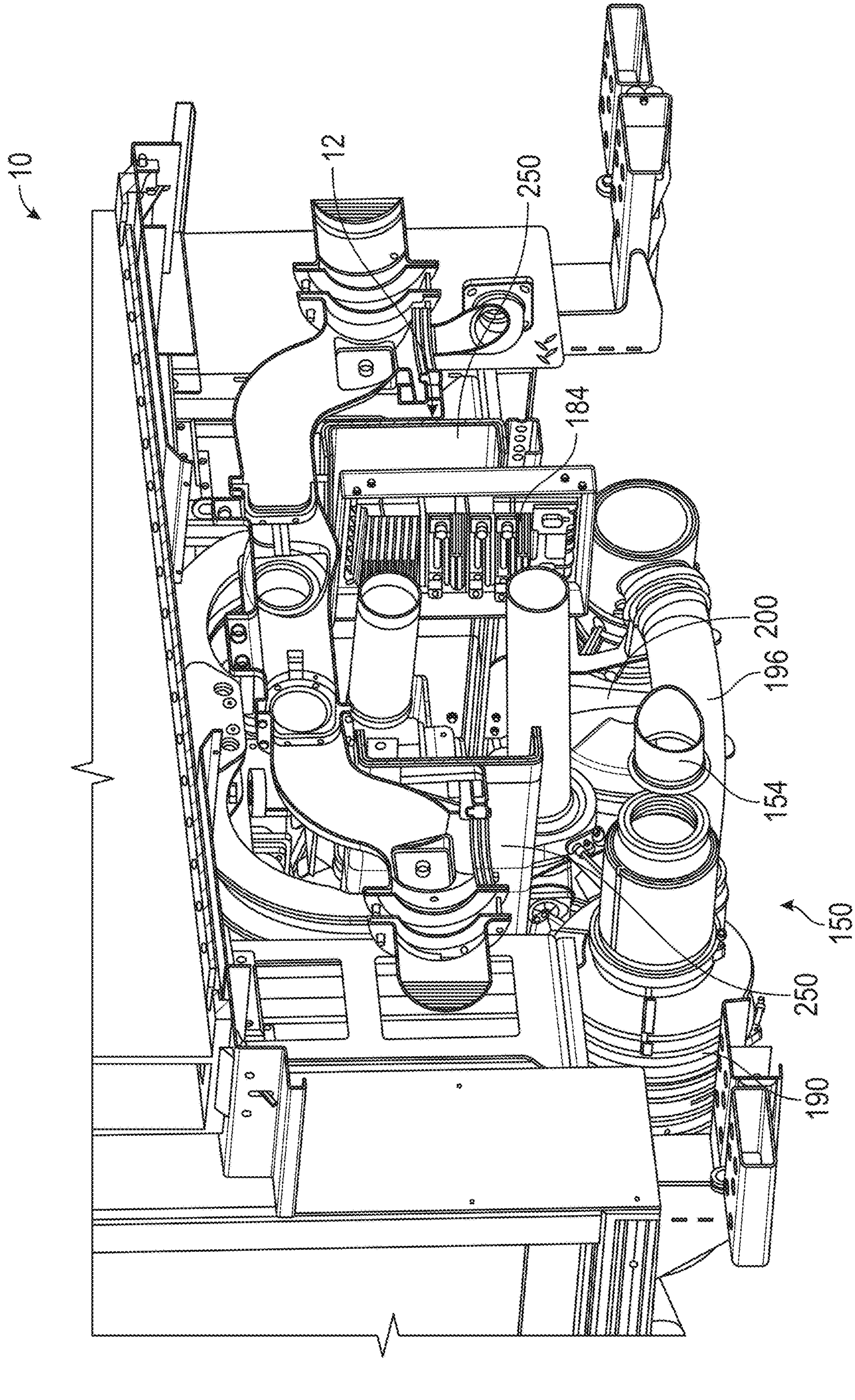
FIG. 32 is a cross-sectional, front, right perspective view of a vehicle including the exhaust system of FIG. 7, according to an exemplary embodiment.
Figure 33:
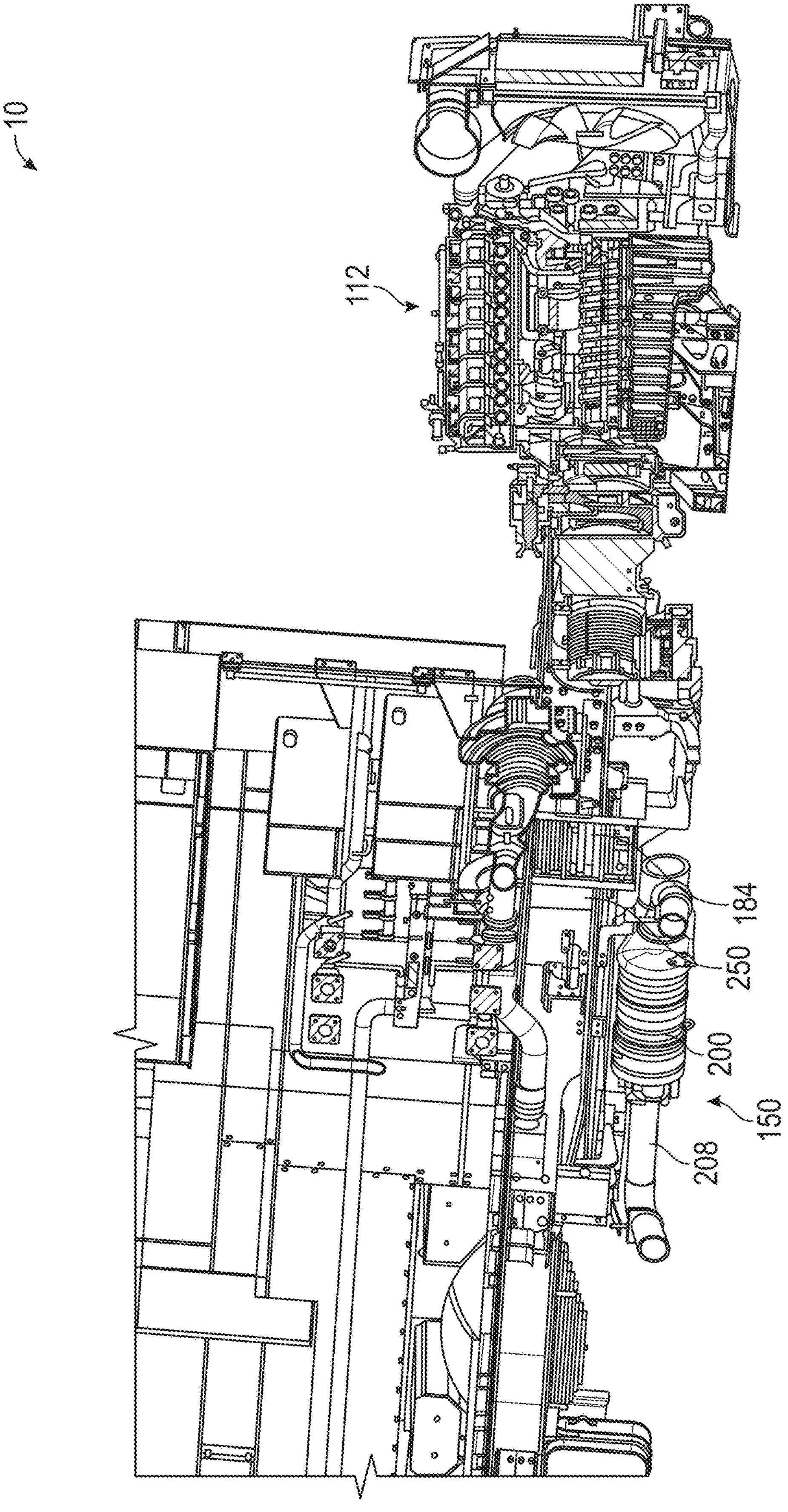
FIG. 33 is a cross-sectional, right perspective view of the vehicle of FIG. 32, according to an exemplary embodiment.
Figure 34:
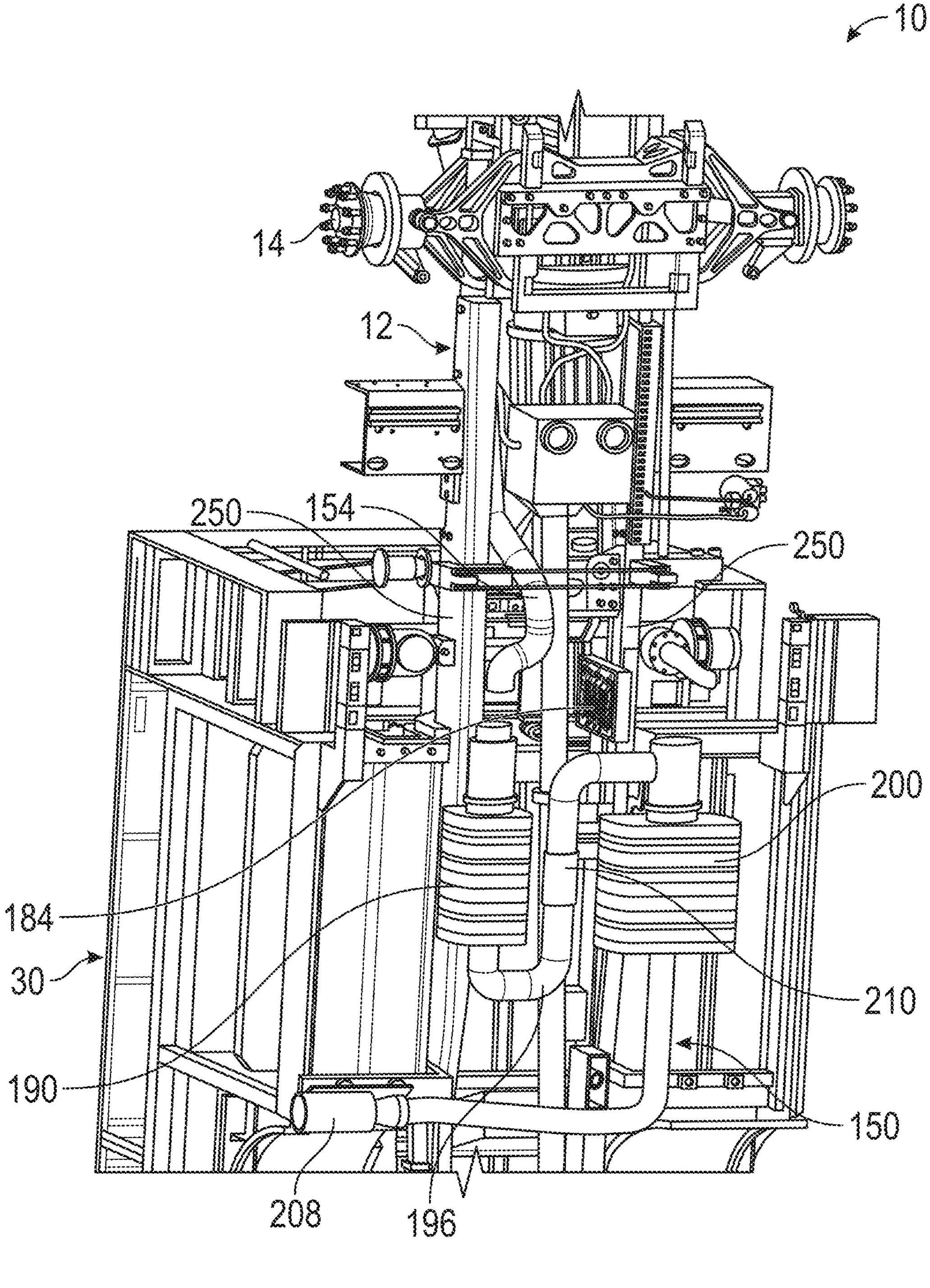
FIG. 34 is a bottom perspective view of the vehicle of FIG. 32, according to an exemplary embodiment.

In the embodiment shown in FIGS. 29-31, the vehicle 10 is a fire fighting vehicle configured as an aerial ladder truck. In other embodiments, the vehicle 10 is another type of fire fighting truck. As shown in FIGS. 29-31, the heater control unit 184 is coupled to the frame 12 of the vehicle 10 by the HCU support 186. In some embodiments, the heater control unit 184 is coupled to a first one of the frame rails 250 (e.g., a left frame rail 250) by the HCU support 186. In other embodiments, the heater control unit 184 is coupled to a second one of the frame rails 250 (e.g., a right frame rail 250) by the HCU support 186. In still other embodiments, the heater control unit 184 is coupled to each of the frame rails 250 by one or more HCU supports 186. In yet other embodiments, the heater control unit 184 is coupled to one or more additional or alternative components of the vehicle 10. By way of example, the heater control unit 184 may be coupled with the pump house 142, the front cabin 20, the rear section 30, the heater control unit 184, among other components of the vehicle 10.

As shown in FIGS. 29-31, the heater control unit 184 is positioned laterally between the frame rails 250 of the frame 12. In other words, at least a portion of the heater control unit 184 is disposed laterally between inward-facing surfaces of the frame rails 250. As shown in FIGS. 29-31, the heater control unit 184 extends at least partially above the frame rails 250 in a vertical direction (e.g., a top surface of the heater control unit 184 projects above the top surfaces of the frame rails 250). The heater control unit 184 is positioned longitudinally rearward relative to the transmission 120 (e.g., closer to the rear end of the vehicle 10 than the transmission 120).

As shown in FIGS. 29-31, the heater control unit 184 is positioned at least partially under the pump house 142. In some embodiments, the heater control unit 184 is positioned within the interior volume of the pump house 142 such that the heater control unit 184 is vertically below a portion of the pump house 142. In other embodiments, the heater control unit 184 is positioned exterior to the pump house 142 and vertically below a portion of the pump house 142. As shown in FIGS. 29-31, the heater control unit 184 is positioned along a front side of the pump house 142 such that the heater control unit 184 positioned longitudinally forward relative to the pump house 142.

As shown in FIG. 31, the heater control unit 184 is positioned a longitudinal distance D2 rearward relative to the front axle 14. The longitudinal distance D2 may extend between a leading edge (e.g., a front surface) of the heater control unit 184 to a center point of the front axle 14. In some embodiments, the longitudinal distance D2 is within a range of about 70 in (e.g., 65 in, 68 in, 69 in, 71 in, 72 in, 75 in, etc.) to about 92 in (e.g., 85 in, 89 in, 90 in, 91 in, 93 in, 95 in, etc.). By way of example, the longitudinal distance D2 may be 73.57 in. In some embodiments, the longitudinal distance D2 is within a range greater or less than between about 70 in and about 92 in. In other embodiments, the longitudinal distance D2 is otherwise suitably dimensioned. According to an exemplary embodiment, the heater control unit 184 may be longitudinally positioned (e.g., the longitudinal distance D2 between the front axle 14 and the heater control unit 184 may be dimensioned) such that a length of the high voltage wires 242 extending between the alternator 114 and the heater control unit 184 is within a range of about 77 in (e.g., 75 in, 76 in, 78 in, 79 in, 80 in, etc.) and about 88 in (e.g., 85 in, 86 in, 87 in, 89 in, 90 in, etc.). By way of example, the length of the high voltage wires 242 may be 77 in. In some embodiments, the length of the high voltage wires 242 is within a range greater or less than between about 77 in and about 88 in. In other embodiments, the length of the high voltage wires 242 is otherwise suitably dimensioned to comply with regulations (e.g., emissions regulations, electrical line length regulations, etc.) of the EPA. In some embodiments, the alternator 114 is positioned proximate the front axle 14 such that the length of the high voltage wires 242 is about the same as the longitudinal distance D2. In other embodiments, the alternator 114 is positioned longitudinally forward relative to the front axle 14 such that the length of the high voltage wires 242 is greater than the longitudinal distance D2.

In the embodiment shown in FIGS. 32-36, the vehicle 10 is a fire fighting vehicle configured as a pumper fire truck. In other embodiments, the vehicle 10 is another type of fire fighting truck. As shown in FIGS. 32-36, the heater control unit 184 is coupled to a first one of the frame rails 250 (e.g., a left frame rail 250) of the frame 12 by the HCU support 186. In some embodiments, the heater control unit 184 is coupled to a second one of the frame rails 250 (e.g., a right frame rail 250) by the HCU support 186. In other embodiments, the heater control unit 184 is coupled to each of the frame rails 250 by one or more HCU supports 186. In still other embodiments, the heater control unit 184 is coupled to one or more additional or alternative components of the vehicle 10. By way of example, the heater control unit 184 may be coupled with the pump house 142, the front cabin 20, the rear section 30, the heater control unit 184, among other components of the vehicle 10.

As shown in FIGS. 32-36, the heater control unit 184 is positioned vertically below at least a portion of the frame rail 250 to which the heater control unit 184 is coupled. In particular, the top surface of the heater control unit 184 is positioned vertically below the top surface of the frame rail 250, and the bottom surface of the heater control unit 184 is positioned vertically below the bottom surface of the frame rail 250. As shown in FIGS. 32-36, the heater control unit 184 is positioned laterally between the frame rails 250 of the frame 12. In other words, at least a portion of the heater control unit 184 is disposed laterally between inward-facing surfaces of the frame rails 250. As shown in FIGS. 32-36, the heater control unit 184 is positioned longitudinally rearward relative to the pump house 142 (e.g., closer to the rear end of the vehicle 10 than the pump house 142).

Figure 35:
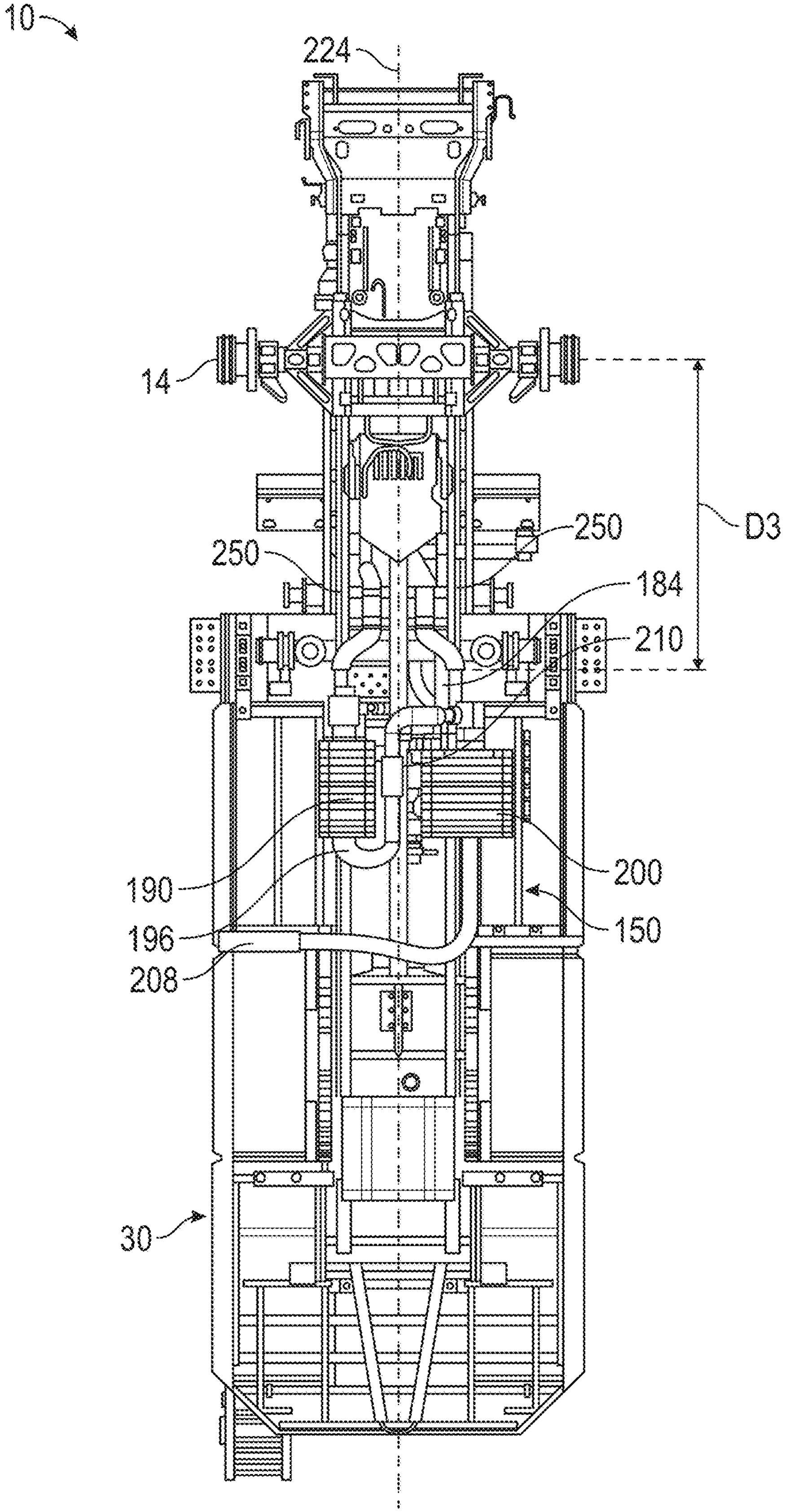
FIG. 35 is a bottom view of the vehicle of FIG. 32, according to an exemplary embodiment.
Figure 36:
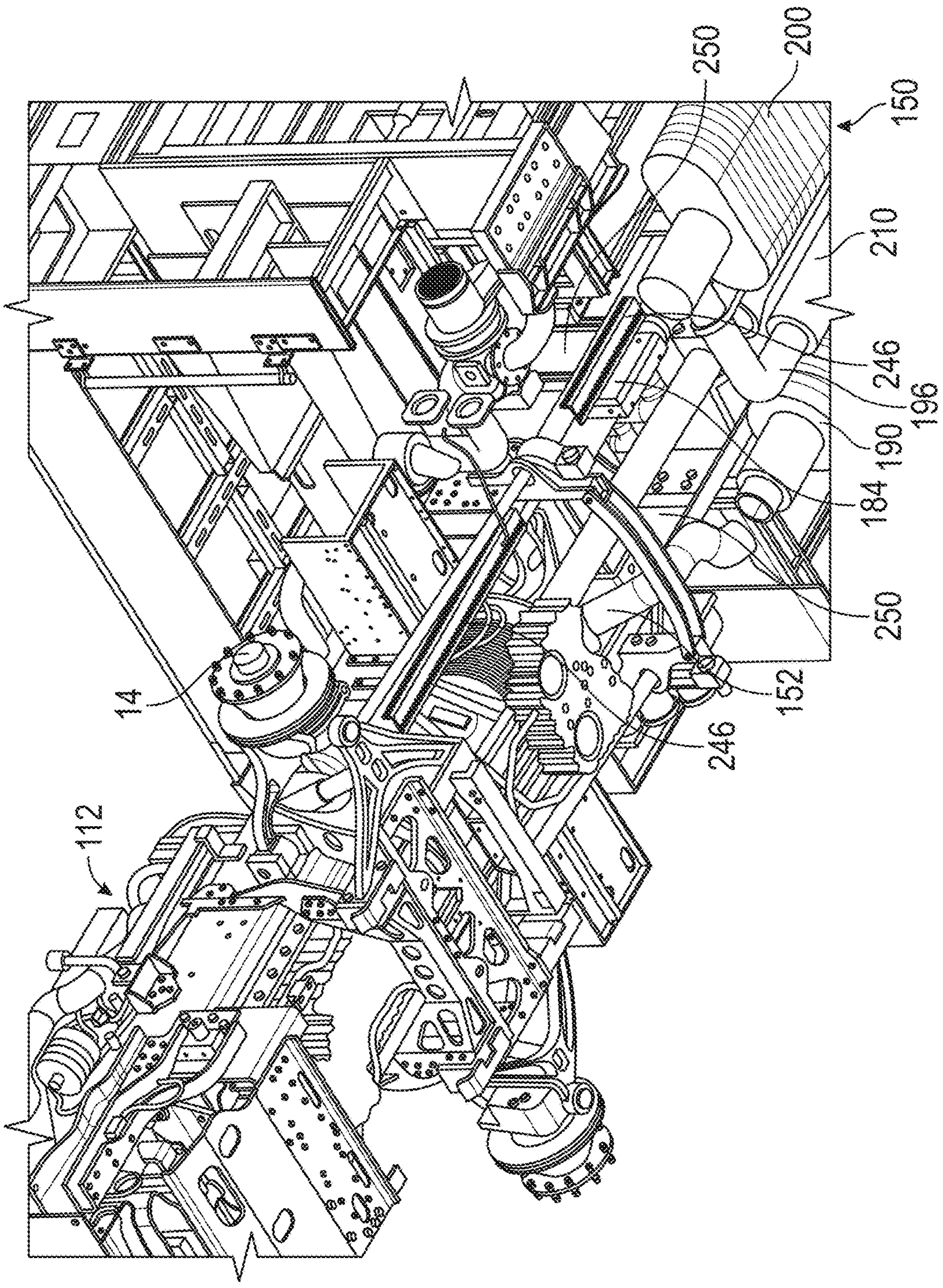
FIG. 36 is a bottom, left perspective view of the vehicle of FIG. 32, according to an exemplary embodiment.

As shown in FIG. 35, the heater control unit 184 is positioned a longitudinal distance D3 rearward relative to the front axle 14. The longitudinal distance D3 may extend between a leading edge (e.g., a side surface) of the heater control unit 184 to a center point of the front axle 14. In some embodiments, the longitudinal distance D3 is within a range of about 80 in (e.g., 75 in, 78 in, 79 in, 81 in, 82 in, 85 in, etc.) to about 92 in (e.g., 85 in, 89 in, 90 in, 91 in, 93 in, 95 in, etc.). By way of example, the longitudinal distance D3 may be about 83.66 in. In some embodiments, the longitudinal distance D3 is within a range greater or less than between about 80 in and about 92 in. In other embodiments, the longitudinal distance D3 is otherwise suitably dimensioned. According to an exemplary embodiment, the heater control unit 184 may be longitudinally positioned (e.g., the longitudinal distance D3 between the front axle 14 and the heater control unit 184 may be dimensioned) such that a length of the high voltage wires 242 extending between the alternator 114 and the heater control unit 184 is within a range of about 77 in (e.g., 75 in, 76 in, 78 in, 79 in, 80 in, etc.) and about 88 in (e.g., 85 in, 86 in, 87 in, 89 in, 90 in, etc.). By way of example, the length of the high voltage wires 242 may be 77 in. In some embodiments, the length of the high voltage wires 242 is within a range greater or less than between about 77 in and about 88 in. In other embodiments, the length of the high voltage wires 242 is otherwise suitably dimensioned to comply with regulations (e.g., emissions regulations, electrical line length regulations, etc.) of the EPA. In some embodiments, the alternator 114 is positioned proximate the front axle 14 such that the length of the high voltage wires 242 is about the same as the longitudinal distance D3. In other embodiments, the alternator 114 is positioned longitudinally forward relative to the front axle 14 such that the length of the high voltage wires 242 is greater than the longitudinal distance D3.

As shown in FIG. 37, the vehicle wiring assembly 240 includes two high voltage wires 242 extending between the alternator 114 and the heater control unit 184. The two high voltage wires 242 include a first high voltage wire 242A and a second high voltage wire 242B. The first high voltage wire 242A and the second high voltage wire 242B extend from the alternator 114 to the heater control unit 184 in a common cable support 246. In some embodiments, the common cable support 246 includes a single cable bracket 264 along a path of the first high voltage wire 242A and the second high voltage wire 242B between the alternator 114 and the heater control unit 184. In other embodiments, the common cable support 246 includes two or more cable brackets 264 spaced along the path of the first high voltage wire 242A and the second high voltage wire 242B between the alternator 114 and the heater control unit 184 to facilitate supporting the first high voltage wire 242A and the second high voltage wire 242B at multiple longitudinal locations. In still other embodiments, the first high voltage wire 242A extends from the alternator 114 to the heater control unit 184 in a first cable support 246, and the second high voltage wire 242B extends from the alternator 114 to the heater control unit 184 in a second cable support 246 separate from the first cable support 246. As shown in FIG. 37, the first high voltage wire 242A extends from the heater control unit 184 to the first heater 182A, and the second high voltage wire 242B extends from the heater control unit 184 to the second heater 182B.

As shown in FIG. 38, the alternator 114 includes the heater control unit 184, and two high voltage wires 242 extend directly from the alternator 114 to the heaters 182 without an intermediate heater control unit mounted along the frame 12. In particular, the first high voltage wire 242A extends from the alternator 114 to the first heater 182A, and the second high voltage wire 242B extends from the alternator 114 to the second heater 182B. The first high voltage wire 242A and the second high voltage wire 242B may extend to the first heater 182A and the second heater 182B in a common cable support 246 (described in greater detail above). In some embodiments, the first high voltage wire 242A extends to the first heater 182A in a first cable support 246 and the second high voltage wire 242B extends to the second heater 182B in a second cable support 246 separate from the first cable support 246.

As shown in FIG. 38, the vehicle wiring assembly 240 includes a ground connection, shown as ground wire 330, coupled with the alternator 114. The ground wire 330 extends from the alternator 114 and is split between the first heater 182A and the second heater 182B to provide a common electrical return path from the first heater 182A and the second heater 182B back to the alternator 114 (or to overall vehicle ground). The ground wire 330 may serve to complete the electrical circuit for each of the heaters 182 and ensure proper operation of the thermal management system 180. In some embodiments, the ground wire 330 is supported within the common cable support 246 together with the first high voltage wire 242A and the second high voltage wire 242B. In other embodiments, the ground wire 330 is supported separately from the first high voltage wire 242A and the second high voltage wire 242B (e.g., in a separate cable support 246, within a low voltage wiring conduit, etc.).

As utilized herein, the terms “approximately,” “about,” “substantially”, and similar terms are intended to have a broad meaning in harmony with the common and accepted usage by those of ordinary skill in the art to which the subject matter of this disclosure pertains. It should be understood by those of skill in the art who review this disclosure that these terms are intended to allow a description of certain features described and claimed without restricting the scope of these features to the precise numerical ranges provided. Accordingly, these terms should be interpreted as indicating that insubstantial or inconsequential modifications or alterations of the subject matter described and claimed are considered to be within the scope of the disclosure as recited in the appended claims.

It should be noted that the term “exemplary” and variations thereof, as used herein to describe various embodiments, are intended to indicate that such embodiments are possible examples, representations, or illustrations of possible embodiments (and such terms are not intended to connote that such embodiments are necessarily extraordinary or superlative examples).

The term "coupled" and variations thereof, as used herein, means the joining of two members directly or indirectly to one another. Such joining may be stationary (e.g., permanent or fixed) or moveable (e.g., removable or releasable). Such joining may be achieved with the two members coupled directly to each other, with the two members coupled to each other using a separate intervening member and any additional intermediate members coupled with one another, or with the two members coupled to each other using an intervening member that is integrally formed as a single unitary body with one of the two members. If "coupled" or variations thereof are modified by an additional term (e.g., directly coupled), the generic definition of "coupled" provided above is modified by the plain language meaning of the additional term (e.g., "directly coupled" means the joining of two members without any separate intervening member), resulting in a narrower definition than the generic definition of "coupled" provided above. Such coupling may be mechanical, electrical, or fluidic.

References herein to the positions of elements (e.g., "top," "bottom," "above," "below") are merely used to describe the orientation of various elements in the figures. It should be noted that the orientation of various elements may differ according to other exemplary embodiments, and that such variations are intended to be encompassed by the present disclosure.

The hardware and data processing components used to implement the various processes, operations, illustrative logics, logical blocks, modules and circuits described in connection with the embodiments disclosed herein may be implemented or performed with a general purpose single- or multi-chip processor, a digital signal processor (DSP), an application specific integrated circuit (ASIC), a field programmable gate array (FPGA), or other programmable logic device, discrete gate or transistor logic, discrete hardware components, or any combination thereof designed to perform the functions described herein. A general purpose processor may be a microprocessor, or, any conventional processor, controller, microcontroller, or state machine. A processor also may be implemented as a combination of computing devices, such as a combination of a DSP and a microprocessor, a plurality of microprocessors, one or more microprocessors in conjunction with a DSP core, or any other such configuration. In some embodiments, particular processes and methods may be performed by circuitry that is specific to a given function. The memory (e.g., memory, memory unit, storage device) may include one or more devices (e.g., RAM, ROM, Flash memory, hard disk storage) for storing data and/or computer code for completing or facilitating the various processes, layers and modules described in the present disclosure. The memory may be or include volatile memory or non-volatile memory, and may include database components, object code components, script components, or any other type of information structure for supporting the various activities and information structures described in the present disclosure. According to an exemplary embodiment, the memory is communicably connected to the processor via a processing circuit and includes computer code for executing (e.g., by the processing circuit or the processor) the one or more processes described herein.

The present disclosure contemplates methods, systems and program products on any machine-readable media for accomplishing various operations. The embodiments of the present disclosure may be implemented using existing computer processors, or by a special purpose computer processor for an appropriate system, incorporated for this or another purpose, or by a hardwired system. Embodiments within the scope of the present disclosure include program products comprising machine-readable media for carrying or having machine-executable instructions or data structures stored thereon. Such machine-readable media can be any available media that can be accessed by a general purpose or special purpose computer or other machine with a processor. By way of example, such machine-readable media can comprise RAM, ROM, EPROM, EEPROM, or other optical disk storage, magnetic disk storage or other magnetic storage devices, or any other medium which can be used to carry or store desired program code in the form of machine-executable instructions or data structures and which can be accessed by a general purpose or special purpose computer or other machine with a processor. Combinations of the above are also included within the scope of machine-readable media. Machine-executable instructions include, for example, instructions and data which cause a general purpose computer, special purpose computer, or special purpose processing machines to perform a certain function or group of functions.

Although the figures and description may illustrate a specific order of method steps, the order of such steps may differ from what is depicted and described, unless specified differently above. Also, two or more steps may be performed concurrently or with partial concurrence, unless specified differently above. Such variation may depend, for example, on the software and hardware systems chosen and on designer choice. All such variations are within the scope of the disclosure. Likewise, software implementations of the described methods could be accomplished with standard programming techniques with rule-based logic and other logic to accomplish the various connection steps, processing steps, comparison steps, and decision steps.

It is important to note that the construction and arrangement of the vehicle 10 and the systems and components thereof as shown in the various exemplary embodiments is illustrative only. Additionally, any element disclosed in one embodiment may be incorporated or utilized with any other embodiment disclosed herein.

The invention claimed is:

1. A fire fighting vehicle comprising:

a chassis defining a longitudinal length of the fire fighting vehicle;

an engine supported by the chassis and configured to produce exhaust gas;

a thermal management system including:

a first housing including a first housing inlet fluidly coupled with the engine and configured to receive the exhaust gas;

a second housing including a second housing inlet configured to receive the exhaust gas from the first housing; and a heater coupled with the first housing or the second housing;

a cable support including:

a first bracket coupled to a lateral outer surface of the chassis; and a second bracket coupled to the first bracket and extending (i) along at least a portion of the longitudinal length and (ii) beneath the chassis; and a wire electrically coupled with the heater, wherein at least a portion of the wire is supported by the second bracket such that the portion of the wire is positioned beneath the chassis.

2. The fire fighting vehicle of claim 1, wherein the chassis includes a frame rail having an upper flange, a lower flange, and a webbing extending between the upper flange and the lower flange, and wherein the first bracket is coupled to the webbing.

3. The fire fighting vehicle of claim 2, wherein the second bracket includes a cable channel positioned beneath the lower flange of the frame rail.

4. The fire fighting vehicle of claim 3, wherein the cable channel is sized to prevent removal of the wire through a lateral opening in the cable channel.

5. The fire fighting vehicle of claim 1, wherein the second bracket includes a plurality of tie-down holes configured to receive fastening elements for coupling the wire to the second bracket.

6. The fire fighting vehicle of claim 1, wherein the wire is a high-voltage cable electrically coupling the heater with at least one of a heater control unit or an alternator.

7. The fire fighting vehicle of claim 1, wherein the heater is a first heater coupled with the first housing, and wherein the thermal management system includes a second heater coupled with the second housing.

8. The fire fighting vehicle of claim 7, wherein the wire is a first wire electrically coupled with the first heater, further comprising a second wire electrically coupled with the second heater, wherein at least a portion of the second wire is supported by the second bracket with the first wire such that the portion of the second wire is positioned beneath the chassis.

9. The fire fighting vehicle of claim 8, further comprising an alternator, wherein the first wire and the second wire electrically couple the alternator with the first heater and the second heater.

10. The fire fighting vehicle of claim 9, wherein the thermal management system includes a heater control unit positioned along the first wire and the second wire between (i) the alternator and (ii) the first heater and the second heater.

11. The fire fighting vehicle of claim 9, wherein the thermal management system includes a ground wire electrically coupled with the alternator, the first heater, and the second heater.

12. The fire fighting vehicle of claim 1, wherein the cable support is a first cable support positioned at a first longitudinal position along the longitudinal length of the chassis, further comprising a second cable support at a second longitudinal position along the longitudinal length of the chassis, the second cable support configured to configured to support a second portion of the wire.

13. A thermal management system for an exhaust aftertreatment system of a vehicle, the thermal management system comprising:

- a heater configured to heat a component of the exhaust aftertreatment system;
- a heater control unit electrically coupled with the heater;
- a wire electrically coupling the heater with the heater control unit; and
- a cable support including:
  - a first bracket configured to couple to a lateral outer surface of a chassis of the vehicle; and
  - a second bracket coupled to the first bracket and configured to extend (i) along at least a portion of a longitudinal length of the chassis and (ii) beneath the chassis, the second bracket supporting at least a portion of the wire.

14. The thermal management system of claim 13, wherein the second bracket includes a cable channel sized to prevent removal of the wire through a lateral opening in the cable channel.

15. The thermal management system of claim 13, wherein the component is a first component and the heater is a first heater configured to heat the first component, further comprising a second heater configured to heat a second component of the exhaust aftertreatment system.

16. The thermal management system of claim 15, wherein the wire is a first wire electrically coupled with the first heater, further comprising a second wire electrically coupled with the second heater, wherein at least a portion of the second wire is supported by the second bracket with the first wire such that the portion of the second wire is configured to be positioned beneath the chassis.

17. The thermal management system of claim 15, wherein the heater control unit is integrated into an alternator of the vehicle.

18. The thermal management system of claim 17, further comprising a ground wire electrically coupled with the alternator, the first heater, and the second heater.

19. A fire fighting vehicle comprising:

- a chassis defining a longitudinal length of the fire fighting vehicle;
- an engine supported by the chassis and configured to produce exhaust gas;
- an alternator mechanically driven by the engine;
- a thermal management system including:
  - a first housing including a first housing inlet fluidly coupled with the engine and configured to receive the exhaust gas;
  - a second housing including a second housing inlet configured to receive the exhaust gas from the first housing;
  - a first heater coupled with the first housing; and
  - a second heater coupled with the second housing;
- a cable support including:
  - a first bracket coupled to a lateral outer surface of the chassis; and
  - a second bracket coupled to the first bracket and extending (i) along at least a portion of the longitudinal length and (ii) beneath the chassis; and
- a first wire and a second wire electrically coupled with the alternator and the first heater and the second heater, respectively, wherein at least a portion of the first wire and at least a portion of the second wire are supported by the second bracket such that the portion of the first wire and the portion of the second wire are positioned beneath the chassis.

20. The fire fighting vehicle of claim 19, wherein the thermal management system includes a ground wire electrically coupled with the alternator, the first heater, and the second heater.

* * * * *